US008350442B2

(12) United States Patent
Akutsu et al.

(10) Patent No.: US 8,350,442 B2
(45) Date of Patent: Jan. 8, 2013

(54) POWER PLANT

(75) Inventors: Shigemitsu Akutsu, Saitama-ken (JP);
Satoyoshi Oya, Saitama-ken (JP); Kota Kasaoka, Saitama-ken (JP); Noriyuki Abe, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 13/003,482

(22) PCT Filed: Jun. 12, 2009

(86) PCT No.: PCT/JP2009/060787
§ 371 (c)(1),
(2), (4) Date: Jan. 10, 2011

(87) PCT Pub. No.: WO2010/010762
PCT Pub. Date: Jan. 28, 2010

(65) Prior Publication Data
US 2011/0109180 A1   May 12, 2011

(30) Foreign Application Priority Data
Jul. 22, 2008   (JP) ................................. 2008-188281

(51) Int. Cl.
*H02K 1/22* (2006.01)
(52) U.S. Cl. .......................... 310/266; 310/112; 310/114
(58) Field of Classification Search .......... 310/112–114, 310/103, 266, 156.37
See application file for complete search history.

(56) References Cited

U.S. PATENT DOCUMENTS

| 4,288,709 | A | * | 9/1981 | Matthias et al. ............ 310/49.23 |
| 6,239,530 | B1 | * | 5/2001 | Garcia .................... 310/216.109 |
| 6,998,757 | B2 | * | 2/2006 | Seguchi et al. ............... 310/266 |
| 7,781,930 | B2 | * | 8/2010 | Abe et al. ...................... 310/103 |
| 8,074,755 | B2 | * | 12/2011 | Abe et al. .................. 180/65.265 |
| 8,169,116 | B2 | * | 5/2012 | Oya et al. ...................... 310/112 |
| 8,183,722 | B2 | * | 5/2012 | Akutsu et al. ................... 310/46 |
| 2006/0284500 | A1 | | 12/2006 | Han et al. |
| 2007/0090707 | A1 | | 4/2007 | Moriya et al. |
| 2008/0211335 | A1 | | 9/2008 | Abe et al. |
| 2010/0308674 | A1 | * | 12/2010 | Kasaoka et al. ............... 310/114 |
| 2011/0001364 | A1 | * | 1/2011 | Oya et al. .................... 310/12.15 |

FOREIGN PATENT DOCUMENTS

| JP | 2001-157304 | 6/2001 |
| JP | 2002-17004 | 1/2002 |
| JP | 2006-353090 | 12/2006 |
| JP | 2007-116837 | 5/2007 |
| WO | 2008/018376 | 2/2008 |
| WO | 2008/018539 | 2/2008 |
| WO | 2008/050827 | 5/2008 |
| WO | 2008/078817 | 7/2008 |

* cited by examiner

*Primary Examiner* — Thanh Lam
(74) *Attorney, Agent, or Firm* — Squire Sanders (US) LLP

(57) ABSTRACT

To provide a power plant which makes it possible to make the power plant more compact in size, reduce manufacturing costs thereof, and improve the degree of freedom in design. The power plant 1 comprises an engine 3, and first and second rotating machines 10 and 20, and drives front wheels 4 by motive power from these. The first rotating machine 10 includes first and second rotors 14 and 15, and a stator 16, and is configured such that a ratio between the number of armature magnetic poles generated in the stator 16, the number of magnetic poles of the first rotor 14, and the number of soft magnetic material cores 15a of the second rotor 15 becomes $1:m:(1+m)/2$ ($m \neq 1.0$).

17 Claims, 30 Drawing Sheets

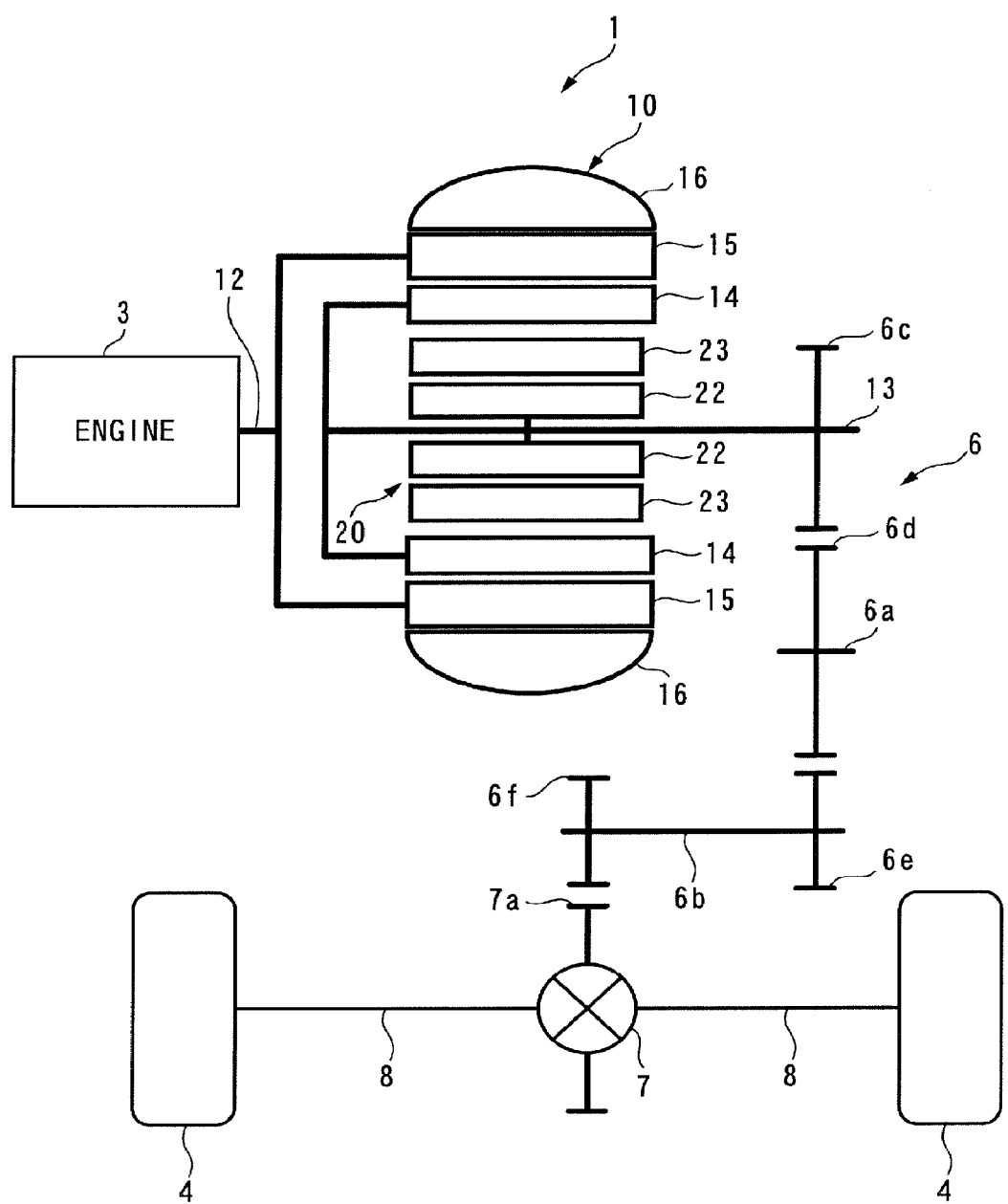
F I G. 1 5

F I G. 1 7
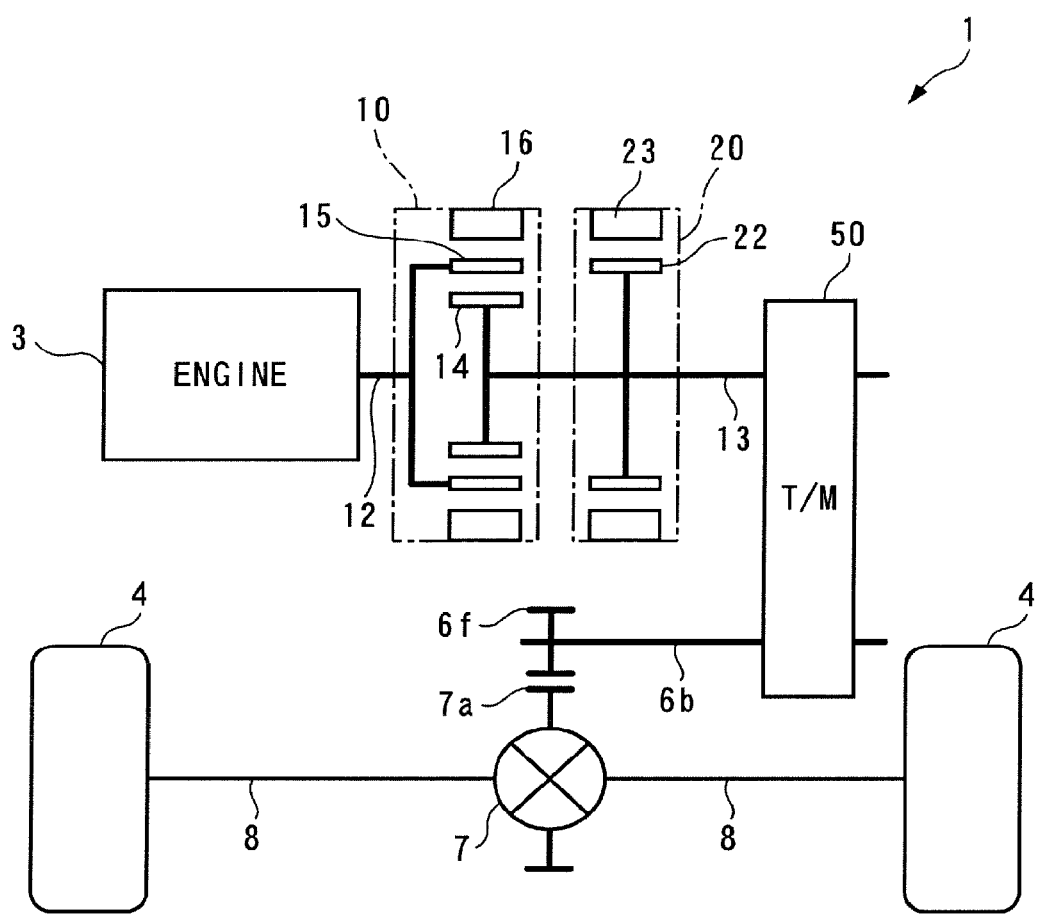

F I G. 19
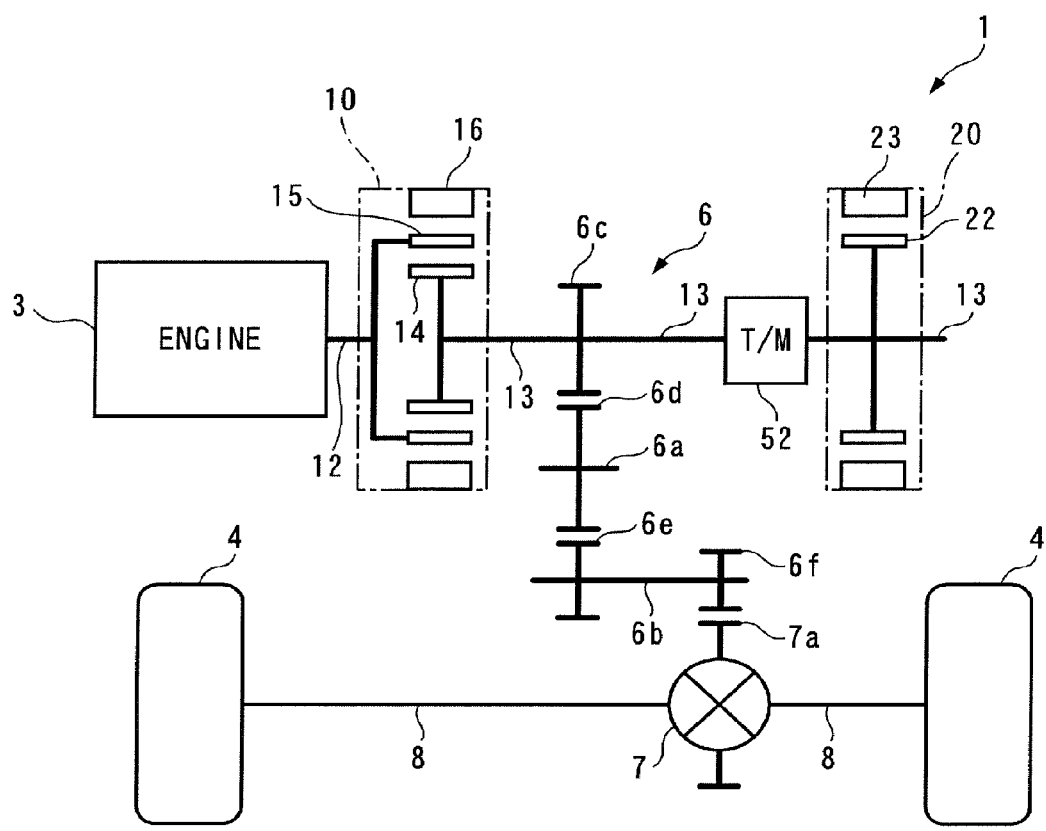

POWER PLANT

TECHNICAL FIELD

The present invention relates to a power plant for driving a driven part by motive power, and more particularly to a power plant having a heat engine and rotating machines as motive power sources.

BACKGROUND ART

Conventionally, the present applicant has already proposed a power plant in Patent Literature 1. This power plant is for driving drive wheels of a hybrid vehicle, and in an example shown in FIGS. 2 and 3 in Patent Literature 1, it is provided with an engine, a first rotating machine, and a second rotating machine, as motive power sources.

The first rotating machine includes a hollow cylindrical casing, an input shaft and an output shaft which are rotatably supported by the casing, a stator disposed on an inner wall of the casing along a circumferential direction, a first rotor accommodated in the casing, and a second rotor disposed between the first rotor and the stator, and the stator, the first rotor, and the second rotor are arranged concentrically with each other. In the first rotating machine, the input shaft of the first rotating machine is mechanically connected to an output shaft of the engine, the output shaft of the first rotating machine is directly connected to a rotating shaft of the second rotating machine. Further, the first rotor is concentrically fixed to a front end of the output shaft, and first and second permanent magnet rows extend in parallel with each other along a circumferential direction on an outer peripheral surface thereof. The first and second permanent magnet rows are each formed by a plurality of permanent magnets, and these permanent magnets are arranged at equally-spaced intervals such that each two adjacent permanent magnets have polarities different from each other.

Further, the second rotor is concentrically fixed to a front end of the input shaft, and first and second soft magnetic element rows extend in parallel with each other along a circumferential direction on an outer peripheral surface thereof. The first and second soft magnetic element rows are each formed by a plurality of soft magnetic material cores arranged at predetermined intervals along the circumferential direction, and the soft magnetic material cores of the second soft magnetic element row (hereinafter referred to as "the second cores") are arranged in a manner displaced by an electrical angle of $\pi/2$ with respect to the soft magnetic material cores of the first soft magnetic element row (hereinafter referred to as "the first cores"). Further, the stator includes a plurality of armatures arranged at predetermined intervals, and coils of each three adjacent armatures are arranged as three-phase coils that generate a rotating magnetic field while exhibiting a U-phase, a V-phase, and a W-phase, respectively, when electric power is supplied thereto.

In the first rotating machine arranged as above, when electric power is supplied to the stator, a first rotating magnetic field and a second rotating magnetic field are generated in the stator such that they rotate in the circumferential direction of the stator, and in accordance therewith, the first and second cores are magnetized by magnetic poles of the first and second rotating magnetic fields and magnetic poles of the first and second permanent magnets, whereby magnetic lines of force are generated between these elements. Further, the first and second rotors are driven by the generated magnetic lines of force, which causes motive power to be output from the output shaft or the input shaft.

On the other hand, the second rotating machine is formed by a DC brushless motor, and a rotating shaft thereof is mechanically connected to the drive wheels. In the above-described power plant, the respective operating states of the engine, the first rotating machine, and the second rotating machine are controlled according to the operating state of the hybrid vehicle, and as a result, the drive wheels are driven by the motive power generated by these motive power sources.

CITATION LIST

Patent Literature

[PLT 1]
International Publication Pamphlet No. WO08/018,539

SUMMARY OF INVENTION

According to the above-described conventional power plant, the two soft magnetic element rows are indispensable in the first rotating machine, so that the size and manufacturing costs of the first rotating machine are increased. As a result, this increases the size and the manufacturing costs of the power plant itself. Further, due to the structural characteristics of the first rotating machine, there holds only speed relationship in which a rotational difference between the first rotor and the second rotor becomes equal to that between the rotating magnetic field and the second rotor, the first rotating machine power plant has the problem of a low degree of freedom in design.

The present invention has been made to provide a solution to the above-described problems, and an object thereof is to provide a power plant which is capable of being made more compact in size, reducing the manufacturing costs thereof and enhancing the degree of freedom in design.

To attain the object, the invention as claimed in claim 1 provides a power plant 1, 1A to 1D, for driving a driven part (front wheels 4) by motive power, comprising a heat engine (engine 3), and a first rotating machine 10 including a stator 16, and a first rotor 14 and a second rotor 15 which are relatively rotatable with respect to the stator 16, in which one of the first rotor 14 and the second rotor 15 is mechanically connected to the heat engine (engine 3), and the other of the first rotor 14 and the second rotor 15 is mechanically connected to the driven part (front wheels 4), wherein the stator 16 includes an armature row (iron core 16a, U-phase to W-phase coils 16c to 16e) arranged in a circumferential direction which is formed by a plurality of armatures (iron core 16a, U-phase to W-phase coils 16c to 16e) arranged in a circumferential direction, and generates a rotating magnetic field which rotates in the circumferential direction, by armature magnetic poles generated in the plurality of armatures in accordance with supply of electric power, wherein the first rotor 14 includes a magnetic pole row disposed in a manner opposed to the armature row, the magnetic pole row being formed by a plurality of magnetic poles (permanent magnets 14a) which are arranged in a manner spaced from each other in the circumferential direction and each two adjacent ones of which have polarities different from each other, wherein the second rotor 15 includes a soft magnetic material element row disposed between the armature row and the magnetic pole row, the soft magnetic material element row being formed by a plurality of soft magnetic material elements (soft magnetic material cores 15a) which are arranged in a manner spaced from each other in the circumferential direction, and wherein a ratio between the number of the armature magnetic poles, the number of the magnetic poles, and the number of the soft magnetic material elements is set to 1:m:(1+m)/2 (provided m≠1).

According to this power plant, in the first rotating machine, the magnetic pole row of the first rotor is arranged in a manner opposed to the armature row of the stator, and the soft magnetic material element row of the second rotor is disposed between the armature row and the magnetic pole row. The soft magnetic material element row is formed by the plurality of soft magnetic material elements arranged in a manner spaced from each other in the circumferential direction, and hence when the rotating magnetic field is generated in accordance with supply of electric power to the armature row, the soft magnetic material elements are magnetized by the armature magnetic poles generated in the plurality of armatures and the magnetic poles of the first rotor. At this time, since the plurality of soft magnetic material elements are spaced from each other, the magnetic lines of force are generated between the soft magnetic material elements, the armature poles, and the magnetic pole, which causes electric power supplied to the armatures to be converted to motive power. Since the first rotor and the second rotor are rotatable with respect to the stator, this motive power is output from the first rotor and/or the second rotor, and since one of the first rotor and the second rotor is mechanically connected to the heat engine, and the other is mechanically connected to the driven part, the heat engine and/or the driven part are/is driven by the motive power.

Now, assuming that a torque equivalent to an electrical angular velocity of the rotating magnetic field generated by electric power supplied to the armatures and the supplied electric power is defined as a driving equivalent torque Te, a relationship between the driving equivalent torque Te, a torque T1 transmitted to the first rotor, and a torque T2 transmitted to the second rotor, and a relationship between the electrical angular velocities of the first and second rotors and the electrical angular velocity of the rotating magnetic field are as described below.

First, when the first rotating machine according to the present invention is constructed such that the following conditions (f1) and (f2) are satisfied, an equivalent circuit corresponding to the first rotating machine as constructed above is expressed as shown in FIG. 30. It should be noted that in the present description, a pair of an N pole and an S pole is referred to as "a pole pair", and the number of pole pairs is referred to as "a pole pair number".

(f1) The armatures have three-phase coils of U-phase, V-phase, and W-phase.

(f2) The number of the armature magnetic poles is 2, i.e. the polar pair number of the armature magnetic poles has a value of 1, the number of the magnetic poles is 4, i.e. the polar pair number of the magnetic poles has a value of 2, and the number of the soft magnetic material elements is 3, i.e. first to third soft magnetic material elements.

In the case of the first rotating machine as constructed above, a magnetic flux $\Psi k1$ of a magnetic pole passing through the first soft magnetic material element is expressed by the following equation (1):

$$\Psi k1 = \psi f \cos[2(\theta 2 - \theta 1)] \qquad (1)$$

In this equation (1), φf represents the maximum value of the magnetic flux of the magnetic pole, and θ1 and θ2 represent a rotational angular position of the magnetic pole and a rotational angular position of the first soft magnetic material element, with respect to the U-phase coil. Further, since a ratio of the pole pair number of the magnetic poles to the pole pair number of the armature magnetic poles is 2, the magnetic flux of the magnetic pole rotates (changes) at a repetition period of the twofold of the repetition period of the rotating magnetic field, so that in the above-mentioned equation (1), to indicate this fact, (θ2−θ1) is multiplied by 2.0.

In this equation, the magnetic flux $\Psi u1$ of the magnetic pole passing through the U-phase coil via the first soft magnetic material element corresponds to a value obtained by multiplying the magnetic flux $\Psi k1$, expressed by the equation (1), by cos θ2, so that there is obtained the following equation (2):

$$\Psi u1 = \psi f \cos[2(\theta 2 - \theta 1)] \cos \theta 2 \qquad (2)$$

Similarly to the above, a magnetic flux $\Psi k2$ of a magnetic pole passing through the second soft magnetic material element is expressed by the following equation (3):

$$\Psi k2 = \psi f \cdot \cos\left[2\left(\theta 2 + \frac{2\pi}{3} - \theta 1\right)\right] \qquad (3)$$

In this case, the rotational angular position of the second soft magnetic material element with respect to the armature leads that of the first soft magnetic material element by 2π/3, so that in the above-mentioned equation (3), to indicate this fact, 2π/3 is added to θ2.

Further, the magnetic flux $\Psi u2$ of a magnetic pole passing through the U-phase coil via the second soft magnetic material element corresponds to a value obtained by multiplying the magnetic flux $\Psi k2$, expressed by the equation (3), by cos(θ2+2π/3), so that there is obtained the following equation (4):

$$\Psi u2 = \psi f \cdot \cos\left[2\left(\theta 2 + \frac{2\pi}{3} - \theta 1\right)\right] \cos\left(\theta 2 + \frac{2\pi}{3}\right) \qquad (4)$$

By the same method as described above, as an equation for calculating a magnetic flux $\Psi u3$ of a magnetic pole passing through the U-phase coil via the third soft magnetic material element, there is obtained the following equation (5):

$$\Psi u3 = \psi f \cdot \cos\left[2\left(\theta 2 + \frac{4\pi}{3} - \theta 1\right)\right] \cos\left(\theta 2 + \frac{4\pi}{3}\right) \qquad (5)$$

In the first rotating machine as shown in FIG. 30, a magnetic flux $\Psi u$ of the magnetic pole passing through the U-phase coil via the three soft magnetic material elements is obtained by adding $\Psi u1$ to $\Psi u3$ expressed by the above-mentioned equations (2), (4) and (5), and hence the magnetic flux $\Psi u$ is expressed by the following equation (6):

$$\Psi u = \qquad (6)$$
$$\psi f \cdot \cos[2(\theta 2 - \theta 1)]\cos\theta 2 + \psi f \cdot \cos\left[2\left(\theta 2 + \frac{2\pi}{3} - \theta 1\right)\right]\cos\left(\theta 2 + \frac{2\pi}{3}\right) +$$
$$\psi f \cdot \cos\left[2\left(\theta 2 + \frac{4\pi}{3} - \theta 1\right)\right]\cos\left(\theta 2 + \frac{4\pi}{3}\right)$$

Further, when this equation (6) is generalized, the magnetic flux $\Psi u$ of the magnetic pole passing through the U-phase coil via the soft magnetic material elements is expressed by the following equation (7):

$$\Psi u = \sum_{i=1}^{b} \psi f \cdot \cos\left\{a\left[\theta 2 + (i-1)\frac{2\pi}{b} - \theta 1\right]\right\} \cos\left\{c\left[\theta 2 + (i-1)\frac{2\pi}{b}\right]\right\} \quad (7)$$

In this equation (7), a, b and c represent the pole pair number of magnetic poles, the number of soft magnetic material elements, and the pole pair number of armature magnetic poles.

Further, when the above equation (7) is changed based on the formula of the sum and product of the trigonometric function, there is obtained the following equation (8):

$$\Psi u = \sum_{i=1}^{b} \frac{1}{2} \cdot \psi f \left\{ \cos\left[(a+c)\theta 2 - a\cdot\theta 1 + (a+c)(i-1)\frac{2\pi}{b}\right] + \cos\left[(a-c)\theta 2 - a\cdot\theta 1 + (a-c)(i-1)\frac{2\pi}{b}\right] \right\} \quad (8)$$

When this equation (8) is rearranged by setting b=a+c, and using the relationship of $\cos(\theta+2\pi)=\cos\theta$, there is obtained the following equation (9):

$$\Psi u = \frac{b}{2} \cdot \psi f \cdot \cos[(a+c)\theta 2 - a\cdot\theta 1] + \sum_{i=1}^{b} \frac{1}{2} \cdot \psi f \left\{ \cos\left[(a-c)\theta 2 - a\cdot\theta 1 + (a-c)(i-1)\frac{2\pi}{b}\right] \right\} \quad (9)$$

When this equation (9) is rearranged based on the addition theorem of the trigonometric function, there is obtained the following equation (10):

$$\Psi u = \frac{b}{2} \cdot \psi f \cdot \cos[(a+c)\theta 2 - a\cdot\theta 1] + \frac{1}{2} \cdot \psi f \cdot \cos[(a-c)\theta 2 - a\cdot\theta 1] \sum_{i=1}^{b} \cos\left[(a-c)(i-1)\frac{2\pi}{b}\right] - \frac{1}{2} \cdot \psi f \cdot \sin[(a-c)\theta 2 - a\cdot\theta 1] \sum_{i=1}^{b} \sin\left[(a-c)(i-1)\frac{2\pi}{b}\right] \quad (10)$$

When the integral term in the second term on the right side of the equation (10) is rearranged using the series summation formula and Euler's formula on condition that a−c≠0, there is obtained the following equation (11). That is, the second term on the right side of the equation (10) becomes equal to 0.

$$\sum_{i=1}^{b} \cos\left[(a-c)(i-1)\frac{2\pi}{b}\right] = \sum_{i=0}^{b-1} \frac{1}{2}\left\{e^{j[(a-c)\frac{2\pi}{b}i]} + e^{-j[(a-c)\frac{2\pi}{b}i]}\right\}$$
$$= \frac{1}{2}\left\{\frac{e^{j[(a-c)\frac{2\pi}{b}b]}-1}{e^{j[(a-c)\frac{2\pi}{b}]}-1} + \frac{e^{-j[(a-c)\frac{2\pi}{b}b]}-1}{e^{-j[(a-c)\frac{2\pi}{b}]}-1}\right\}$$
$$= \frac{1}{2}\left\{\frac{e^{j[(a-c)2\pi]}-1}{e^{j[(a-c)\frac{2\pi}{b}]}-1} + \frac{e^{-j[(a-c)2\pi]}-1}{e^{-j[(a-c)\frac{2\pi}{b}]}-1}\right\}$$
$$= \frac{1}{2}\left\{\frac{0}{e^{j[(a-c)\frac{2\pi}{b}]}-1} + \frac{0}{e^{-j[(a-c)\frac{2\pi}{b}]}-1}\right\}$$
$$= 0 \quad (11)$$

Further, when the integral term in the third term on the right side of the above-mentioned equation (10) is rearranged using the series summation formula and Euler's formula on condition that that a−c≠0, there is obtained the following equation (12). That is, the third term on the right side of the equation (10) also becomes equal to 0:

$$\sum_{i=1}^{b} \sin\left[(a-c)(i-1)\frac{2\pi}{b}\right] = \sum_{i=0}^{b-1} \frac{1}{2}\left\{e^{j[(a-c)\frac{2\pi}{b}i]} - e^{-j[(a-c)\frac{2\pi}{b}i]}\right\}$$
$$= \frac{1}{2}\left\{\frac{e^{j[(a-c)\frac{2\pi}{b}b]}-1}{e^{j[(a-c)\frac{2\pi}{b}]}-1} - \frac{e^{-j[(a-c)\frac{2\pi}{b}b]}-1}{e^{-j[(a-c)\frac{2\pi}{b}]}-1}\right\}$$
$$= \frac{1}{2}\left\{\frac{e^{j[(a-c)2\pi]}-1}{e^{j[(a-c)\frac{2\pi}{b}]}-1} - \frac{e^{-j[(a-c)2\pi]}-1}{e^{-j[(a-c)\frac{2\pi}{b}]}-1}\right\}$$
$$= \frac{1}{2}\left\{\frac{0}{e^{j[(a-c)\frac{2\pi}{b}]}-1} - \frac{0}{e^{-j[(a-c)\frac{2\pi}{b}]}-1}\right\}$$
$$= 0 \quad (12)$$

From the above, when a−c≠0 holds, the magnetic flux $\Psi u$ of the magnetic pole passing through the U-phase coil via the soft magnetic material elements is expressed by the following equation (13):

$$\Psi u = \frac{b}{2} \cdot \psi f \cdot \cos[(a+c)\theta 2 - a\cdot\theta 1] \quad (13)$$

In this equation (13), if a ratio between the pole pair number a of magnetic poles and the pole pair number c of armature magnetic poles is defined as "a pole pair number ratio α", α=a/c holds, so that when the pole pair number ratio α is substituted into the equation (13), there is obtained the following equation (14):

$$\Psi u = \frac{b}{2} \cdot \psi f \cdot \cos[(\alpha+1)c\cdot\theta 2 - \alpha\cdot c\cdot\theta 1] \quad (14)$$

Furthermore, in this equation (14), if c·θ2=θe2 and c·θ1=θe1, there is obtained the following equation (15):

$$\Psi u = \frac{b}{2} \cdot \psi f \cdot \cos[(\alpha+1)\theta e2 - \alpha\cdot\theta e1] \quad (15)$$

In this equation, since θe2 is a value obtained by multiplying the rotational angular position θ2 of the soft magnetic material element with respect to the U-phase coil by the pole pair number c of armature magnetic poles, it represents the electrical angular position of the soft magnetic material element with respect to the U-phase coil. Further, since θe1 is a value obtained by multiplying the rotational angular position θ1 of the magnetic pole with respect to the U-phase coil by the pole pair number c of armature magnetic poles, it represents the electrical angular position of the magnetic pole with respect to the U-phase coil.

Further, since the electrical angular position of the V-phase coil leads that of the U-phase coil by an electrical angle 2π/3, a magnetic flux $\Psi v$ of the magnetic pole passing through the V-phase coil via the soft magnetic material elements is expressed by the following equation (16):

$$\Psi v = \frac{b}{2} \cdot \psi f \cdot \cos\left[(\alpha+1)\theta e2 - \alpha \cdot \theta e1 - \frac{2\pi}{3}\right] \quad (16)$$

Further, since the electrical angular position of the W-phase coil lags that of the U-phase coil by an electrical angle $2\pi/3$, a magnetic flux $\Psi w$ of the magnetic pole passing through the W-phase coil via the soft magnetic material elements is expressed by the following equation (17):

$$\Psi w = \frac{b}{2} \cdot \psi f \cdot \cos\left[(\alpha+1)\theta e2 - \alpha \cdot \theta e1 + \frac{2\pi}{3}\right] \quad (17)$$

Next, when the above-mentioned equations (15) to (17) are differentiated with respect to time, the following equations (18) to (20) are obtained:

$$\frac{d\Psi u}{dt} = -\frac{b}{2} \cdot \psi f \{[(\alpha+1)\omega e2 - \alpha \cdot \omega e1]\sin[(\alpha+1)\theta e2 - \alpha \cdot \theta e1]\} \quad (18)$$

$$\frac{d\Psi v}{dt} = -\frac{b}{2} \cdot \psi f \left\{[(\alpha+1)\omega e2 - \alpha \cdot \omega e1]\sin\left[(\alpha+1)\theta e2 - \alpha \cdot \theta e1 - \frac{2\pi}{3}\right]\right\} \quad (19)$$

$$\frac{d\Psi w}{dt} = \quad (20)$$
$$-\frac{b}{2} \cdot \psi f \left\{[(\alpha+1)\omega e2 - \alpha \cdot \omega e1]\sin\left[(\alpha+1)\theta e2 - \alpha \cdot \theta e1 + \frac{2\pi}{3}\right]\right\}$$

wherein $\omega e1$ denotes a value obtained by differentiating $\theta e1$ with respect to time, i.e. a value obtained by converting the angular velocity of the first rotor with respect to the stator to an electrical angular velocity (hereinafter referred to as "the first rotor electrical angular velocity), and $\omega e2$ denotes a value obtained by differentiating $\theta e2$ with respect to time, i.e. a value obtained by converting the angular velocity of the second rotor with respect to the stator to an electrical angular velocity (hereinafter referred to as "the second rotor electrical angular velocity).

In this case, magnetic fluxes of the magnet pole that directly pass through the U-phase to W-phase coils without via the soft magnetic material elements are very small, and hence influence thereof is negligible. Therefore, $d\Psi u/dt$ to $d\Psi w/dt$, which are values obtained by differentiating, with respect to time, the magnetic fluxes $\Psi u$ to $\Psi w$ of the magnetic pole, which pass through the U-phase to W-phase coils via the soft magnetic material elements, expressed by the equations (18) to (20), respectively, represent counter-electromotive force voltages (induced electromotive voltages), which are generated in the U-phase to W-phase coils as the magnetic pole and the soft magnetic material elements rotate with respect to the armature row.

Therefore, electric currents Iu, Iv and Iw, flowing through the U-phase, V-phase and W-phase coils, respectively, are expressed by the following equations (21), (22) and (23):

$$Iu = I \cdot \sin[(\alpha+1)\theta e2 - \alpha \cdot \theta e1] \quad (21)$$

$$Iv = I \cdot \sin\left[(\alpha+1)\theta e2 - \alpha \cdot \theta e1 - \frac{2\pi}{3}\right] \quad (22)$$

$$Iw = I \cdot \sin\left[(\alpha+1)\theta e2 - \alpha \cdot \theta e1 + \frac{2\pi}{3}\right] \quad (23)$$

wherein I represents the amplitude (maximum value) of each electric current flowing through each of the U-phase to W-phase coils.

Further, from the above equations (21) to (23), the electrical angular position $\theta mf$ of a vector of the rotating magnetic field with respect to the U-phase coil is expressed by the following equation (24), and the electrical angular velocity $\omega mf$ of the rotating magnetic field with respect to the U-phase coil (hereinafter referred to as "the magnetic field electrical angular velocity) is expressed by the following equation (25):

$$\theta mf=(\alpha+1)\theta e2-\alpha \cdot \theta e1 \quad (24)$$

$$\omega mf=(\alpha+1)\omega e2-\alpha \cdot \omega e1 \quad (25)$$

Further, the mechanical output (motive power) W, which is output to the first and second rotors by the flowing of the currents Iu to Iw through the U-phase to W-phase coils, is represented, provided that a reluctance-associated portion is excluded therefrom, by the following equation (26):

$$W = \frac{d\Psi u}{dt} \cdot Iu + \frac{d\Psi v}{dt} \cdot Iv + \frac{d\Psi w}{dt} \cdot Iw \quad (26)$$

When the above-mentioned equations (18) to (23) are substituted into this equation (26) and the resulting equation is rearranged, there is obtained the following equation (27):

$$W = -\frac{3 \cdot b}{4} \cdot \psi f \cdot I[(\alpha+1)\omega e2 - \alpha \cdot \omega e1] \quad (27)$$

On the other hand, the relationship between this mechanical output W, the above-mentioned first and second rotor transmission torques T1 and T2, and the first and second rotor electrical angular velocities $\omega e1$ and $\omega e2$ is expressed by the following equation (28):

$$W=T1 \cdot e1+T2 \cdot \omega e2 \quad (28)$$

As is clear from the above equations (27) and (28), the first and second rotor transmission torques T1 and T2 are expressed by the following equations (29) and (30):

$$T1 = \alpha \cdot \frac{3 \cdot b}{4} \cdot \psi f \cdot I \quad (29)$$

$$T2 = -(\alpha+1) \cdot \frac{3 \cdot b}{4} \cdot \psi f \cdot I \quad (30)$$

Further, since the electric power supplied to the armature row and the mechanical output W are equal to each other, provided that losses are ignored, from the relationship between the equation (25) and the equation (27), the above-mentioned driving equivalent torque Te is expressed by the following equation (31):

$$Te = \frac{3 \cdot b}{4} \cdot \psi f \cdot I \quad (31)$$

Further, by using the above equations (29) to (31), there is obtained the following equation (32):

$$Te = \frac{T1}{\alpha} = \frac{-T2}{(\alpha+1)} \qquad (32)$$

In this case, the relationship between the three torques Te, T1, and T2, expressed by the equation (32), and the relationship between the three electrical angular velocities ωmf, ωe1, and ωe2, expressed by the above-mentioned equation (25), are the same as the relationship between the rotational speeds and the relationship between the torques in the sun gear, the ring gear and the carrier of a planetary gear unit. Further, as described above, on condition that b=a+c and a−c≠0 hold, there hold the relationship between the electrical angular velocities, expressed by the equation (25), and the relationship between the torques, expressed by the equation (32). Here, assuming that the number of the magnetic poles is p and that of the armature magnetic poles is q, p=2a and q=2c hold, and hence the above condition b=a+c is can be rewritten as by b=(p+q)/2, i.e. b/q=(1+p/q)/2. Further, if the pole number ratio m is defined as m=p/q, b/q=(1+m)/2 is obtained.

From the above, the fact that the above conditional formula of b=a+c is satisfied corresponds to the fact that the ratio between the number of armature magnetic poles, the number of magnetic poles, and the number of soft magnetic material elements q:p:b is 1:m:(1+m)/2. Further, the fact that the above condition of a−c≠0 is satisfied represents that q≠p, i.e. the pole number ratio m is a positive number other than 1. Therefore, according to the first rotating machine of the present invention, since the ratio between the number of armature magnetic poles, the number of magnetic poles, and the number of soft magnetic material elements is set to 1:m:(1+m)/2 (provided m≠1), and hence there hold the relationship between the electrical angular velocities, expressed by the equation (25), and the relationship between the torques, expressed by the equation (32), whereby it is possible to operate the first rotating machine by the same operating characteristics as those of the sun gear, the ring gear and the carrier of the planetary gear unit (hereinafter referred to as "the three elements of the planetary gear unit"). In this case, the pole pair number ratio α is α=a/c=(p/2)/(q/2)=p/q, and hence α=m holds.

As described above, According to the power plant of the present invention, it is only required to provide one soft magnet material element row in the first rotating machine, and hence it is possible to make the first rotating machine more compact in size and reduce the manufacturing costs thereof, by corresponding extents. As a result, it is possible to make the power plant itself more compact in size and reduce the manufacturing costs of the same. Furthermore, as is clear from reference to the above-mentioned equations (25) and (32), depending on the configuration of the pole pair number ratio α, i.e. the pole number ratio m, it is possible to freely set the relationship between the three electrical angular velocities ωmf, ωe1, and ωe2, and also the relationship between the three torques Te, T1, and T2. This applies not only when the rotating magnetic field is being generated by supplying electric power, but also similarly when the rotating magnetic field is being generated by electric power generation. In addition to this, as is clear from the equation (32), as the pole pair number ratio α is larger, the driving equivalent torque Te becomes smaller with respect to the first and second rotor transmission torques T1 and T2. This also applies similarly when electric power is being generated. Therefore, by setting the pole pair number ratio α to a larger value, it is possible to make the stator more compact in size, and in turn it is possible to further make the power plant more compact in size. For the above-described reasons, it is possible to improve the degree of freedom in design of the first rotating machine, i.e. the power plant.

Further, based on the equation (25), the relationship between the three electrical angular velocities ωmf, ωe1, and ωe2 can be expressed e.g. as shown in FIG. 31. FIG. 31 is a so-called velocity nomograph, and in this velocity nomograph, vertical lines which intersect with a horizontal line from a value of 0 on a vertical axis are for representing respective rotational speeds of parameters, and distances between white circles on the respective vertical lines and the horizontal line correspond to the respective rotational speeds of the parameters.

As is clear from reference to FIG. 31, as the pole pair number ratio α is smaller, the distance between a vertical line representing the magnetic field electrical angular velocity ωmf and a vertical line representing the second rotor electrical angular velocity ωe2 becomes smaller, and hence a ratio (Δω2/Δω1) of a difference Δω2 between the second rotor electrical angular velocity ωe2 and the magnetic field electrical angular velocity ωmf to a difference Δω1 between the first rotor electrical angular velocity ωe1 and the second rotor electrical angular velocity ωe2 becomes smaller. Therefore, in a case where by setting the pole pair number ratio α to a smaller value, the second rotor electrical angular velocity ωe2 exceeds the first rotor electrical angular velocity ωe1, it is possible to prevent driving efficiency and electric power generation efficiency from being lowered due to losses caused by the magnetic field electrical angular velocity ωmf becoming too high. It should be noted that the same advantageous effects can be obtained also when the number of phases of coils of the plurality of armatures is other than the aforementioned 3 in the first rotating machine.

The invention as claimed in claim 2 is a power plant 1, 1A, 1B as claimed in claim 1, wherein the first rotor 14 of the first rotating machine 10 is mechanically connected to the driven part (front wheels 4), and the second rotor 15 is mechanically connected to the heat engine (engine 3).

According to the this power plant, it is possible to realize a power plant which uses the heat engine and the first rotating machine as motive power sources. Further, as described above, the relationship between the three electrical angular velocities and the relationship between the three torques are the same as the relationships between the speeds and torques in the three elements of the planetary gear unit, and hence it is possible to transmit the motive power from the heat engine to the second rotor, the first rotor, and the driven part in the mentioned order, and change the state of transmission thereof.

The invention as claimed in claim 3 is a power plant 1B as claimed in claim 2, further comprising a brake device (electromagnetic brake 55) for braking rotation of the second rotor 15.

According to this power plant, as described above, the relationship between the three electrical angular velocities and the relationship between the three torques in the first rotating machine are the same as the relationships between the speeds and torques in the three elements of the planetary gear unit, and hence e.g. when the heat engine is at rest, if the rotation of the second rotor is braked by the brake device and electric power is supplied to the stator of the first rotating machine to thereby the generate magnetic field, the electric power supplied to the stator is converted to motive power and then input to the first rotor, whereby the first rotor is driven for rotation. This makes it possible to drive the driven part.

The invention as claimed in claim 4 is a power plant 1 as claimed in claim 2, further comprising a second rotating machine 20 including a rotating shaft (output shaft 13) mechanically connected to the driven part (front wheels 4) and the first rotor 14.

According to this power plant, the power plant further includes the second rotating machine having the rotating shaft mechanically connected to the driven part and the first rotor, and hence by driving this second rotating machine, it is possible to transmit motive power from the second rotating machine to the driven part in addition to motive power from the heat engine and the first rotating machine, whereby it is possible to drive the driven part by a driving force larger than that from the power plant according to claim 2.

The invention as claimed in claim 5 is a power plant 1 as claimed in claim 4, further comprising a transmission 50 for performing a speed change operation between the first rotor 14 of the first rotating machine 10 and the rotating shaft (output shaft) of the second rotating machine 20, and the driven part (front wheels 4).

According to the this power plant, the power plant further includes the transmission which performs the speed change operation between the first rotor of the first rotating machine and the rotating shaft of the second rotating machine, and the driven part, and hence by properly setting the transmission ratio of the transmission, it is possible to make the first rotating machine and the second rotating machine more compact in size and lower the rotational speeds thereof. For example, by setting the speed reducing ratio of the transmission to a large value, it is possible to set a torque to be transmitted to the transmission via the first rotating machine and the second rotating machine to a small value, whereby it is possible to make the first and second rotating machines more compact in size.

The invention as claimed in claim 6 is a power plant as claimed in claim 4, further comprising a transmission 51 for performing a speed change operation between the second rotor 15 of the first rotating machine 10 and the heat engine (engine 3).

According to the this power plant, the power plant further includes the transmission which performs the speed change operation between the second rotor of the first rotating machine and the heat engine, and hence it is possible to transmit motive power from the heat engine to the first rotating machine while changing the speed thereof.

The invention as claimed in claim 7 is a power plant as claimed in claim 4, wherein the rotating shaft (output shaft 13) of the second rotating machine 20 is mechanically connected to the first rotor 14 of the first rotating machine 10 and the driven part (front wheels 4) via a transmission 52, and wherein the transmission 52 performs a speed change operation between the rotating shaft (output shaft 13) of the second rotating machine 20, and the first rotor 14 of the first rotating machine 10 and the driven part (front wheels 4).

According to the this power plant, the rotating shaft of the second rotating machine is mechanically connected to the first rotor of the first rotating machine and the driven part via the transmission, and the speed change operation between the rotating shaft of the second rotating machine, and the first rotor of the first rotating machine and the driven part is performed by the transmission, and hence by properly setting the transmission ratio of the transmission, it is possible to make the second rotating machine more compact in size and lower the rotational speed thereof. For example, by setting the speed reducing ratio of the transmission to a large value, it is possible to set the torque to be transmitted from the second rotating machine to the transmission to a small value, whereby it is possible to make the second rotating machine more compact in size.

The invention as claimed in claim 8 is a power plant 1A as claimed in claim 2, further comprising a second driven part (rear wheels 5) which is different from the driven part (front wheels 4), and a second rotating machine 20 mechanically connected to the second driven part (rear wheels 5).

According to the this power plant, by operating the first rotating machine and the second rotating machine, it is possible to separately drive the driven part and the second driven part.

The invention as claimed in claim 9 is a power plant 1A as claimed in claim 8, further comprising a transmission 53 for performing a speed change operation between the second rotor 15 of the first rotating machine 10 and the heat engine (engine 3).

According to the this power plant, the power plant further comprises the transmission for performing the speed change operation between the second rotor of the first rotating machine and the heat engine, and hence it is possible to transmit motive power from the heat engine to the first rotating machine while changing the speed thereof.

The invention as claimed in claim 10 is a power plant 1A as claimed in claim 8 or 9, further comprising a transmission 54 for performing a speed change operation between the second rotating machine 20 and the second driven part (rear wheels 5).

According to the this power plant, the power plant further comprises the transmission for performing the speed change operation between the second rotating machine and the second driven part, and hence by properly setting the transmission ratio of this transmission, it is possible to make the second rotating machine more compact in size and lower the rotational speed thereof. For example, by setting the speed reducing ratio of the transmission to a large value, it is possible to set the torque to be transmitted from the second rotating machine to the transmission to a small value, whereby it is possible to make the second rotating machine more compact in size.

The invention as claimed in claim 11 is a power plant 1C, 1D as claimed in claim 1, wherein the first rotor 14 of the first rotating machine 10 is mechanically connected to the heat engine (engine 3), and the second rotor 15 is mechanically connected to the driven part (front wheels 4).

According to the this power plant, it is possible to realize a power plant which uses the heat engine and the first rotating machine as motive power sources. Further, as described above, the relationship between three electrical angular velocities and the relationship between the three torques in the first rotating machine are the same as the relationships between the rotational speeds and torques in the three elements of a planetary gear unit, and hence it is possible to transmit motive power from the heat engine to the first rotor, the second rotor, and the driven part in the mentioned order, and change the state of transmission thereof.

The invention as claimed in claim 12 is a power plant 1C as claimed in claim 11, further comprising a brake device (second rotating machine 20) for braking rotation of the first rotor 14.

According to the this power plant, as described above, the relationship between the three electrical angular velocities and the relationship between the three torques in the first rotating machine are quite the same as the relationships between the rotational speeds and torques in the three elements of the planetary gear unit, and hence, for example, when the heat engine is at rest, if the rotation of the first rotor is braked by the brake device and electric power is supplied to the stator of the first rotating machine to thereby generate the rotating magnetic field, the electric power supplied to the stator is converted to motive power and then input to the second rotor, whereby the second rotor is driven for rotation. This makes it possible to drive the driven part.

The invention as claimed in claim 13 is a power plant 1C as claimed in claim 11, further comprising a second rotating machine 20 including a rotating shaft (output shaft 12) mechanically connected to the heat engine (engine 3) and the first rotor 14.

According to the this power plant, the power plant further comprises the second rotating machine having the rotating shaft mechanically connected to the heat engine and the first rotor, and hence by operating the second rotating machine, it is possible to transmit motive power from the second rotating machine to the driven part in addition to motive power from the heat engine and the first rotating machine, whereby it is possible to drive the driven part by a driving force larger than that of the power plant as recited in claim 11.

The invention as claimed in claim 14 is a power plant 1C as claimed in claim 13, further comprising a clutch 56 for mechanically connecting or disconnecting between the first rotor 14 of the first rotating machine 10 and the rotating shaft (output shaft 12) of the second rotating machine 20, and the heat engine (engine 3).

According to the this power plant, the power plant further comprises the clutch which mechanically connects or disconnects between the first rotor of the first rotating machine and the rotating shaft of the second rotating machine, and the heat engine, and hence, when the heat engine is at rest, if the clutch is actuated to a disconnection size, and at least one of the first rotating machine and the second rotating machine is subjected to powering operation, it is possible to transmit motive power from the first rotating machine and/or the second rotating machine to the driven part in the state where the heat engine is at rest. This makes it possible to drive the driven part.

The invention as claimed in claim 15 is a power plant 1C as claimed in claim 13, further comprising a transmission 57 for performing a speed change operation between the second rotor 15 of the first rotating machine 10 and the driven part (front wheels 4).

According to the this power plant, the power plant further comprises the transmission for performing the speed change operation between the second rotor of the first rotating machine and the driven part, and hence by properly setting the transmission ratio of the transmission, it is possible to make the first rotating machine and the second rotating machine more compact in size and lower the rotational speeds thereof. For example, by setting the speed reducing ratio of the transmission to a large value, it is possible to set the torque to be transmitted to the transmission via each of the first rotating machine and the second rotating machine to a smaller value, whereby it is possible to make the first and second rotating machines more compact in size.

The invention as claimed in claim 16 is a power plant 1C as claimed in claim 13, further comprising a transmission 58 for performing a speed change operation between the rotating shaft (input shaft 12) of the second rotating machine 20 and the heat engine (engine 3).

According to the this power plant, the power plant further comprises the transmission for performing the speed change operation between the rotating shaft of the second rotating machine and the heat engine, and hence it is possible to transmit motive power from the heat engine to the second rotating machine while changing the speed thereof.

The invention as claimed in claim 17 is a power plant 1D as claimed in claim 11, further comprising a second driven part (rear wheels 5) which is different from the driven part, and a second rotating machine 20 mechanically connected to the second driven part (rear wheels).

According to this power plant, it is possible to obtain the same advantageous effects as provided by the invention according to claim 8.

BRIEF DESCRIPTION OF DRAWINGS

FIG. 15 A diagram showing a variation of the arrangement of the first rotating machine and the second rotating machine.

FIG. 17 A diagram showing an example in which a transmission is provided in the power plant according to the first embodiment.

FIG. 19 A diagram showing still another example in which a transmission is provided in the power plant according to the first embodiment.

DESCRIPTION OF EMBODIMENTS

Figure 1:
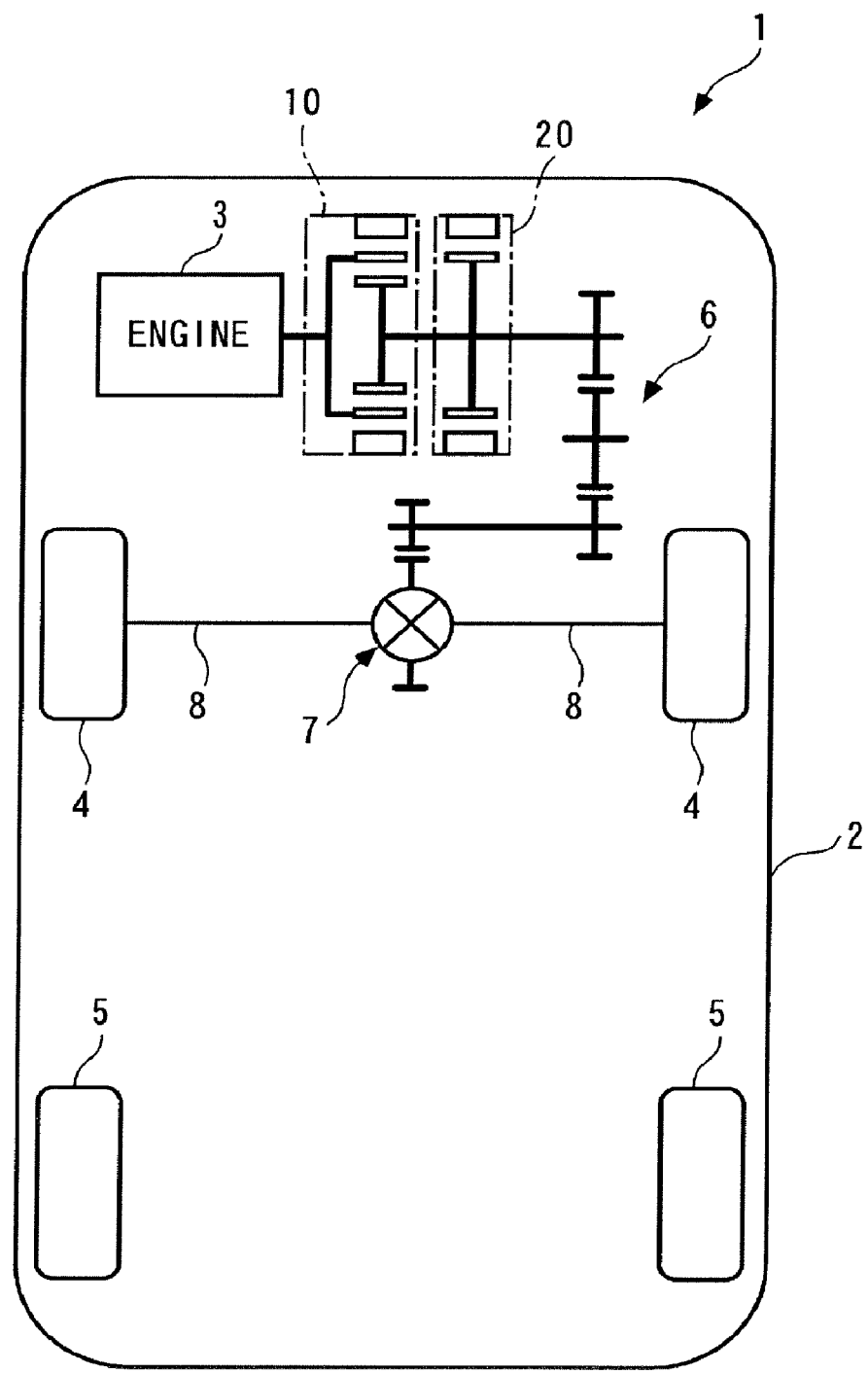
FIG. 1 A diagram showing the general arrangement of a power plant according to a first embodiment of the present invention and a hybrid vehicle to which is applied the power plant.
Figure 2:
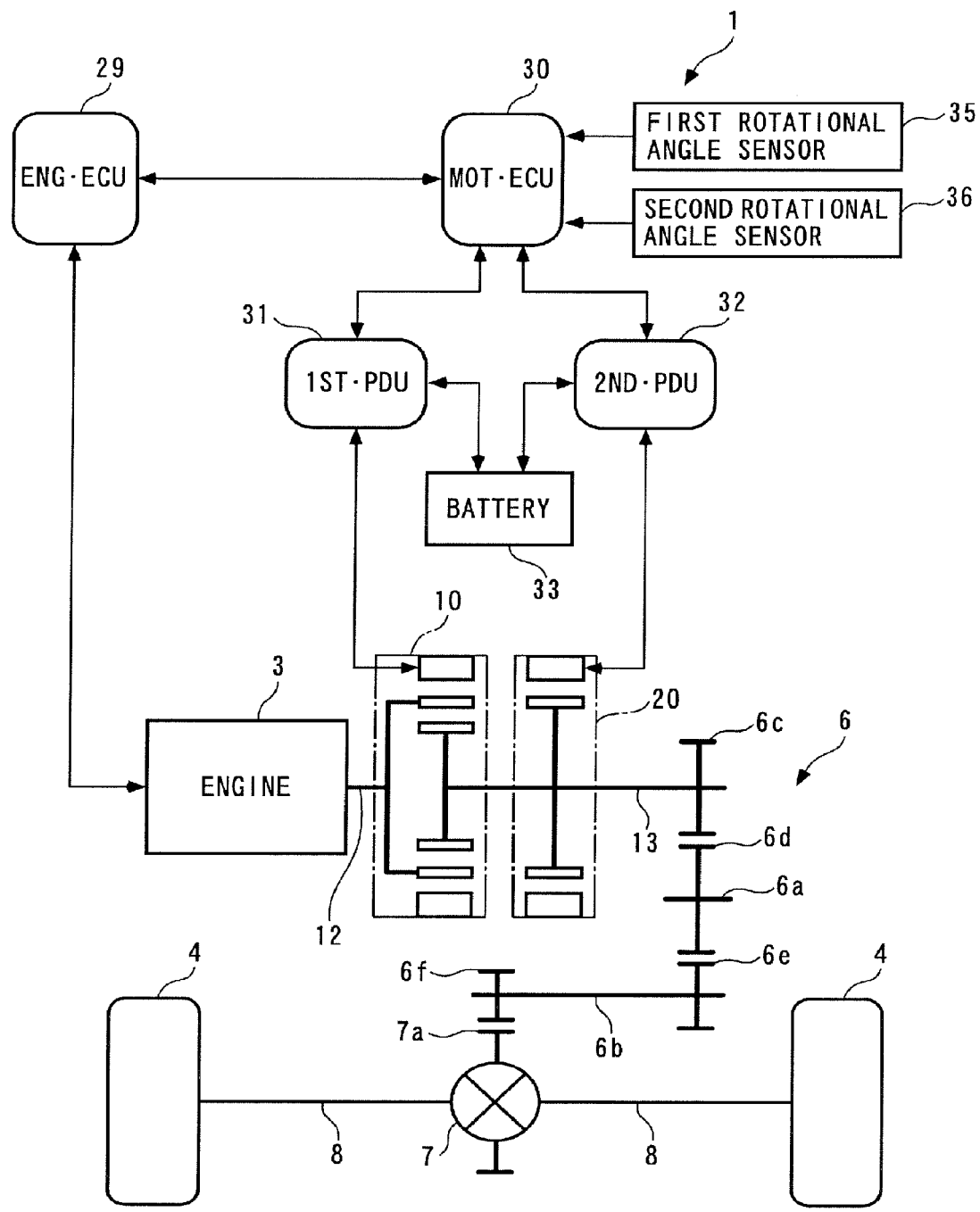
FIG. 2 A diagram showing the general arrangement of the power plant according to the first embodiment.

Hereafter, a power plant according to a first embodiment of the present invention will be described with reference to the drawings. It should be noted that in the following description, the left side and the right side as viewed in FIGS. 1 to 3 will be referred to as "left" and "right". As shown in FIGS. 1 and 2, the power plant 1 according to the present embodiment is for driving left and right front wheels 4 and 4 of a hybrid vehicle (hereinafter referred to as "the vehicle") 2, and includes an engine 3, a first rotating machine 10, and a second rotating machine 20, as motive power sources.

In the vehicle 2, the engine 3 is connected to the first rotating machine 10, and the first rotating machine 10 and the second rotating machine 20 are connected to the left and right front wheels 4 and 4 by a gear mechanism 6, a differential gear mechanism 7, and left and right drive shafts 8 and 8. Thus, as described hereinafter, the motive power of the engine 3, and the motive powers of the first rotating machine 10 and the second rotating machine 20 are transmitted to the front wheels 4 and 4. Further, the vehicle 2 includes left and right rear wheels 5 and 5, which are idler wheels. It should be noted that in the present embodiment, the engine 3 corresponds to a heat engine, and the front wheels 4 correspond to a driven part, respectively.

The engine 3 is a multicylinder internal combustion engine powered by gasoline, and the operating conditions thereof are controlled by an ENG•ECU 29, referred to hereinafter. The two rotating machines 10 and 20 and the gear mechanism 6 are all housed in a drive system housing (not shown) fixed to a cylinder block (not shown) of the engine 3.

The gear mechanism 6 comprises first and second gear shafts 6a and 6b parallel to an output shaft 13, described hereinafter, of the first rotating machine 10, the output shaft 13, and four gears 6c to 6f arranged on the two gear shafts 6a and 6b. The gear 6c is concentrically fixed to an right end of the output shaft 13, and is in constant mesh with the gear 6d. The gear 6d is concentrically and rotatably fitted on the first gear shaft 6a, and is in constant mesh not only with the above gear 6c but also with the gear 6e concentrically fixed to a right end of the second gear shaft 6b.

Further, the gear 6f is concentrically fixed to a left end of the second gear shaft 6b, and is in constant mesh with a gear 7a of the differential gear mechanism 7. With the above arrangement, the rotation of the output shaft 13 is transmitted to the differential gear mechanism 7 via the gear mechanism 6.

Figure 3:
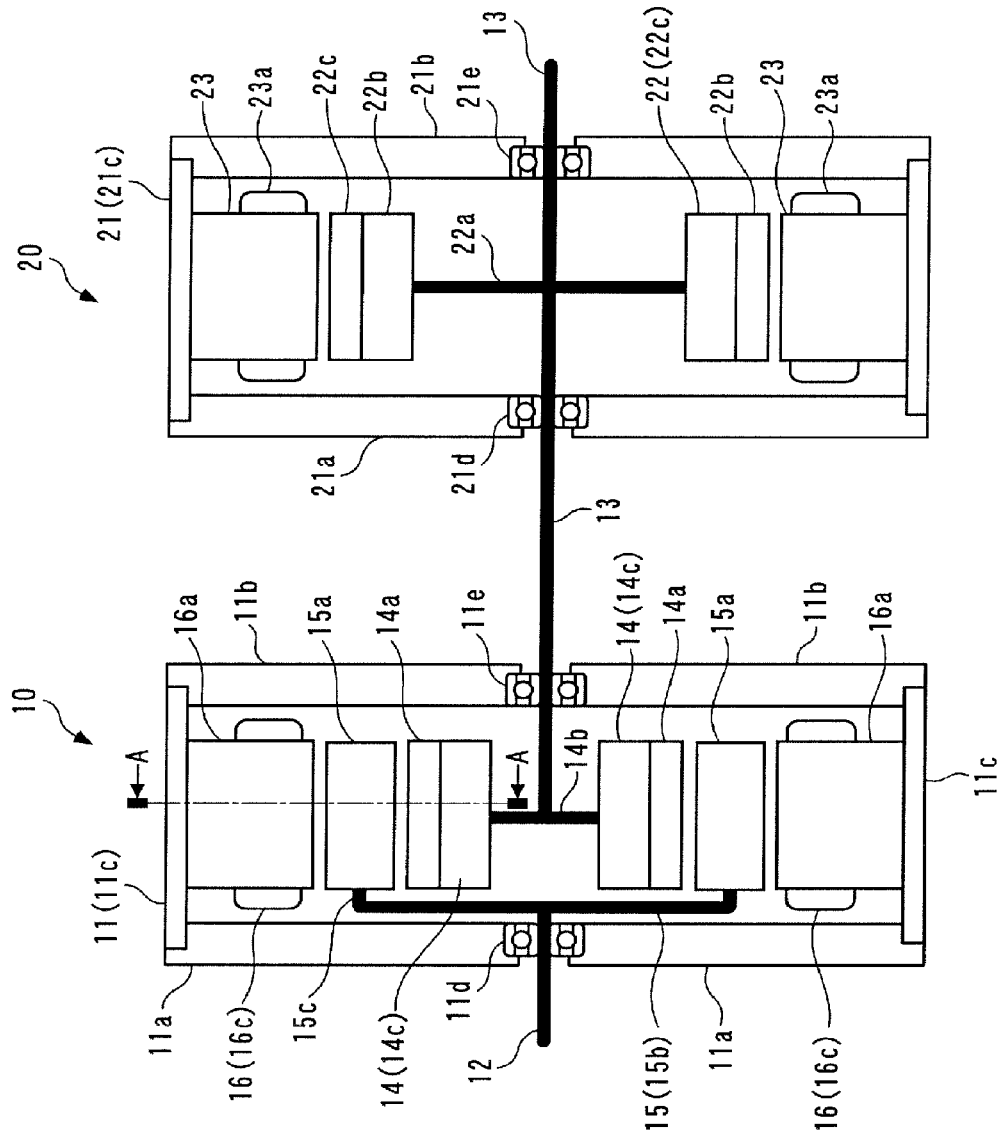
FIG. 3 A cross-sectional view schematically showing the general arrangement of a first rotating machine and a second rotating machine.
Figure 4:
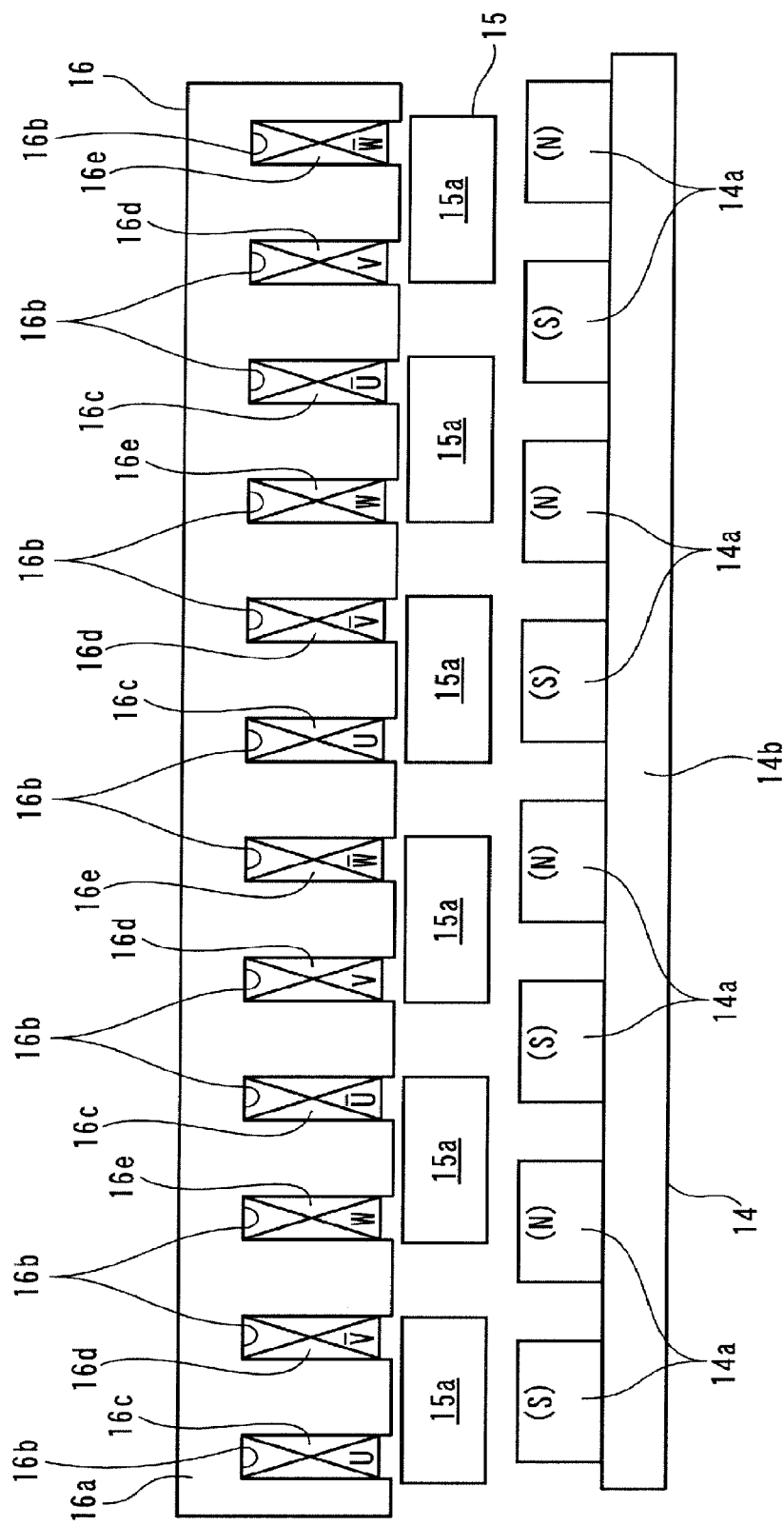
FIG. 4 A view schematically showing part of an annular cross-section taken along A-A of FIG. 3 along a circumferential direction, in a linear representation.

Next, a description will be given of the first rotating machine 10 and the second rotating machine 20 with reference to FIGS. 3 and 4. FIG. 3 schematically shows a cross-sectional arrangement of the first rotating machine 10 and the second rotating machine 20. FIG. 4 schematically shows part of an annular cross-section taken along A-A of FIG. 3 along a circumferential direction, in a linear representation. It should be noted that in the figures, hatching in cross-sections are omitted for ease of understanding, and this also applies to FIG. 6 and other figures, referred to hereinafter.

First, a description will be given of the first rotating machine 10. As shown in FIG. 3, the first rotating machine 10 comprises a casing 11 fixed to the above-mentioned drive system housing, an input shaft 12 having a left end thereof directly connected to a crankshaft of the engine 3, the output shaft 13 (rotating shaft) concentric with the input shaft 12, a first rotor 14 housed in the casing 11, for rotation in unison with the output shaft 13, a second rotor 15 housed in the casing 11, for rotation in unison with the input shaft 12, and a stator 16 fixed to the inner peripheral surface of a peripheral wall 11c of the casing 11. The first rotor 14, the second rotor 15, and the stator 16 are arranged concentrically with each other from the radially inner side toward the radially outer side.

The casing 11 comprises left and right side walls 11a and 11b, and the peripheral wall 11c which has a hollow cylindrical shape and is fixed to the outer peripheral ends of the left and right side walls 11a and 11b. Bearings 11d and 11e are mounted in the central portions of the left and right side walls 11a and 11b, respectively, and the input shaft 12 and the output shaft 13 are rotatably supported by the bearings 11d and 11e, respectively. Further, the axial motions of the two shafts 12 and 13 are restricted by thrust bearings, not shown, etc.

The first rotor 14 comprises a turntable portion 14b concentrically fixed to a left end of the output shaft 13, and a hollow cylindrical ring portion 14c fixed to an outer end of the turntable portion 14b. The ring portion 14c is formed of a soft magnetic material, and on an outer peripheral surface thereof, a permanent magnet row is disposed along the circumferential direction in a manner opposed to an iron core 16a of the stator 16. The permanent magnet row is formed by eight permanent magnets 14a (magnet poles), as shown in FIG. 4.

The permanent magnets 14a are arranged at equally-spaced intervals such that each two adjacent ones of the permanent magnets 14a have polarities different from each other, and each permanent magnet 14a has an axial length thereof set to a predetermined. It should be noted that in FIGS. 4, 6, and other figures, referred to hereinafter, the N pole and S pole of each permanent magnet 14a are represented by (N) and (S), respectively, and components (e.g. the casing 11) other than the essential ones are omitted from illustration for ease of understanding.

On the other hand, the stator 16 is for generating a rotating magnetic field, and includes the iron core 16a, and U-phase, V-phase and W-phase coils 16c, 16d, and 16e (see FIG. 4) wound on the iron core 16a. The iron core 16a, which has a hollow cylindrical shape formed by laminating a plurality of steel plates, is fixed to the casing 11, and has an axial length thereof set to the same length as the permanent magnets 14a.

Further, the inner peripheral surface of the iron core 16a is formed with twelve slots 16b. The slots 16b extend in the axial direction, and are arranged at equally-spaced intervals in the direction of circumference of the first rotor 14 (hereinafter simply referred to as "circumferentially" or "in the circumferential direction"). It should be noted that in the present embodiment, the iron core 16a and the U-phase to W-phase coils 16c to 16e correspond to an armature and an armature row, respectively.

Further, the U-phase to W-phase coils 16c to 16e are wound in the slots 16b by distributed winding (wave winding), and are electrically connected to a battery 33, referred to hereinafter, via a 1ST•PDU 31, referred to hereinafter.

In the stator 16 constructed as described above, when electric power is supplied from the battery 33, to thereby cause electric current to flow through the U-phase to W-phase coils 16c to 16e, or when electric power is generated, as described hereinafter, four magnetic poles are generated at ends of the iron core 16a toward the first rotor 14 at circumferentially equally-spaced intervals (see FIG. 6), and a rotating magnetic field caused by the magnetic poles rotates in the circumferential direction. Hereinafter, the magnetic poles generated on the iron core 16a are referred to as the "armature magnetic poles". In this case, each two armature magnetic poles which are circumferentially adjacent to each other have polarities different from each other. It should be noted that in FIG. 6 and other figures, referred to hereinafter, the N pole and S pole of the armature magnetic poles are represented by (N) and (S), similarly to the N pole and S pole of each permanent magnet 14a.

On the other hand, the second rotor 15 comprises a turntable portion 15b fixed to a right end of the input shaft 12, a supporting portion 15c which extends from an outer end of the turntable portion 15b toward the second rotating machine 20, and a soft magnetic material core row fixed to the supporting portion 15c, which is disposed between the permanent magnet row of the first rotor 14 and the iron core 16a of the stator 16. The soft magnetic material core row is formed by six soft magnetic material cores 15a formed of a soft magnetic material (e.g. laminate of steel plates).

The soft magnetic material cores 15a are arranged at circumferentially equally-spaced intervals, and are spaced from the permanent magnets 14a and the iron core 16a by predetermined distances. Further, the soft magnetic material core 15a has an axial length thereof set to the same length as the permanent magnets 14a and the iron core 16a of the stator 16.

Now, a description will be given of the operating principles of the first rotating machine 10 constructed as described above. As described hereinabove, the first rotating machine 10 includes the four armature magnetic poles, the eight magnetic poles of the permanent magnets 14a (hereinafter referred to as the "magnet magnetic poles"), and the six soft magnetic material cores 15a, and hence the ratio between the number of the armature magnetic poles, the number of the magnet magnetic poles, and the number of the soft magnetic material cores 15a (hereinafter referred to as the "element number ratio") is set to 4:8:6=1:2:1.5=1:2:(1+2)/2. This element number ratio corresponds to the one assumed when the aforementioned pole number ratio m (=pole pair number ratio α) is set to 2, and hence, as is clear from the aforementioned equations (18) to (20), when the first rotor 14 and the second rotor 15 rotate with respect to the stator 16, a counter-electromotive force voltage generated along therewith by the U-phase coil 16c (hereinafter referred to as the "U-phase counter-electromotive force voltage Vcu"), a counter-electromotive force voltage generated along therewith by the V-phase coil 16d (hereinafter referred to as the "V-phase counter-electromotive force voltage Vcv"), and a counter-electromotive force voltage generated along therewith by the W-phase coil 16e (hereinafter referred to as the "W-phase counter-electromotive force voltage Vcw") are expressed by the following equations (33), (34) and (35).

$$Vcu = -3 \cdot \psi F[(3 \cdot \omega ER2 - 2 \cdot \omega ER1)\sin(3 \cdot \theta ER2 - 2 \cdot \theta ER1)] \qquad (33)$$

$$Vcv = -3 \cdot \psi F\left[(3 \cdot \omega ER2 - 2 \cdot \omega ER1)\sin\left(3 \cdot \theta ER2 - 2 \cdot \theta ER1 - \frac{2\pi}{3}\right)\right] \qquad (34)$$

$$Vcw = -3 \cdot \psi F\left[(3 \cdot \omega ER2 - 2 \cdot \omega ER1)\sin\left(3 \cdot \theta ER2 - 2 \cdot \theta ER1 + \frac{2\pi}{3}\right)\right] \qquad (35)$$

In these equations, $\phi F$ represents the maximum value of magnetic fluxes of the magnet magnetic poles. Further, $\theta ER1$ represents a first rotor electrical angle, which is a value obtained by converting a rotational angle position of a specific permanent magnet 14a of the first rotor 14 with respect to a specific U-phase coil 16c (hereinafter referred to as the "reference coil") to an electrical angular position. More specifically, the first rotor electrical angle $\theta ER1$ is a value obtained by multiplying the rotational angle position of the specific permanent magnet 14a by a pole pair number of the armature magnetic poles, i.e. a value of 2. Further, $\theta ER2$ represents a second rotor electrical angle, which is a value obtained by converting a rotational angle position of a specific soft magnetic material core 15a of the second rotor 15 with respect to the aforementioned reference coil to an electrical angular position. More specifically, the second rotor electrical angle $\theta ER2$ is a value obtained by multiplying the rotational angle position of this specific soft magnetic material core 15a by a pole pair number (value of 2) of the armature magnetic poles.

Further, $\omega ER1$ in the equations (33) to (35) represents a first rotor electrical angular velocity which is a value obtained by differentiating $\theta ER1$ with respect to time, i.e. a value obtained by converting an angular velocity of the first rotor 14 with respect to the stator 16 to an electrical angular velocity. Furthermore, $\omega ER2$ represents a second rotor electrical angular velocity which is a value obtained by differentiating $\theta ER2$ with respect to time, i.e. a value obtained by converting an angular velocity of the second rotor 15 with respect to the stator 16 to an electrical angular velocity.

Further, as for the first rotating machine 10, the element number ratio is set as mentioned above, and hence, as is clear from the aforementioned equations (21) to (23), a current flowing through the U-phase coil 16c (hereinafter referred to as the "U-phase current Iu"), a current flowing through the V-phase coil 16d (hereinafter referred to as the "V-phase current Iv"), and a current flowing through the W-phase coil 16e (hereinafter referred to as the "W-phase current Iw") are expressed by the following equations (36), (37) and (38), respectively.

$$Iu = I \cdot \sin(3 \cdot \theta ER2 - 2 \cdot \theta ER1) \tag{36}$$

$$Iv = I \cdot \sin\left(3 \cdot \theta ER2 - 2 \cdot \theta ER1 - \frac{2\pi}{3}\right) \tag{37}$$

$$Iw = I \cdot \sin\left(3 \cdot \theta ER2 - 2 \cdot \theta ER1 + \frac{2\pi}{3}\right) \tag{38}$$

In these equations (36) to (38), I represents the amplitude (maximum value) of each electric current flowing through the U-phase to W-phase coils 16c to 16e.

Furthermore, as for the first rotating machine 10, the element number ratio is set as mentioned above, and hence, as is clear from the aforementioned equations (24) and (25), the electrical angular position of a vector of the rotating magnetic field of the stator 16 with respect to the reference coil (hereinafter referred to as the "magnetic field electrical angular position") θMFR is expressed by the following equation (39), and the electrical angular velocity of the rotating magnetic field with respect to the stator 16 (hereinafter referred to as the "magnetic field electrical angular velocity") ωMFR is expressed by the following equation (40):

$$\theta MFR = 3 \cdot \theta ER2 - 2 \cdot \theta ER1 \tag{39}$$

$$\omega MFR = 3 \cdot \omega ER2 - 2 \cdot \omega ER1 \tag{40}$$

Figure 5:
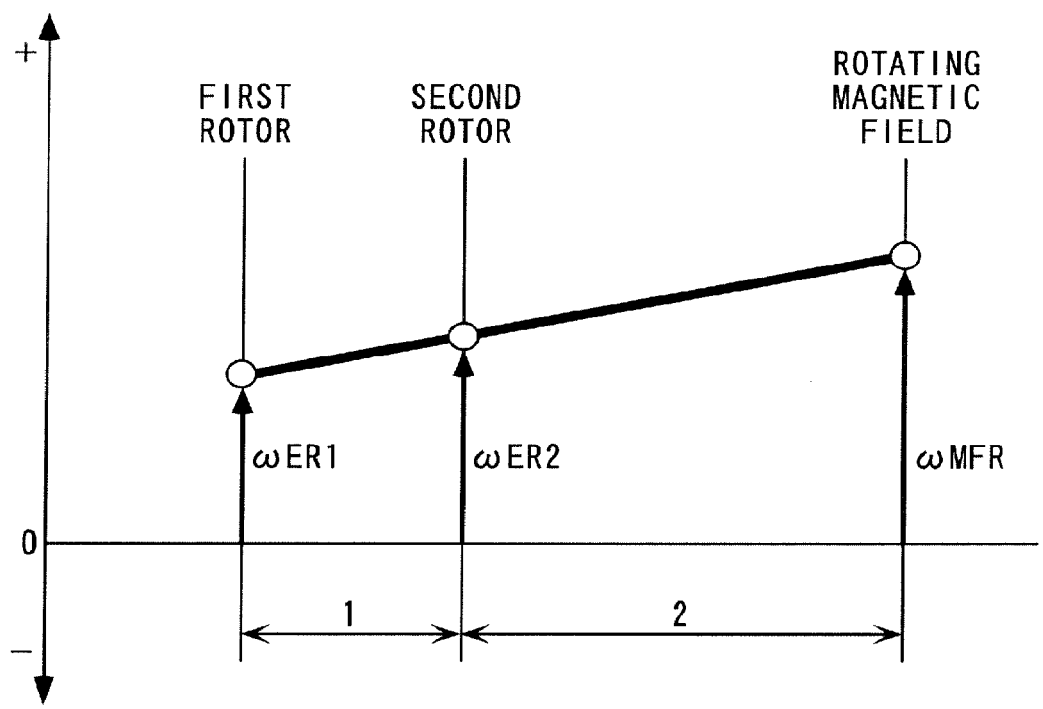
FIG. 5 A velocity nomograph illustrating an example of the relationship between a magnetic field electrical angular velocity ωMFR, and first and second rotor electrical angular velocities ωER1 and ωER2.

From the above, as for the first rotating machine 10, the relationship between the magnetic field electrical angular velocity ωMFR, the first rotor electrical angular velocity ωER1, and the second rotor electrical angular velocity ωER2 is illustrated e.g. as in FIG. 5.

Further, assuming that a torque equivalent to electric power supplied to the stator 16 and the magnetic field electrical angular velocity ωMFR is a driving equivalent torque TSE, as is clear from the aforementioned pole number ratio and the aforementioned equation (32), the relationship between the driving equivalent torque TSE, a torque transmitted to the first rotor 14 (hereinafter referred to as the "first rotor transmission torque") TR1, and a torque transmitted to the second rotor 15 (hereinafter referred to as the "second rotor transmission torque") TR2 is expressed by the following equation (41):

$$TSE = \frac{TR1}{2} = \frac{-TR2}{3} \tag{41}$$

The relationship of the three electrical angular velocities ωMFR, ωER1, and ωER2, expressed by the equation (40), and the relationship between the three torques TSE, TR1, and TR2, expressed by the equation (41) are the same as the relationship between the rotational speed of a sun gear, that of a ring gear, and that of a carrier of a planetary gear unit (hereinafter referred to as "the three elements of the planetary gear unit") having a gear ratio between the sun gear and the ring gear set to 1:2, and the relationship between torques of the same.

Next, a more specific description will be given of an operation performed by the first rotating machine 10 when electric power supplied to the stator 16 is converted to motive power and is output from the first rotor 14 and the second rotor 15. First, a case where electric power is supplied to the stator 16 in a state in which the first rotor 14 is held unrotatable will be described with reference to FIGS. 6 to 8. It should be noted that in FIGS. 6 to 8, one specific armature magnetic pole and one specific soft magnetic material core 15a are indicated by hatching for ease of understanding.

First, as shown in FIG. 6(a), from a state where the center of a soft magnetic material core 15a at a left end as viewed in the figure and the center of a permanent magnet 14a at a left end as viewed in the figure are circumferentially coincident with each other, and the center of a third soft magnetic material core 15a from the soft magnetic material core 15a and the center of a fourth permanent magnet 14a from the permanent magnet 14a are circumferentially coincident with each other, the rotating magnetic field is generated such that it rotates leftward, as viewed in the figure. At the start of generation of the rotating magnetic field, the positions of armature magnetic poles that have the same polarity are made circumferentially coincident with the centers of ones of the permanent magnets 14a the centers of which are coincident with the centers of the soft magnetic material cores 15a, and the polarity of these armature magnetic poles is made different from the polarity of the magnet magnetic poles of these permanent magnets 14a.

When the rotating magnetic field is generated by the stator 16 between the same and the first rotor 14 in this state, since the second rotor 15 having the soft magnetic material cores 15a is disposed between the stator 16 and the first rotor 14, the soft magnetic material cores 15a are magnetized by the armature magnetic poles and the magnet magnetic poles, and accordingly, since the soft magnetic material cores 15a are provided with spacings, magnetic lines of force ML are generated in a manner connecting between the armature magnetic poles, the soft magnetic material cores 15a, and the magnet magnetic poles.

In the state shown in FIG. 6(a), the magnetic lines of force ML are generated in a manner connecting armature magnetic poles, soft magnetic material cores 15a, and magnet magnetic poles, respective circumferential positions of which are coincident with each other, and at the same time in a manner connecting armature magnetic poles, soft magnetic material cores 15a, and magnet magnetic poles, which are adjacent to the above-mentioned armature magnetic pole, soft magnetic material core 15a, and magnet magnetic pole, respectively, on circumferentially opposite sides thereof. Further, in this state, since the magnetic lines of force ML are straight, no magnetic forces for circumferentially rotating the soft magnetic material cores 15a act on the soft magnetic material cores 15a.

Figure 6:
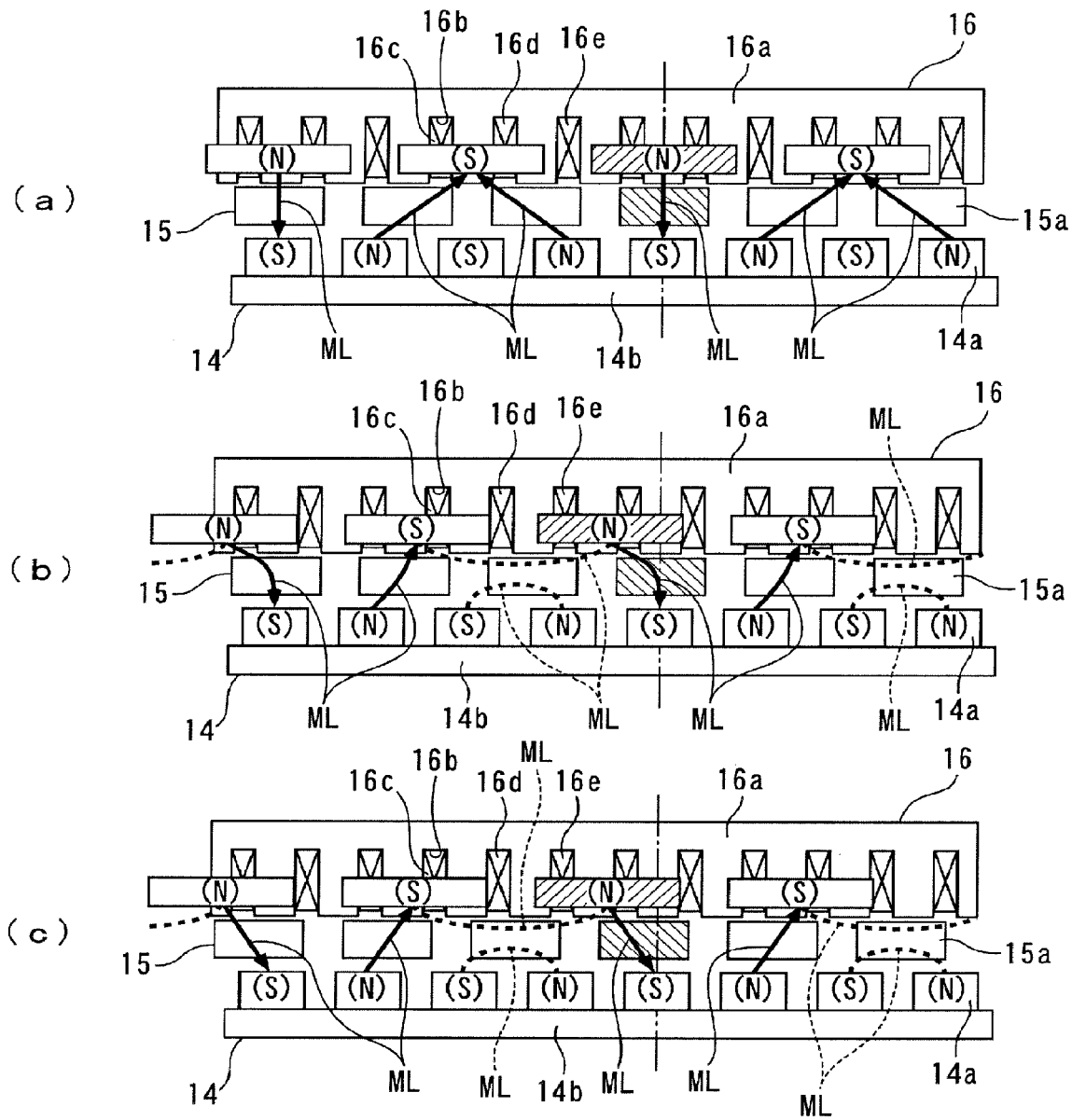
FIG. 6 Diagrams illustrating the operation of the first rotating machine in a case where electric power is supplied to a stator in a state of the first rotor being held unrotatable.

When the armature magnetic poles rotate from the positions shown in FIG. 6(a) to respective positions shown in FIG. 6(b) in accordance with rotation of the rotating magnetic field, the magnetic lines of force ML are bent, and accordingly magnetic forces act on the soft magnetic material cores 15a in such a manner that the magnetic lines of force ML are made straight. In this case, the magnetic lines of force ML are bent at the soft magnetic material cores 15a on which the magnetic forces act in a manner curved convexly in an opposite direction to a direction of rotation of the rotating magnetic field (hereinafter, this direction is referred to as "the magnetic field rotation direction") with respect to associated straight lines connecting between the armature magnetic poles and the magnet magnetic poles. Therefore, the magnetic forces caused by the magnetic lines of force ML act on the soft magnetic material cores 15a to drive the same in the magnetic field rotation direction. This drives the soft magnetic material cores 15*a* in the magnetic field rotation direction, whereby the soft magnetic material cores 15*a* rotate to respective positions shown in FIG. 6(*c*), and the second rotor 15 provided with the soft magnetic material cores 15*a* also rotates in the magnetic field rotation direction. It should be noted that broken lines in FIGS. 6(*b*) and 6(*c*) indicate that the magnetic flux amount of the magnetic lines of force ML is very small, and the magnetic connection between the armature magnetic poles, the soft magnetic material cores 15*a*, and the magnet magnetic poles is weak. This also applies to other figures, referred to hereinafter.

Figure 7:
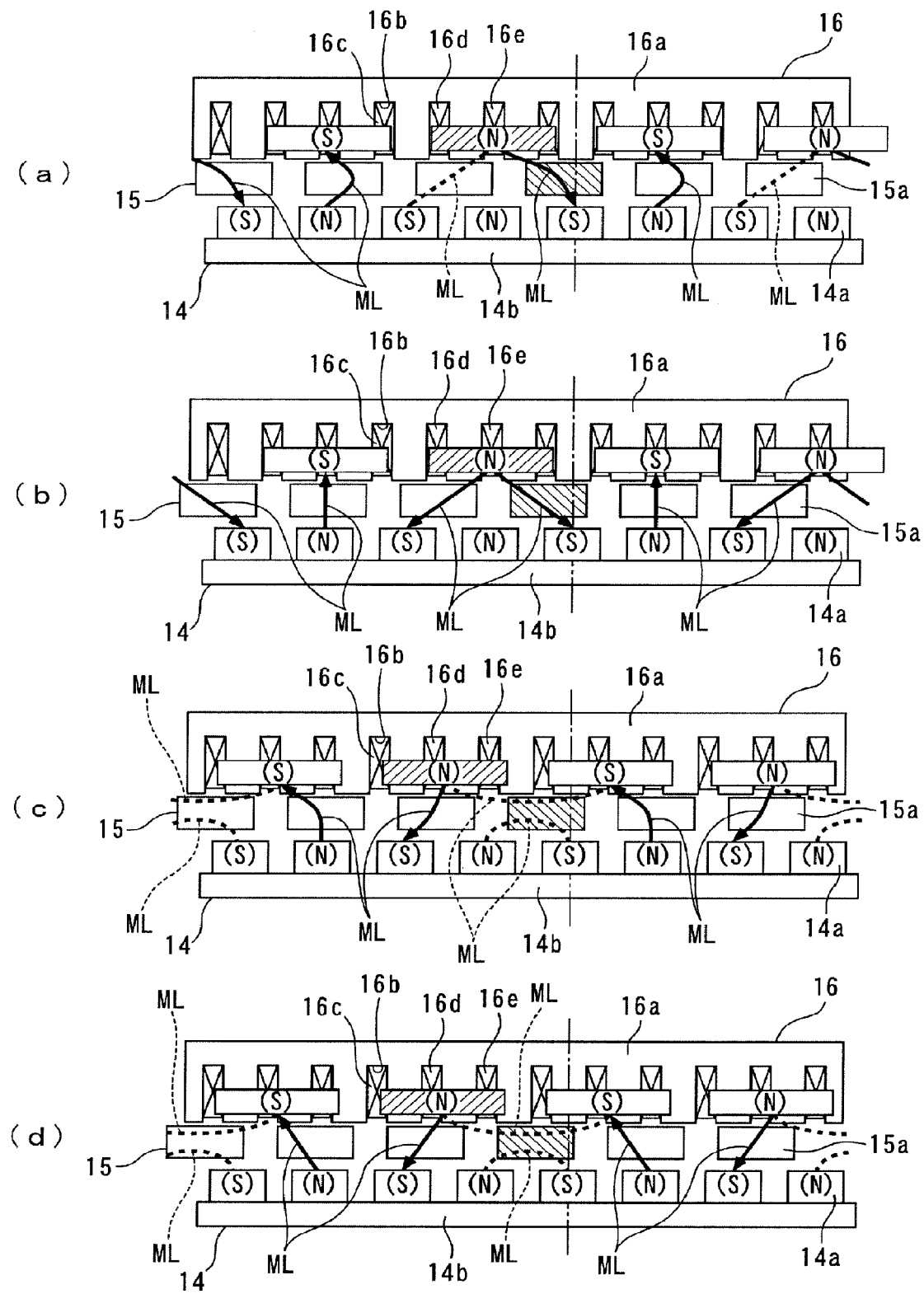
FIG. 7 Diagrams illustrating a continuation of the operation in FIG. 6.
Figure 8:
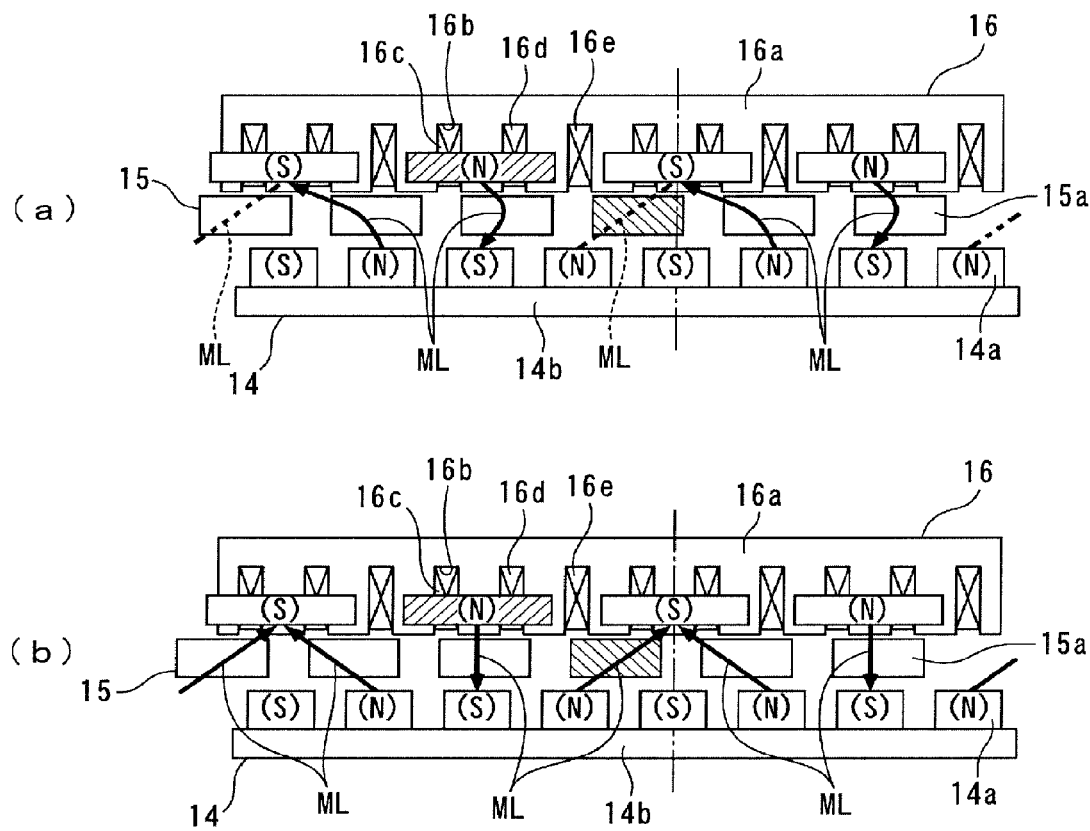
FIG. 8 Diagrams illustrating a continuation of the operation in FIG. 7.

As the rotating magnetic field further rotates, a sequence of the above-described operations, that is, the operations that "the magnetic lines of force ML are bent at the soft magnetic material cores 15*a* in a manner curved convexly in the direction opposite to the magnetic field rotation direction→the magnetic forces act on the soft magnetic material cores 15*a* in such a manner that the magnetic lines of force ML are made straight→the soft magnetic material cores 15*a* and the second rotor 15 rotate in the magnetic field rotation direction" are repeatedly performed as shown in FIGS. 7(*a*) to 7(*d*) and FIGS. 8(*a*) and 8(*b*). As described above, in a case where electric power is supplied to the stator 16 in a state of the first rotor 14 being held unrotatable, the action of the magnetic forces caused by the magnetic lines of force ML converts electric power supplied to the stator 16 to motive power, and the motive power is output from the second rotor 15.

Figure 9:
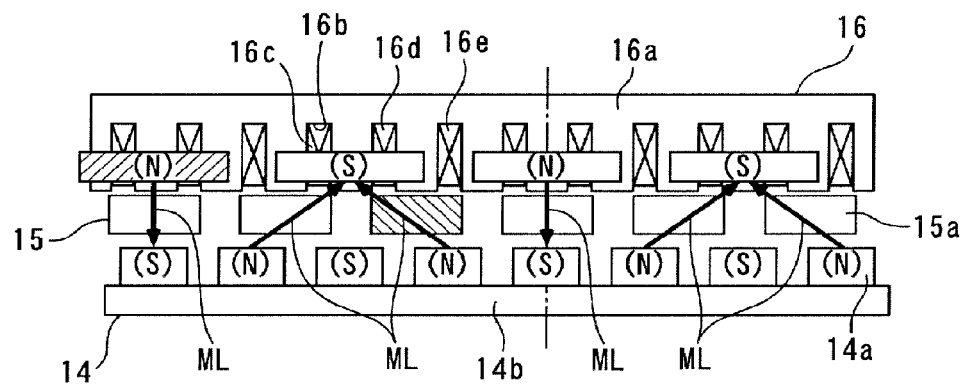
FIG. 9 A diagram illustrating the positional relationship between armature magnetic poles and soft magnetic material cores in a case where the armature magnetic poles have rotated through an electrical angle of 2π from the state shown in FIG. 5.

FIG. 9 shows a state in which the armature magnetic poles have rotated from the FIG. 6(*a*) state through an electrical angle of $2\pi$. As is apparent from a comparison between FIG. 9 and FIG. 6(*a*), it is understood that the soft magnetic material cores 15*a* have rotated in the same direction through ⅓ of a rotational angle of the armature magnetic poles. This agrees with the fact that by substituting
$\omega ER1=0$ into the aforementioned equation (40),
$\omega ER2=\omega MFR/3$ is obtained.

Next, an operation in the case where electric power is supplied to the stator 16 in a state in which the second rotor 15 is held unrotatable will be described with reference to FIGS. 10 to 12. It should be noted that in FIGS. 10 to 12, one specific armature magnetic pole and one specific permanent magnet 14*a* are indicated by hatching for ease of understanding.

Figure 10:
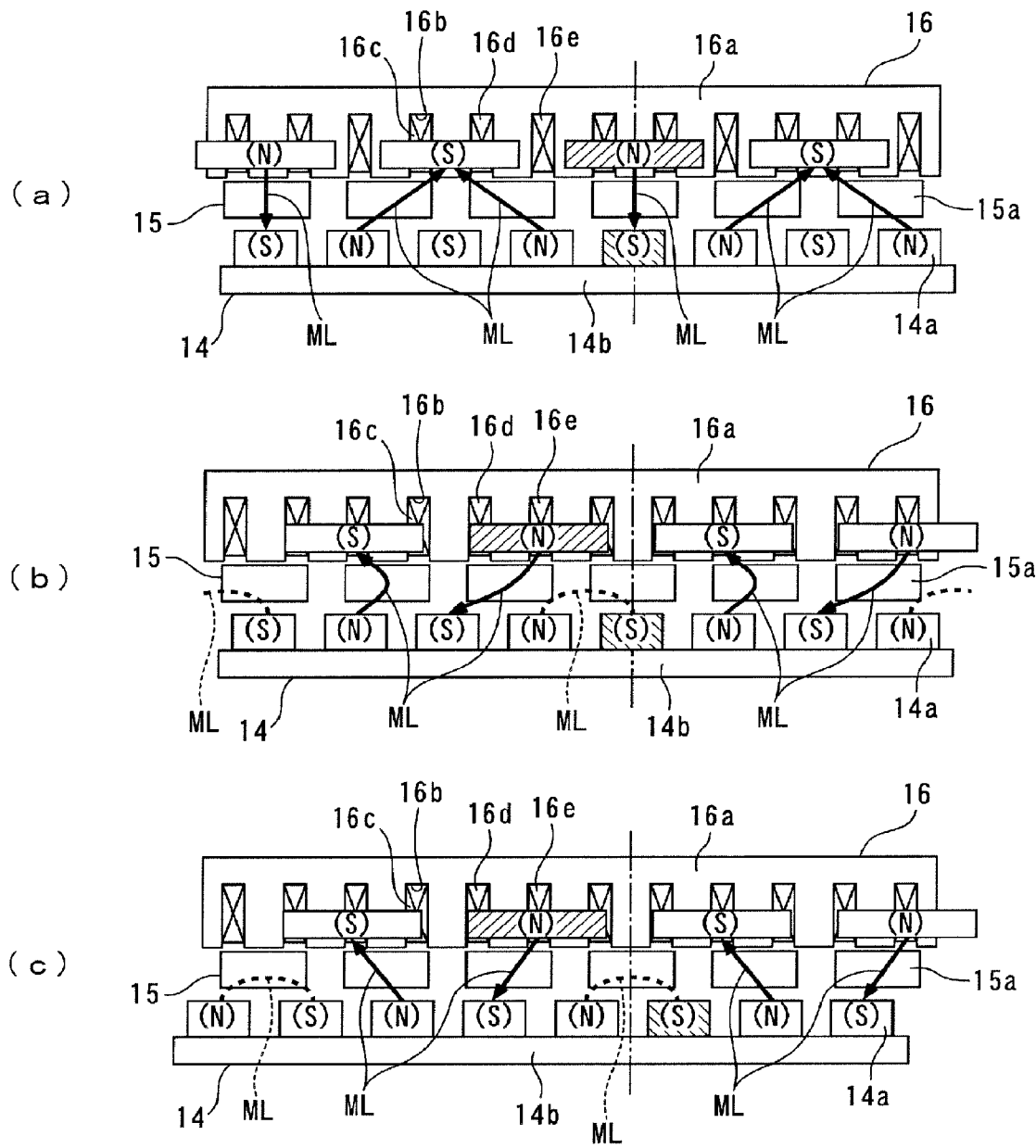
FIG. 10 Diagrams illustrating the operation of the first rotating machine in a case where electric power is supplied to the stator in a state of the second rotor being held unrotatable.

First, as shown in FIG. 10(*a*), similarly to the case shown in FIG. 6(*a*), from a state where the center of a soft magnetic material core 15*a* at the left end as viewed in the figure and the center of a permanent magnet 14*a* at the left end as viewed in the figure are circumferentially coincident with each other, and the center of a third soft magnetic material core 15*a* from the soft magnetic material core 15*a* at the left end and the center of a fourth permanent magnet 14*a* from the permanent magnet 14*a* at the left end are circumferentially coincident with each other, the rotating magnetic field is generated such that it rotates leftward, as viewed in the figure. At the start of generation of the rotating magnetic field, the positions of armature magnetic poles that have the same polarity are made circumferentially coincident with the centers of ones of the permanent magnets 14*a* the centers of which are coincident with the centers of the soft magnetic material cores 15*a*, and the polarity of these armature magnetic poles is made different from the polarity of the magnet magnetic poles of these permanent magnets 14*a*.

In the state shown in FIG. 10(*a*), similarly to the case shown in FIG. 6(*a*), magnetic lines of force ML are generated in a manner connecting armature magnetic poles, soft magnetic material cores 15*a* and magnet magnetic poles, respective circumferential positions of which are coincident with each other, and at the same time in a manner connecting armature magnetic poles, soft magnetic material cores 15*a* and magnet magnetic poles which are adjacent to the above-mentioned armature magnetic poles, soft magnetic material cores 15*a*, and magnet magnetic poles, respectively, on circumferentially opposite sides thereof. Further, in this state, since the magnetic lines of force ML are straight, no magnetic forces for circumferentially rotating the soft magnetic material cores 15*a* act on the soft magnetic material cores 15*a*.

When the armature magnetic poles rotate from the positions shown in FIG. 10(*a*) to respective positions shown in FIG. 10(*b*) in accordance with rotation of the rotating magnetic field, the magnetic lines of force ML are bent, and accordingly magnetic forces act on the permanent magnets 14*a* in such a manner that the magnetic lines of force ML are made straight. In this case, the permanent magnets 14*a* are each positioned forward of a line of extension from an armature magnetic pole and a soft magnetic material core 15*a* which are connected to each other by an associated one of the magnetic lines of force ML, in the magnetic field rotation direction, and therefore the magnetic forces caused by the magnetic lines of force ML act on the permanent magnets 14*a* such that each permanent magnet 14*a* is caused to be positioned on the extension line, i.e. such that the permanent magnet 14*a* is driven in a direction opposite to the magnetic field rotation direction. This drives the permanent magnets 14*a* in a direction opposite to the magnetic field rotation direction, whereby the permanent magnets 14*a* rotate to respective positions shown in FIG. 10(*c*), and the first rotor 14 provided with the permanent magnets 14*a* also rotates in the direction opposite to the magnetic field rotation direction.

Figure 11:
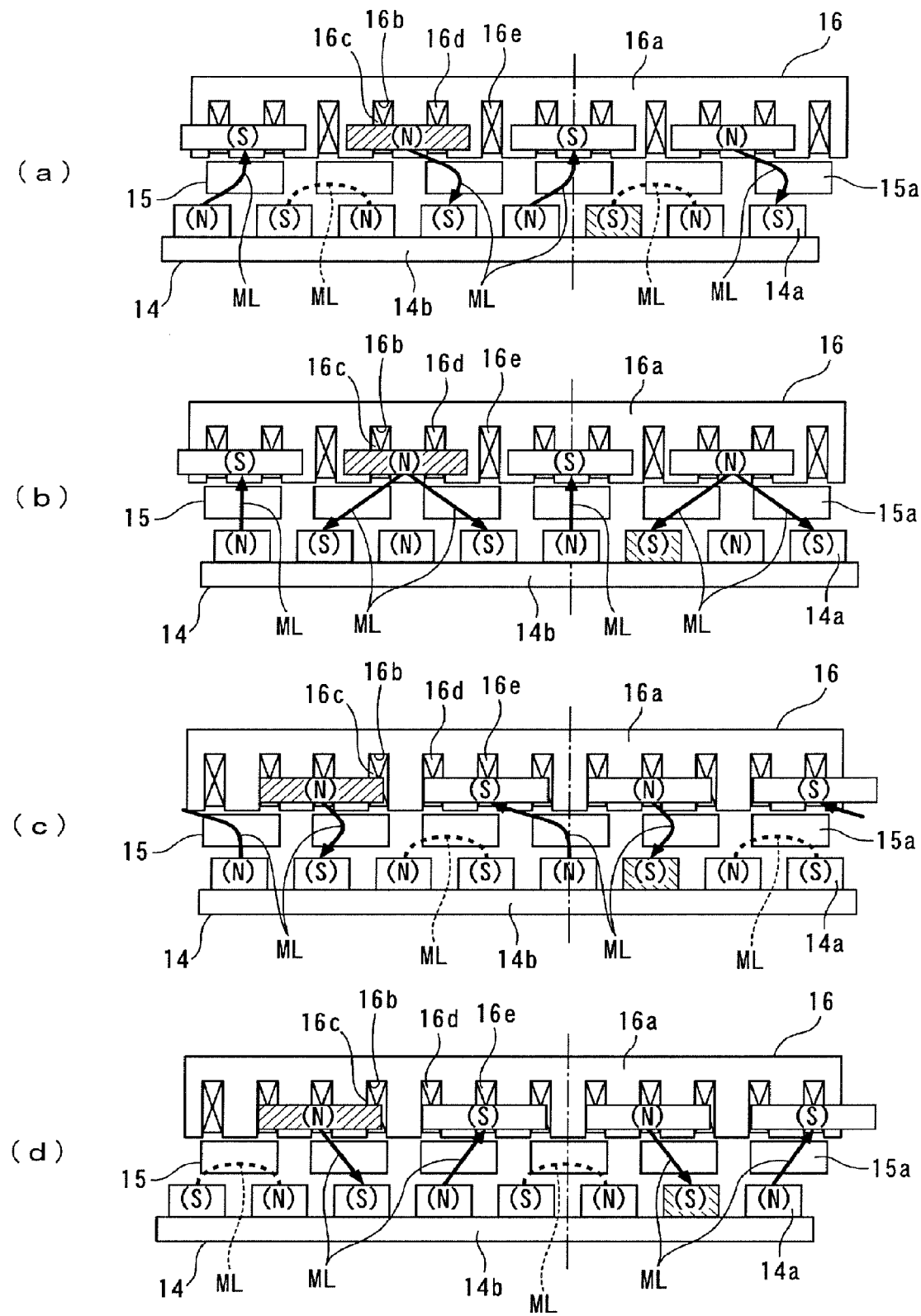
FIG. 11 Diagrams illustrating a continuation of the operation in FIG. 10.
Figure 12:
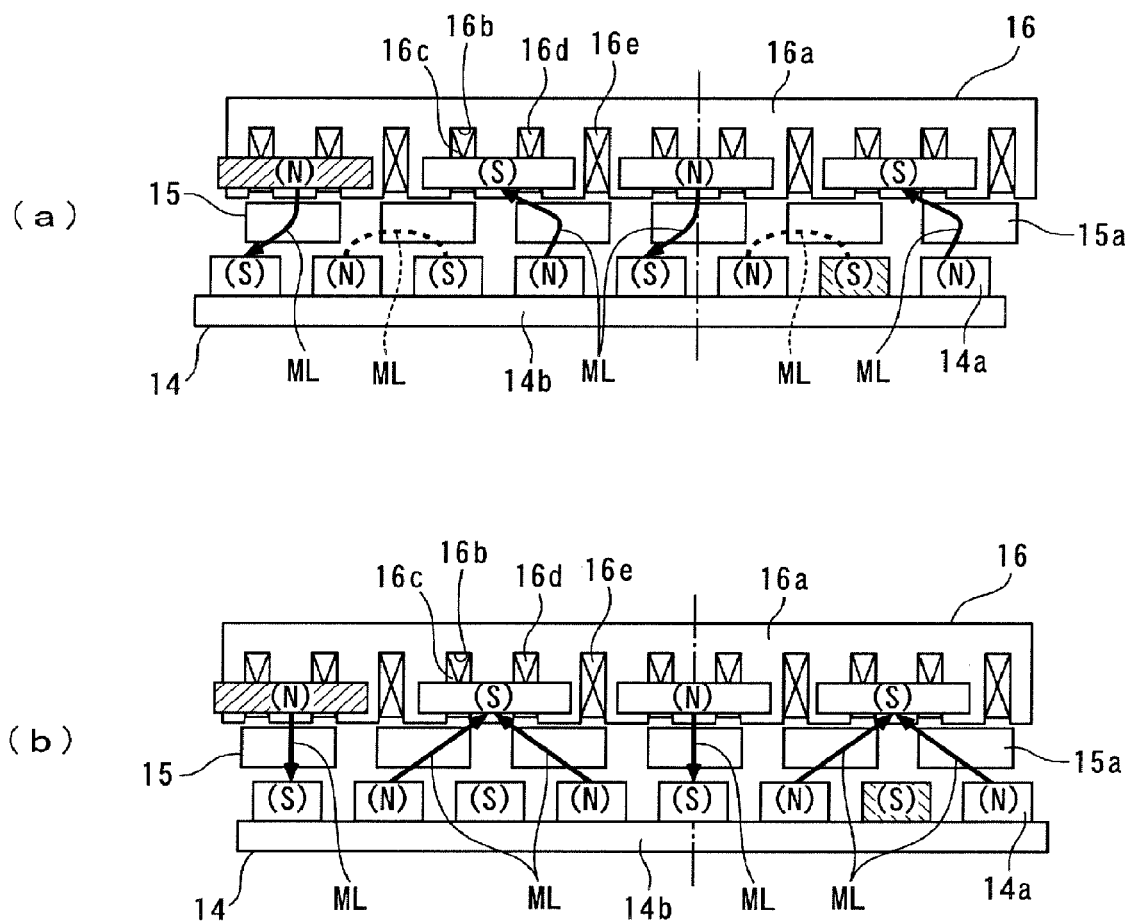
FIG. 12 Diagrams illustrating a continuation of the operation in FIG. 11.

As the rotating magnetic field further rotates, a sequence of the above-described operations, that is, the operations that "the magnetic lines of force ML are bent and the permanent magnets 14*a* are each positioned forward of a line of extension from an armature magnetic pole and a soft magnetic material core 15*a* which are connected to each other by an associated one of the magnetic lines of force ML, in the magnetic field rotation direction→the magnetic forces act on the permanent magnets 14*a* in such a manner that the magnetic lines of force ML are made straight→the permanent magnets 14*a* and the first rotor 14 rotate in the direction opposite to the magnetic field rotation direction" are repeatedly performed as shown in FIGS. 11(*a*) to 11(*d*) and FIGS. 12(*a*) and 12(*b*). As described above, in a case where electric power is supplied to the stator 16 in a state of the second rotor 15 being held unrotatable, the action of the magnetic forces caused by the magnetic lines of force ML converts electric power supplied to the stator 16 to motive power, and the motive power is output from the first rotor 14.

FIG. 12(*b*) shows a state in which the armature magnetic poles have rotated from the FIG. 10(*a*) state through an electrical angle of $2\pi$. As is apparent from a comparison between FIG. 12(*b*) and FIG. 10(*a*), it is understood that the permanent magnets 14*a* have rotated in the opposite direction through ½ of a rotational angle of the armature magnetic poles. This agrees with the fact that by substituting
$\omega ER2=0$ into the aforementioned equation (40),
$-\omega ER1=\omega MFR/2$ is obtained.

As described above, in the first rotating machine 10 of the present embodiment, when the rotating magnetic field is generated by supplying electric power to the stator 16, the aforementioned magnetic lines of force ML are generated in a manner connecting between the magnet magnetic poles, the soft magnetic material cores 15*a* and the armature magnetic poles, and the action of the magnetic forces caused by the magnetic lines of force ML converts the electric power supplied to the armatures to motive power, and the motive power is output from the first rotor 14 and the second rotor 15. In this case, the relationship as expressed by the aforementioned equation (40) holds between the magnetic field electrical angular velocity ωMFR, and the first and second rotor electrical angular velocities ωER1 and ωER2, and the relationship as expressed by the aforementioned equation (41) holds between the driving equivalent torque TSE, and the first and second rotor transmission torques TR1 and TR2. The relationship between the three torques TSE, TR1 and TR2, and the relationship between the three electrical angular velocities ωMFR, ωER1 and ωER2 are the same as the relationships between the torques and rotational speeds of the three elements of the planetary gear unit.

Therefore, if the first rotor 14 and/or the second rotor 15 are/is caused to rotate with respect to the stator 16 by supplying motive power to the first rotor 14 and/or the second rotor 15 without electric power being supplied to the stator 16, electric power is generated by the stator 16, and a rotating magnetic field is generated. In this case, magnetic lines of force ML are generated in a manner connecting between the magnet magnetic poles, the soft magnetic material elements, and the armature magnetic poles, and the action of the magnetic forces caused by the magnetic lines of force ML causes the relationship of the electrical angular velocities shown in the equation (40) and the relationship of the torques shown in the equation (41) to hold. That is, assuming that a torque equivalent to the generated electric power and the magnetic field electrical angular velocity ωMFR is an electric power-generating equivalent torque TGE, there also holds the relationship expressed by the equation (41) in which "TSE" is replaced by "TGE" between this electric power-generating equivalent torque TGE, and the first and second rotor transmission torques TR1 and TR2.

As described above, as for the first rotating machine 10 of the present embodiment, the relationship between the three torques and the relationship between the three electrical angular velocities are the same as the relationships between the torques and rotational speeds of the three elements of the planetary gear unit, and hence it is possible to drive the first rotating machine 10 by the same operation characteristics as those of the planetary gear unit.

Next, a description will be given of the second rotating machine 20. The second rotating machine 20 is formed by a DC brushless motor, and as shown in FIG. 3, includes a casing 21 fixed to the above-mentioned drive system housing, a rotor 22 housed in the casing 21 and concentrically fixed to the output shaft 13, a stator 23 fixed to the inner peripheral surface of a peripheral wall 21c of the casing 21, and so forth.

The casing 21 comprises left and right side walls 21a and 21b, and the hollow cylindrical peripheral wall 21c which has a hollow cylindrical shape and is fixed to outer peripheral ends of the left and right side walls 21a and 21b. Bearings 21d and 21e are mounted in the inner ends of the left and right side walls 21a and 21b, respectively, and the output shaft 13 is rotatably supported by the bearings 21d and 21e.

The rotor 22 comprises a turntable portion 22a concentrically fixed to the output shaft 13, and a hollow cylindrical ring portion 22b fixed to an outer end of the turntable portion 22a. The ring portion 22b is formed of a soft magnetic material, and a permanent magnet row is disposed on an outer peripheral surface of the ring portion 22b along the circumferential direction. The permanent magnet row is formed by a predetermined number of permanent magnets 22c, and the permanent magnets 22c are arranged at the same angular intervals of a predetermined angle such that each two adjacent ones of the permanent magnets 22c have polarities different from each other.

The stator 23 has a plurality of armatures 23a arranged on the inner peripheral surface of the peripheral wall 21c of the casing 21 along the circumferential direction. The armatures 23a, which generate a rotating magnetic field, are arranged at the same angular intervals of a predetermined angle, and are electrically connected to the battery 33 via a 2ND•PDU 32, described hereinafter.

On the other hand, as shown in FIG. 2, the power plant 1 comprises the ENG•ECU 29 for mainly controlling the engine 3, and an MOT•ECU 30 for mainly controlling the first rotating machine 10 and the second rotating machine 20. The ECUs 29 and 30 are implemented by microcomputers, not shown, each comprising a RAM, a ROM, a CPU, and an I/O interface (none of which are shown).

To the ENG•ECU 29 are connected various sensors, such as a crank angle sensor, a drive shaft rotational speed sensor, an accelerator pedal opening sensor, and a vehicle speed sensor (none of which are shown). The ENG•ECU 29 calculates an engine speed NE, a rotational speed ND of the drive shaft 8 (hereinafter referred to as "the drive shaft speed ND"), an accelerator pedal opening AP (an operation amount of an accelerator pedal, not shown), a vehicle speed VP, and so forth, based on the detection signals output from these various sensors, and drives fuel injection valves and spark plugs according to these parameters, to thereby control the operation of the engine 3. Further, the ENG•ECU 29 is electrically connected to the MOT•ECU 30 and transmit and receive data of the engine speed NE, the drive shaft speed ND, etc., to and from the MOT•ECU 30.

On the other hand, to the MOT•ECU 30 are connected the 1ST•PDU 31, the 2ND•PDU 32, a first rotational angle sensor 35, and a second rotational angle sensor 36. The 1ST•PDU 31 is implemented by an electric circuit including an inverter and so forth, and is connected to the first rotating machine 10 and the battery 33. Further, similarly to the 1ST•PDU 31, the 2ND•PDU 32 is also implemented by an electric circuit including an inverter and so forth, and is connected to the second rotating machine 20 and the battery 33.

Further, the first rotational angle sensor 35 detects the rotational angle of the first rotor 14 with respect to the stator 16, and delivers a signal indicative of the detected rotational angle to the MOT•ECU 30. Further, the second rotational angle sensor 36 detects the rotational angle of the second rotor 15 with respect to the stator 16, and delivers a signal indicative of the detected rotational angle to the MOT•ECU 30. The MOT•ECU 30 controls the operating conditions of the two rotating machines 10 and 20 based on the detection signals from these sensors and various kinds of data from the above-mentioned ENG•ECU 29, as described hereafter.

Next, a description will be given of the method of controlling the first rotating machine 10 and the second rotating machine 20 using the MOT•ECU 30. First, a description will be given of engine start control performed for starting the engine during stoppage of the vehicle 2. In this control, in a case where the engine 3 is at rest and the vehicle 2 is at a stop, when predetermined engine-starting conditions are satisfied (e.g. an ignition switch, not shown, is switched from an off state to an on state), the MOT•ECU 30 supplies electric power from the battery 33 to the first rotating machine 10 via the 1ST•PDU 31, to cause the stator 16 to generate the rotating magnetic field. In this case, in the first rotating machine 10, the first rotor 14 is mechanically connected to the front wheels 4, and the second rotor 15 is mechanically connected to the crankshaft of the engine 3, and therefore when the vehicle 2 is at a stop with the engine stopped, the rotational resistance of the first rotor 14 becomes much larger than that of the second rotor 15, which causes the second rotor 15 to be driven in the rotating direction of the rotating magnetic field with the first rotor 14 remaining at rest. As a result, the second rotor 15 is driven along with the rotation of the rotating magnetic field, whereby the engine 3 can be started.

Further, in a case where the vehicle is at a stop with the engine 3 in operation, when predetermined vehicle-starting conditions are satisfied (e.g. when a brake pedal, not shown, is not operated, and the accelerator pedal opening AP is not lower than a predetermined value), vehicle start control is executed. First, when the vehicle 2 is at a stop, the output shaft 13, i.e. the first rotor 14 is in a state in which rotation thereof is stopped, so that all the motive powers caused by the engine 3 are transmitted to the stator 16 of the first rotating machine 10 via magnetic lines of force to cause the stator 16 to generate the rotating magnetic field, whereby an induced electromotive force (i.e. counter-electromotive force voltage) is generated. The MOT•ECU 30 controls current supplied to the stator 16 to thereby regenerate electric power from the induced electromotive force caused by the stator 16, and supplies all the regenerated electric power to the second rotating machine 20 via the 1ST•PDU 31 and the 2ND•PDU 32. As a result, the output shaft 13 is driven by the rotor 22 of the second rotating machine 20, to drive the front wheels 4 and 4, whereby the vehicle 2 is started. After the vehicle 2 is started, the MOT•ECU 30 causes the electric power regenerated by the first rotating machine 10 to be progressively reduced as the vehicle speed increases, and at the same time causes the regenerated electric power to be supplied to the second rotating machine 20.

Further, when the vehicle 2 is traveling with the engine 3 in operation, speed change control is executed. In the speed change control, depending on operating conditions of the engine 3 (e.g. the engine speed NE, the accelerator pedal opening AP, etc.) and/or traveling conditions of the vehicle 2 (e.g. the vehicle speed VP), the first rotating machine 10 is controlled such that a ratio between part of motive power output from the engine 3, which is transmitted via the first rotor 14 to the front wheels 4, and part of the same, from which electric power is regenerated by the first rotating machine 10, is changed, and the second rotating machine 20 is controlled by supplying the regenerated electric power thereto. In this case, since the first rotating machine 10 can be operated by operating characteristics similar to those of a planetary gear unit, as mentioned hereinabove, by controlling the first rotating machine 10 as described above and controlling the second rotating machine 20 by supplying the electric power regenerated by the first rotating machine 10 to the second rotating machine 20, provided that electrical losses are ignored, it is possible to change the ratio between the rotational speed of the second rotor 15 and the rotational speed of the output shaft 13, in other words, the ratio between the engine speed NE and the drive shaft speed ND as desired while transmitting all the motive power from the engine 3 to the front wheels 4 via the first rotating machine 10 and the second rotating machine 20. In short, by controlling the two rotating machines 10 and 20, it is possible to realize the functions of an automatic transmission.

Further, during the speed change control, when predetermined motive power-transmitting conditions are satisfied (e.g. the engine speed NE and the accelerator pedal opening AP are in a predetermined region), the regeneration of electric power by the first rotating machine 10 is stopped, and the rotational speed of rotating magnetic field of the stator 16 is controlled to 0 by supplying lock current to the stator 16 or executing phase-to-phase short circuit control of the first rotating machine 10. When such control is performed, insofar as the motive power from the engine 3 is within a range capable of being transmitted by magnetism, it is possible to transmit all the motive power from the engine 3 to the front wheels 4 by magnetism, so that it is possible to enhance power transmission efficiency, compared with the case in which electric power regenerated by the first rotating machine 10 is caused to be supplied to the second rotating machine 20 via the 2ND•PDU 32.

On the other hand, in a case where the vehicle 2 is traveling with the engine 3 in operation (including when the engine 3 is in a decelerating fuel-cut operation), when a remaining charge SOC of the battery 33 is not higher than a predetermined value SOC_REF (e.g. 50%), the electric power regenerated by the first rotating machine 10 and/or the second rotating machine 20 is controlled to execute charge control for charging the battery 33. This makes it possible to secure sufficient remaining charge SOC of the battery 33.

Further, in a case where the engine 3 is in operation, when predetermined assist conditions (e.g. when the vehicle 2 starts uphill, is traveling uphill, or is accelerating) are satisfied, assist control is executed. More specifically, by supplying electric power from the battery 33 to the first rotating machine 10 and/or the second rotating machine 20, the first rotating machine 10 and/or the second rotating machine 20 are controlled such that motive power from the first rotating machine 10 and/or the second rotating machine 20, and motive power from the engine 3 are transmitted to the front wheels 4. With this control, in addition to the engine 3, the first rotating machine 10 and/or the second rotating machine 20 are/is used as motive power sources, whereby the vehicle 2 can perform assist traveling or assist starting.

Further, in a case where the engine 3 is at rest and the vehicle 2 is at a stop, when predetermined rotating machine-driven vehicle-starting conditions are satisfied (e.g. when the accelerator pedal opening AP is not lower than a predetermined value and the remaining charge SOC of the battery 33 is higher than the predetermined value SOC_REF with the brake pedal being not operated), the rotating machine-driven start control is executed. More specifically, electric power is simultaneously supplied from the battery 33 to the first rotating machine 10 and the second rotating machine 20 while the engine 3 is held at rest, whereby the two rotating machines 10 and 20 are simultaneously driven. At this time, the output shaft 13 starts to rotate simultaneously with the start of rotation of the second rotating machine 20, and in the first rotating machine 10, the rotational resistance of the second rotor 15 connected to the stopped engine 3 becomes considerably larger than that of the first rotor 14. As a result, by causing the stator 16 to generate rotating magnetic fields, the first rotor 14 can be driven, and the vehicle 2 can be started by the motive power from the first rotating machine 10 and the second rotating machine 20. It should be noted that if the rotational resistance of the engine 3 is insufficient, the engine 3 may be locked, or a device for increasing the rotational resistance may be provided.

As described above, according to the power plant 1 of the present embodiment, the engine 3, the first rotating machine 10 and the second rotating machine 20 are used as motive power sources, whereby it is possible to drive the vehicle 2. Further, the first rotating machine 10 is only required to be configured to include only one soft magnetic material element row, so that it is possible to make the first rotating machine 10 more compact in size and reduce the manufacturing costs thereof. As a result, it is possible to make the power plant 1 itself more compact in size and reduce the manufacturing costs thereof, and it is possible to improve the degree of freedom in design. Further, as is clear from the above-mentioned equations (40) and (41), depending on the setting of the pole pair number ratio α, i.e. the pole number ratio m in the first rotating machine 10, it is possible to freely set the relationship between the three electrical angular velocities ωMFR, ωER1, and ωER2, and the relationship between the three torques TSE, TR1, and TR2. As a result, it is possible to further improve the degree of freedom in design.

Next, a description will be given of changes in torques when the pole pair number ratio α (=pole number ratio m) of the first rotating machine 10 is changed in the power plant 1 according to the first embodiment. More specifically, a description will be given of a case where when the vehicle 2 is traveling with the engine 3 in operation, electric power is regenerated from part of motive power from the engine 3 by the first rotating machine 10, and the regenerated electric power is supplied to the second rotating machine 20 to thereby perform powering control of the second rotating machine 20, by way of example.

First, in the power plant 1, it is assumed that the pole pair number ratio α of the first rotating machine 10 is set to a desired value other than a value of 1, and the drive wheels are directly connected to the output shaft 13. In this case, assuming that an electrical angular velocity of the input shaft 12, i.e. the second rotor 15 is ωENG, an electrical angular velocity of the rotating magnetic field of the stator 16 is ωMG1, and an electrical angular velocity of the output shaft 13, i.e. the first rotor 14 is ωOUT, the relationship between these electrical angular velocities is expressed e.g. as shown in FIG. 13, and the following equation (42) holds:

$$\omega MG1 = (1+\alpha)\omega ENG - \alpha \cdot \omega OUT \tag{42}$$

Figure 13:
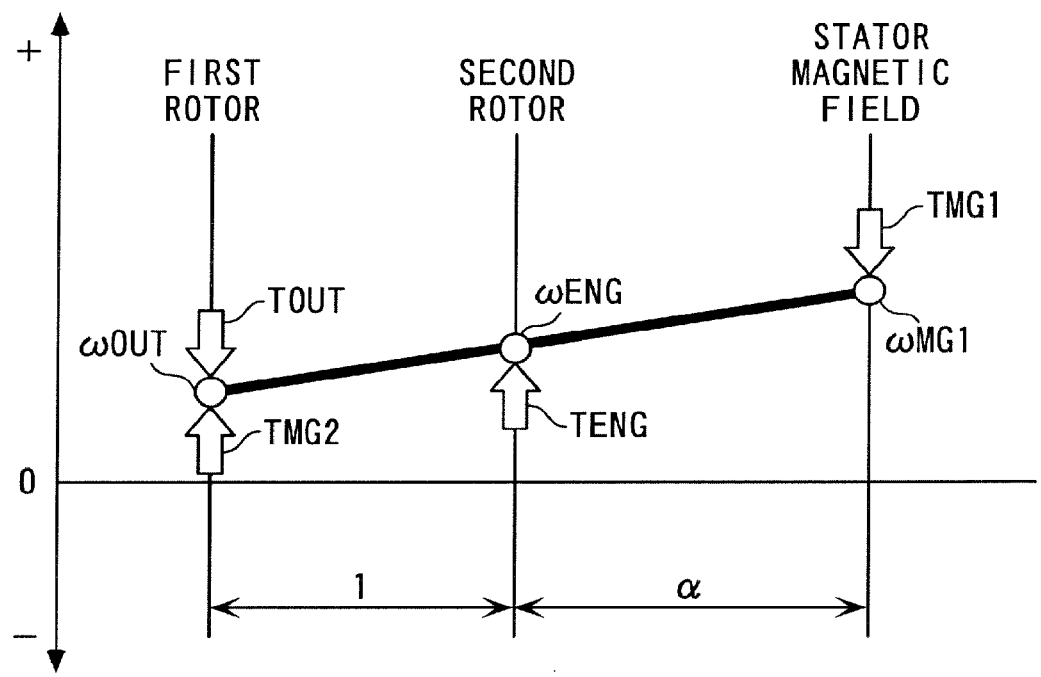
FIG. 13 A diagram showing an example of the relationship between three electrical angular velocities and three torques when a pole pair number ratio α in the first rotating machine of the power plant according to the first embodiment is set to a desired value.

Further, assuming that a torque input from the engine 3 to the input shaft 12 is an engine torque TENG, a torque equivalent to the regenerated electric power and the electrical angular velocity ωMG1 of the rotating magnetic field of the stator 16 is a first rotating machine torque TMG1, a torque equivalent to the electric power supplied to the second rotating machine 20 and an electrical angular velocity ωMG2 is a second rotating machine torque TMG2, and a torque as a reaction force received by the drive wheels from a road surface, caused by the torque transmitted to the drive wheels, is a driving torque TOUT, the following equations (43) and (44) hold, and the relationship between these torques is expressed e.g. as shown in FIG. 13. It should be noted that in the following equations (43) and (44), the upward torque in FIG. 13 is represented by a positive value.

$$TMG1 = -\frac{1}{1+\alpha}TENG \tag{43}$$

$$TMG2 = -\frac{\alpha}{1+\alpha}TENG - TOUT \tag{44}$$

Here, assuming that a first predetermined value α1 and a second predetermined value α2 are predetermined values of the pole pair number ratio α set such that α1<α2 holds, the first and second rotating machine torques TMG1(α1) and TMG2(α1) when
α=α1 holds are expressed by the following equations (45) and (46), respectively:

$$TMG1(\alpha 1) = -\frac{1}{1+\alpha 1}TENG \tag{45}$$

$$TMG2(\alpha 1) = -\frac{\alpha 1}{1+\alpha 1}TENG - TOUT \tag{46}$$

Further, the first and second rotating machine torques TMG1(α2) and TMG2(α2) when α=α2 holds are expressed by the following equations (47) and (48), respectively:

$$TMG1(\alpha 2) = -\frac{1}{1+\alpha 2}TENG \tag{47}$$

$$TMG2(\alpha 2) = -\frac{\alpha 2}{1+\alpha 2}TENG - TOUT \tag{48}$$

From the above equations (45) and (47), an amount of change ΔTMG1 of the first rotating machine torque TMG1 when the pole pair number ratio α is changed from the first predetermined value α1 to the second predetermined value α2 is expressed by the following equation (49):

$$\Delta TMG1 = TMG1(\alpha 2) - TMG1(\alpha 1) \tag{49}$$
$$= -\frac{\alpha 1 - \alpha 2}{(1+\alpha 1)(1+\alpha 2)}TENG$$

Further, from the equations (46) and (48), an amount of change ΔTMG2 of the second rotating machine torque TMG2 when the pole pair number ratio α is changed from the first predetermined value α1 to the second predetermined value α2 is expressed by the following equation (50):

$$\Delta TMG2 = TMG2(\alpha 2) - TMG2(\alpha 1) \tag{50}$$
$$= -\frac{\alpha 2 - \alpha 1}{(1+\alpha 1)(1+\alpha 2)}TENG$$

Here, since TENG>0, TMG1<0, TMG2>0, and α1<α2 hold, as is clear from the above equations (49) and (50), by changing the pole pair number ratio α from the first predetermined value α1 to the second predetermined value α2, the absolute values of the first and second rotating machine torques TMG1 and TMG2 are reduced. That is, it is understood that by setting the pole pair number ratio α to a larger value, it is possible to make the first and second rotating machines 10 and 20 more compact in size.

Further, if electric power is not input and output between the two rotating machines 10 and 20, and the battery 33, the electric power regenerated by the first rotating machine 10 is directly supplied to the second rotating machine 20, so that the following equation (51) holds:

$$TMG2 = -\frac{\omega MG1}{\omega OUT}TMG1 \tag{51}$$

Here, assuming that the electric power supplied from the first rotating machine 10 to the second rotating machine 20 is a transmission electric power WMG, and a ratio of the transmission electric power WMG to an engine output WENG is an output ratio RW, the output ratio RW is calculated by the following equation (52):

$$RW = \frac{WMG}{WENG} \quad (52)$$

$$= \frac{-TMG1 \cdot \omega MG1}{TENG \cdot \omega ENG} \left( = \frac{TMG2 \cdot \omega OUT}{TENG \cdot \omega ENG} \right)$$

If the relationship between the above-mentioned equations (42) and (43) is applied to the above equation (52), there is obtained the following equation (53):

$$RW = 1 - \frac{\alpha}{1+\alpha} \cdot \frac{\omega OUT}{\omega ENG} \quad (53)$$

Here, a speed reducing ratio R is defined as expressed by the following equation (54), and if the thus defined speed reducing ratio R is applied to the above equation (53), there is obtained the following equation (55):

$$R = \frac{\omega ENG}{\omega OUT} \quad (54)$$

$$RW = 1 - \frac{\alpha}{1+\alpha} \cdot \frac{1}{R} \quad (55)$$

From the above equation (55), the output ratios $RW(\alpha 1)$ and $RW(\alpha 2)$ obtained when the pole pair number ratio $\alpha$ is set to the first predetermined value $\alpha 1$ and the second predetermined value $\alpha 2$, respectively, are calculated by the following equations (56) and (57):

$$RW(\alpha 1) = 1 - \frac{\alpha 1}{1+\alpha 1} \cdot \frac{1}{R} \quad (56)$$

$$RW(\alpha 2) = 1 - \frac{\alpha 2}{1+\alpha 2} \cdot \frac{1}{R} \quad (57)$$

From the above equations (56) and (57), an amount of change $\Delta RW$ of the output ratio when the pole pair number ratio $\alpha$ is changed from the first predetermined value $\alpha 1$ to the second predetermined value $\alpha 2$ is expressed by the following equation (58):

$$\Delta RW = RW(\alpha 2) - RW(\alpha 1) \quad (58)$$

$$= -\frac{\alpha 2 - \alpha 1}{(1+\alpha 1)(1+\alpha 2)} \cdot \frac{1}{R}$$

Figure 14:
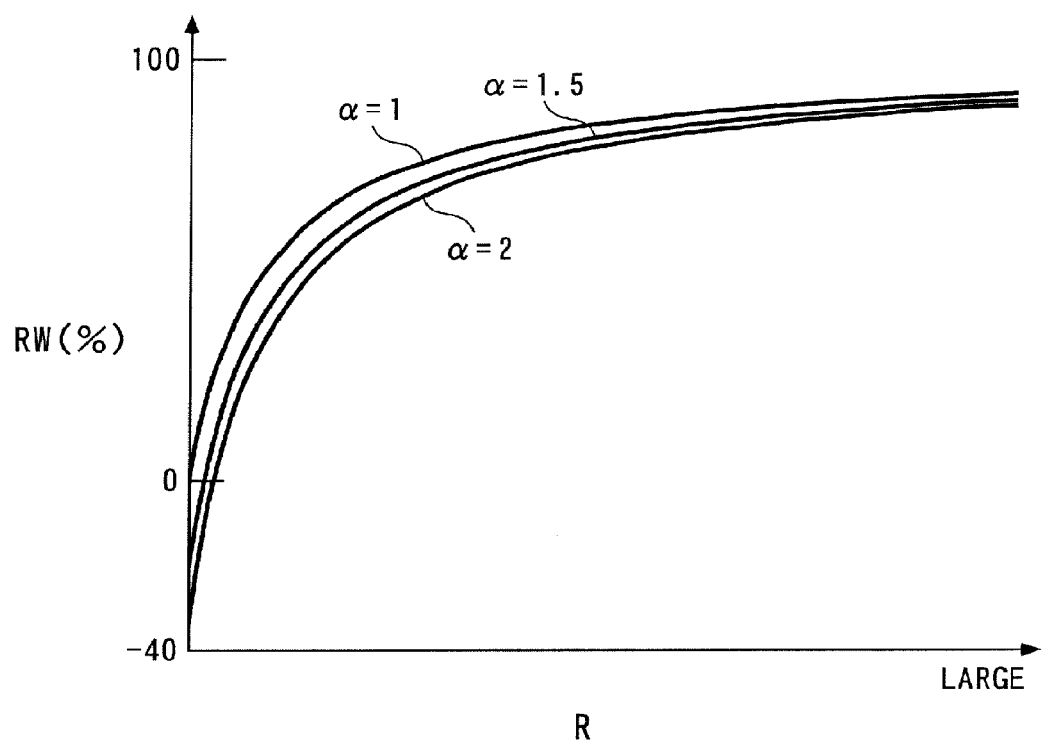
FIG. 14 A diagram showing the relationship between an output ratio RW and a speed reducing ratio R when the pole pair number ratio α in the first rotating machine of the power plant according to the first embodiment is set to values of 1, 1.5, and 2.

Here, since $\alpha 1 < \alpha 2$ holds, as is clear from the above equation (58), it is understood that by changing the pole pair number ratio $\alpha$ from the first predetermined value $\alpha 1$ to the second predetermined value $\alpha 2$, it is possible to reduce the output ratio RW, whereby it is possible to reduce the transmission electric power WMG. Further, in the above-mentioned equation (55), the relationship between the output ratio RW and the speed reducing ratio R when the pole pair number ratio $\alpha$ is set to values of 1, 1.5, and 2 is expressed as shown in FIG. 14. As is clear from FIG. 14, it is understood that by setting the pole pair number ratio $\alpha$ to a larger value, it is possible to reduce the transmission electric power WMG throughout the whole range of the speed reducing ratio R. In general, from the efficiency viewpoint, mechanical motive power transmission or motive power transmission by magnetism is more advantageous, compared with converting electric power to motive power by the rotating machine, and hence as described above, it is possible to improve transmission efficiency by reducing the transmission electric power WMG. That is, as for the power plant of the present invention, by setting the pole pair number ratio $\alpha$ (=pole number ratio m) to a larger value, it is possible to improve transmission efficiency.

It should be noted that although the first embodiment is an example in which the power plant 1 of the present invention is applied to the vehicle 2 including the front wheels 4 as the driven parts, this is not limitative, but for example, the power plant of the present invention can be applied to various industrial apparatuses, such as boats and aircrafts. When the power plant of the present invention is applied to a boat, a section which generates power for propulsion, such as a screw, corresponds to the driven part, and when the power plant of the present invention is applied to an aircraft, a section which generates power of propulsion, such as a propeller and a rotor, corresponds to the driven part.

Further, although the first embodiment is an example in which an internal combustion engine powered by gasoline is employed as a heat engine, this is not limitative, but there may be employed any other apparatus insofar as it continuously converts heat energy to mechanical energy. For example, as a heat engine, there may be employed an internal combustion engine powered by light oil or natural gases, or an external combustion engine, such as a Stirling engine.

Further, although the first embodiment is an example in which in the first rotating machine 10, the number of the armature magnetic poles is set to "4", the number of magnetic poles is set to "8", and the number of the soft magnetic material cores 15a as the soft magnetic material elements is set to "6", respectively, the respective numbers of the armature magnetic poles, the magnetic poles, and the soft magnetic material elements in the first rotating machine of the present invention are not limited to these values, but desired numbers can be employed as the numbers of the armature magnetic poles, the magnetic poles, and the soft magnetic material elements, insofar as the ratio therebetween, i.e. the element number ratio satisfies 1:m:(1+m)/2 in the case where the pole number ratio m is a positive value other than a value of 1. Further, although the first rotating machine 10 of the first embodiment is an example in which m=2 is set in the element number ratio, the element number ratio m is not limited to this, but it is only required to be a positive value other than a value of 1.

Further, although the first embodiment is an example in which the magnetic poles of the permanent magnets 14a are used as the magnetic poles of the first rotor 14, the first rotor 14 may be provided with an armature row, and the magnetic poles of the permanent magnets may be replaced by the magnetic poles generated in the armature row.

On the other hand, although the first embodiment is an example in which the MOT•ECU 30, the 1ST•PDU 31, and the 2ND•PDU 32 are used as control means for controlling the operations of the first rotating machine 10 and the second rotating machine 20, the control means for controlling the first rotating machine 10 and the second rotating machine 20 is not limited to these, but any other control means may be used insofar as it can control the operations of these rotating machines 10 and 20. For example, as the control means for controlling the two rotating machines 10 and 20, an electric circuit equipped with a microcomputer may be used.

It should be noted that although the first embodiment is an example in which the first rotating machine 10 and the second rotating machine 20 are axially arranged side by side on the output shaft 13, the arrangement of the first rotating machine 10 and the second rotating machine 20 is not limited to this. For example, as shown in FIG. 15, the first and second rotating machines 10 and 20 may be radially arranged side by side such that the first rotating machine 10 is positioned outside the second rotating machine 20. This arrangement makes it possible to make the two rotating machines 10 and 20 more compact in size in the axial direction, thereby making it possible to improve the degree of freedom in design of the power plant 1.

Figure 16:
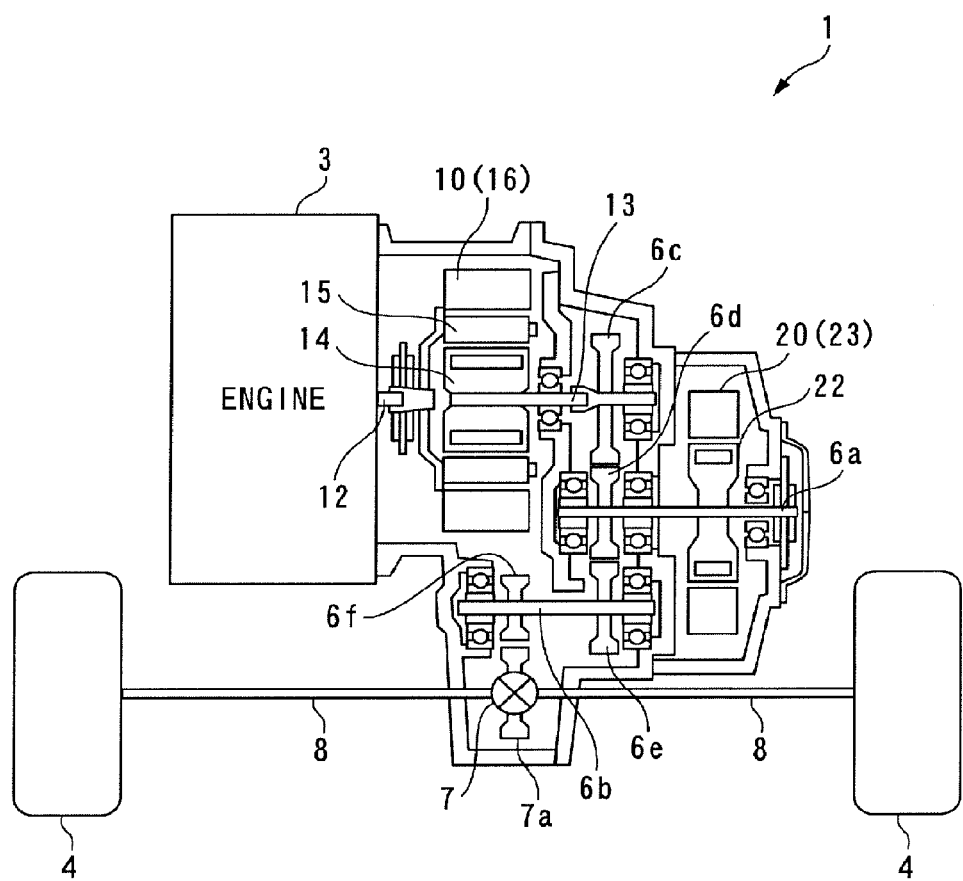
FIG. 16 A diagram showing another variation of the arrangement of the first rotating machine and the second rotating machine.

Further, as shown in FIG. 16, the first rotor 14 of the first rotating machine 10, and the rotor 22 of the second rotating machine 20 may be arranged on different shafts. It should be noted that in FIG. 16, hatching in cross-sections are omitted for ease of understanding. As shown in the figure, in the second rotating machine 20, the rotor 22 is provided not on the above-described output shaft 13 but on the first gear shaft 6a. This makes it possible to improve the degree of freedom in design of the power plant 1 in respect of the arrangement of the two rotating machines 10 and 20.

On the other hand, in the power plant 1 according to the first embodiment, as shown in FIG. 17, the gear mechanism 6 may be replaced by a transmission (indicated by "T/M" in the FIG. 50. The transmission 50 changes the speed reducing ratio between the output shaft 13 and the front wheels 4 in a stepped or stepless manner and the MOT•ECU 30 controls the speed change operation. It should be noted that as the transmission 50, there may be employed any of a stepped automatic transmission equipped with a torque converter, a belt-type stepless transmission, a toroidal-type stepless transmission, an automatic MT (stepped automatic transmission which executes a connecting or disconnecting operation of a clutch and a speed change operation, using an actuator), etc. as appropriate.

With this arrangement, it is possible to set the torque to be transmitted to the transmission 50 via each of the first rotating machine 10 and the second rotating machine 20 to a small value, e.g. by setting the speed reducing ratio of the transmission 50 for a low-rotational speed and high-load region to a large value, whereby the first rotating machine 10 and the second rotating machine 20 can be made more compact in size. On the other hand, it is possible to reduce the rotational speed of the first rotating machine 10 and the second rotating machine 20, by setting the speed reducing ratio of the transmission 50 for a high-rotational speed and high-load region to a small value. Therefore, in the case of the first rotating machine 10, it is possible to reduce the magnetic field rotational speed, and hence it is possible to reduce energy loss and improve the transmission efficiency as well as prolong the service life thereof. Further, as for the second rotating machine 20, it is possible to improve the operating efficiency and prolong the service life thereof.

Figure 18:
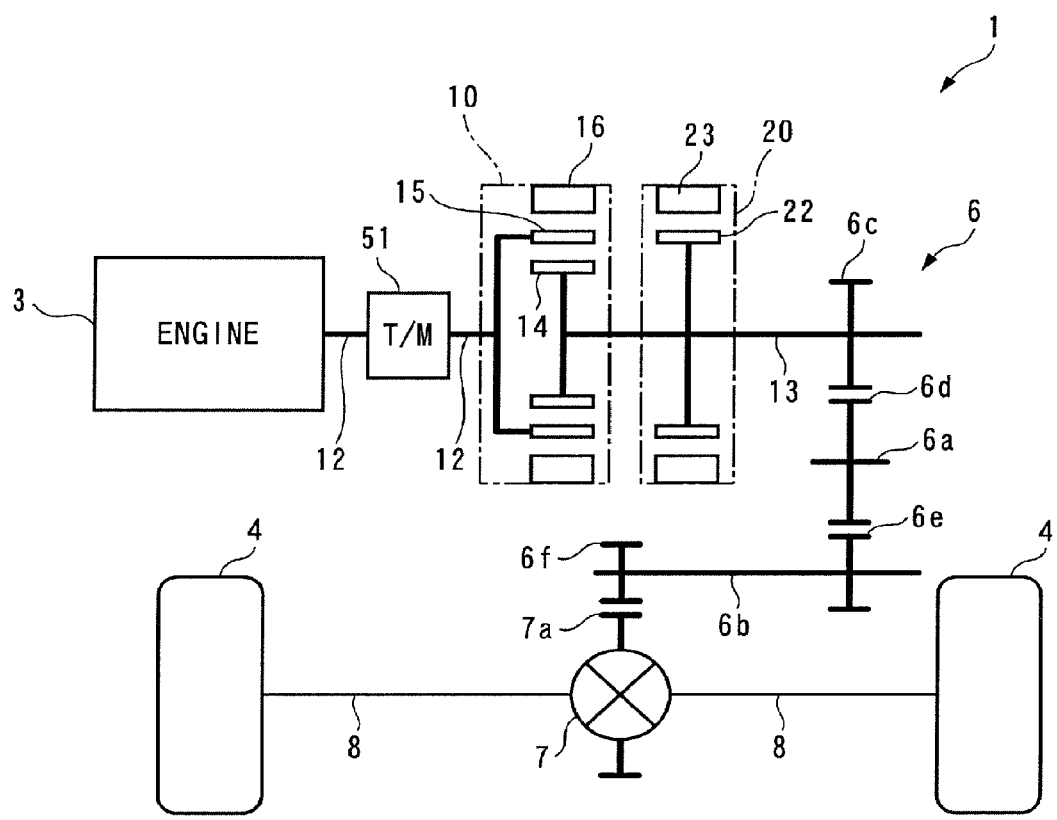
FIG. 18 A diagram showing another example in which a transmission is provided in the power plant according to the first embodiment.

Further, in the power plant 1 according to the first embodiment, as shown in FIG. 18, a transmission 51 may be interposed in an intermediate portion of the input shaft 12 extending between the engine 3 and the second rotor 15. The transmission 51 changes a speed increasing ratio between the engine 3 and the second rotor 15 in a stepped or stepless manner and the MOT•ECU 30 controls the speed change operation. It should be noted that as the transmission 51, similarly to the transmission 50, there may be employed any of a stepped automatic transmission equipped with a torque converter, a belt-type stepless transmission, a toroidal-type stepless transmission, an automatic MT, etc. on an as-needed basis.

With this arrangement, e.g. by setting both the speed increasing ratio of the transmission 51 for a low-rotational speed and high-load region and a final speed reducing ratio of a final reducer (i.e. the differential gear mechanism 7) to large values, it is possible to set the torque to be transmitted to the final reducer side via the first rotating machine 10 and the second rotating machine 20 to a small value, whereby the first rotating machine 10 and the second rotating machine 20 can be made more compact in size. On the other hand, by setting the speed increasing ratio of the transmission 51 for a high-vehicle speed and high-load region to a small value (or 1:1), it is possible to reduce the rotational speed of the first rotating machine 10 and that of the second rotating machine 20. Therefore, as described above, in the case of the first rotating machine 10, it is possible to reduce the magnetic field rotational speed, whereby it is possible to reduce the energy loss and improve the transmission efficiency as well as prolong the service life thereof. Further, as for the second rotating machine 20, it is possible to improve the operating efficiency and prolong the service life thereof.

Further, in the power plant 1 according to the first embodiment, as shown in FIG. 19, the location of the gear mechanism 6 may be changed to a portion of the output shaft 13 between the first rotor 14 and the second rotor 22, and a transmission 52 may be provided in a portion of the output shaft 13 between the gear mechanism 6 and the rotor 22. The transmission 52 changes the speed reducing ratio between the rotor 22 and the gear 6c in a stepped or stepless manner and the MOT•ECU 30 controls the speed change operation. It should be noted that as the transmission 52, similarly to the transmission 50 described above, there may be employed any of a stepped automatic transmission equipped with a torque converter, a belt-type stepless transmission, a toroidal-type stepless transmission, an automatic MT, etc. on an as-needed basis.

With this arrangement, e.g. by setting the speed reducing ratio of the transmission 52 for a low-rotational speed and high-load region to a large value, it is possible to set the torque to be transmitted from the second rotating machine 20 to the front wheels 4 to a small value, whereby the second rotating machine 20 can be made more compact in size. On the other hand, by setting the speed reducing ratio of the transmission 52 for a high-vehicle speed and high-load region to a small value, it is possible to reduce the rotational speed of the second rotating machine 20, whereby it is possible to improve the operating efficiency and prolong the service life thereof, as described above.

Figure 20:
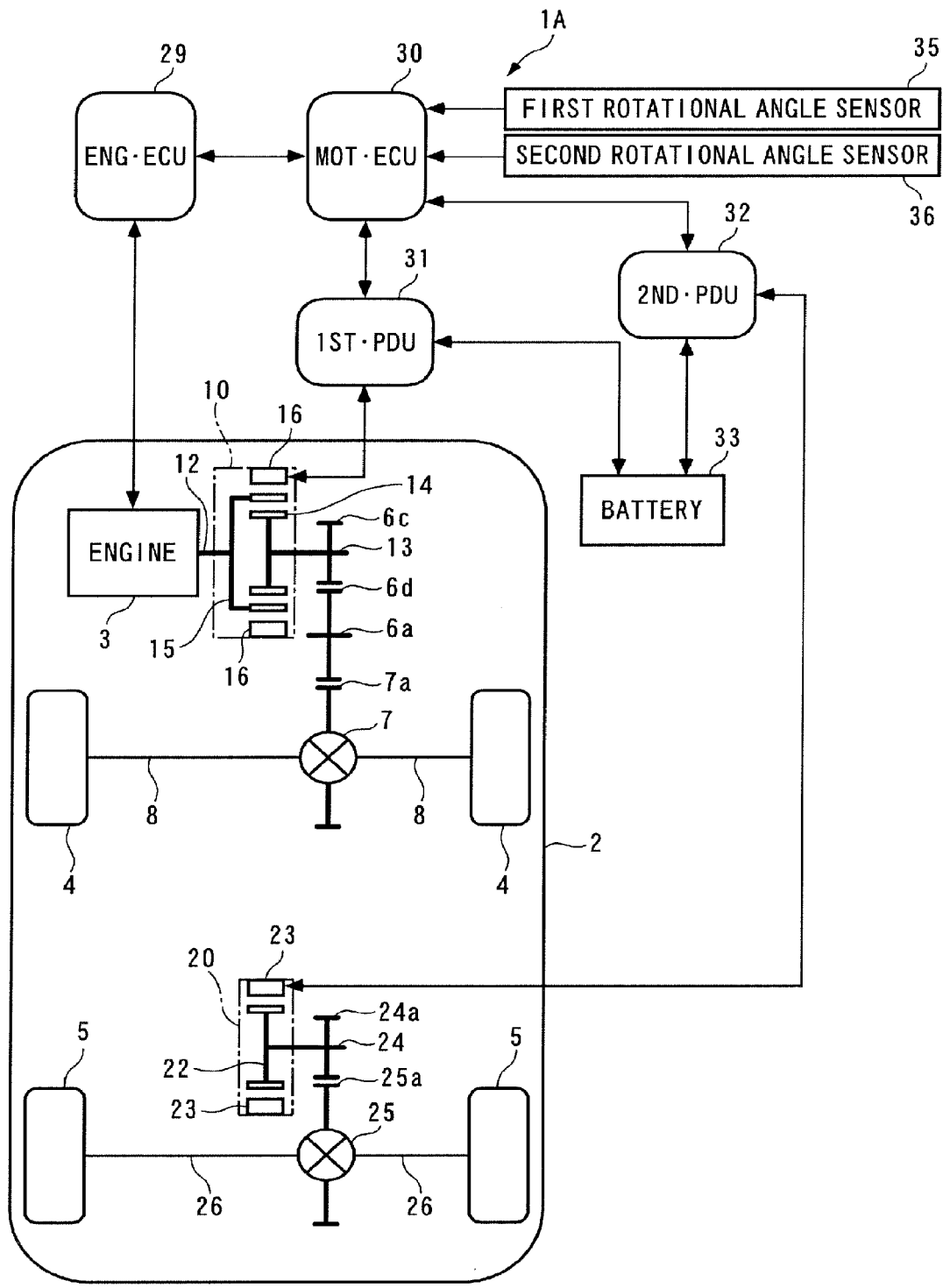
FIG. 20 A diagram showing the general arrangement of a power plant according to a second embodiment.

Next, a power plant 1A according to a second embodiment of the present invention will be described with reference to FIG. 20. As shown in the figure, the power plant 1A is distinguished from the power plant 1 according to the first embodiment in that the second rotating machine 20 is employed as a motive power source for driving the rear wheels, and in the other respects, the power plant 1A is configured substantially similarly to the power plant 1 according to the first embodiment. Therefore, the following description will be given mainly of points different from the power plant 1 according to the first embodiment, and component elements of the power plant 1A identical to those of the power plant 1 according to the first embodiment are denoted by identical reference numerals, with detailed description omitted.

In the power plant 1A, the gear 6d on the first gear shaft 6a is in constant mesh with the gear 7a of the differential gear mechanism 7, whereby the rotation of the output shaft 13 is transmitted to the front wheels 4 and 4 via the gears 6c and 6d, and the differential gear mechanism 7.

Further, the second rotating machine 20 is connected to the left and right rear wheels 5 and 5 via a differential gear mechanism 25, and left and right drive shafts 26 and 26, whereby as described hereinbelow, the motive power from the second rotating machine 20 is transmitted to the rear wheels 5 and 5 (second driven part).

The rotor 22 of the second rotating machine 20 is concentrically fixed to a left end of a gear shaft 24, and a gear 24a is connected to a right end of the gear shaft 24 concentrically with the gear shaft 24. The gear 24a is in constant mesh with a gear 25a of the differential gear mechanism 25. With the above arrangement, the motive power from the second rotating machine 20 is transmitted via the gear 24a and the differential gear mechanism 25 to the rear wheels 5 and 5.

According to the power plant 1A of the present embodiment, constructed as described above, it is possible to obtain the same advantageous effects as provided by the power plant 1 according to the first embodiment. In addition, at the start of the vehicle 2, by supplying electric power regenerated by the first rotating machine 10 to the second rotating machine 20, the vehicle 2 can be started in an all-wheel drive state, whereby it is possible to improve startability on low μ roads including a snowy road. Further, also during traveling, the vehicle 2 can run in an all-wheel drive state, which makes it possible to improve traveling stability of the vehicle 2 on low μ roads.

Figure 21:
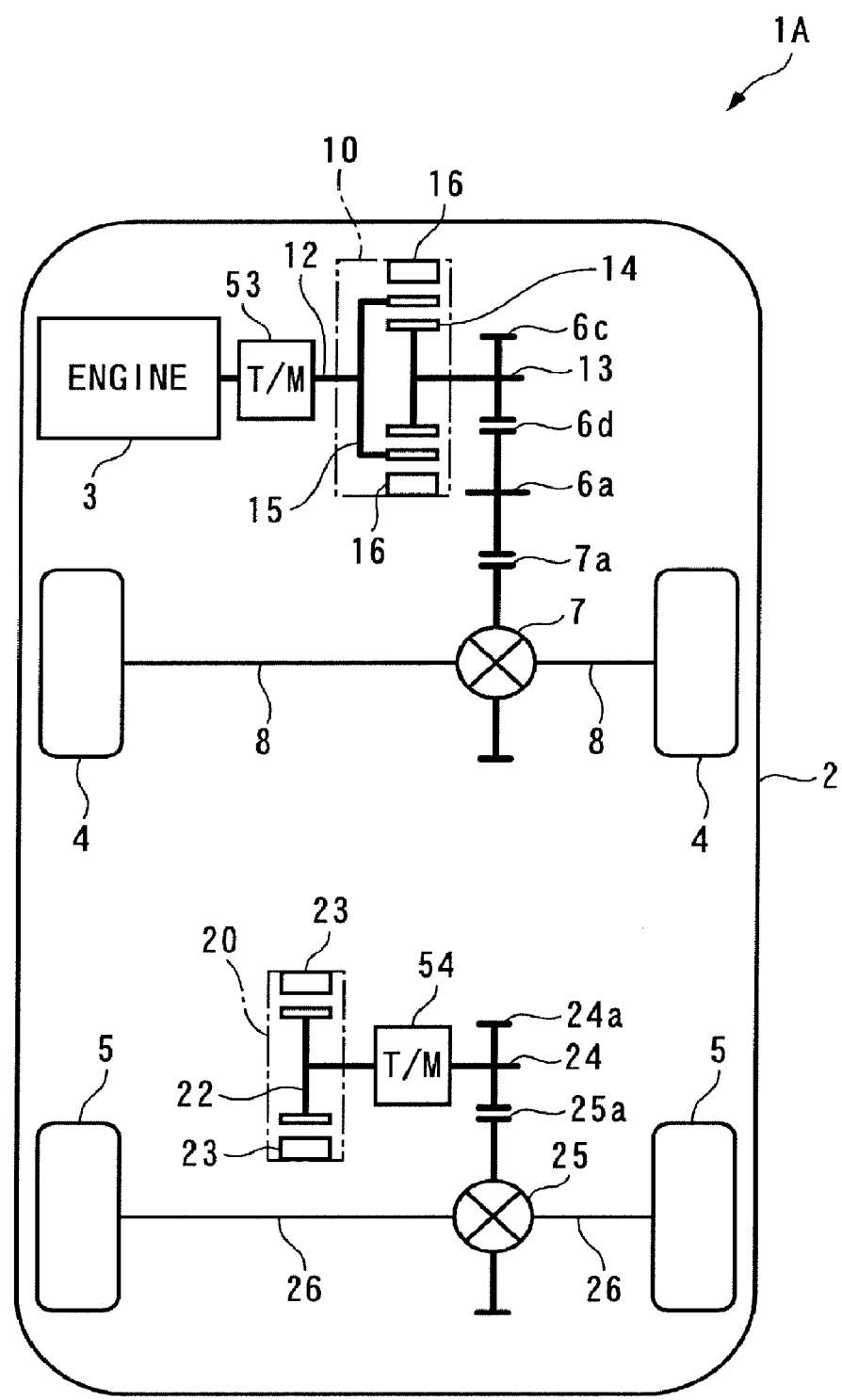
FIG. 21 A diagram showing an example in which a transmission is provided in the power plant according to the second embodiment.

Further, in the power plant 1A according to the second embodiment, as shown in FIG. 21, a transmission 53 may be provided in an intermediate portion of the input shaft 12 extending between the engine 3 and the second rotor 15, and a transmission 54 may be provided in a portion of the gear shaft 24 between the gear 24a and the rotor 22. The transmission 53 changes the speed increasing ratio between the engine 3 and the second rotor 15 in a stepped or stepless manner and the MOT•ECU 30 controls the speed change operation. Further, the transmission 54 changes the speed reducing ratio between the second rotating machine 20 and the rear wheels 5 in a stepped or stepless manner and the MOT•ECU 30 controls the speed change operation. It should be noted that as the transmissions 53 and 54, similarly to the transmission 50 described above, there may be employed any of a stepped automatic transmission equipped with a torque converter, a belt-type stepless transmission, a toroidal-type stepless transmission, an automatic MT, etc. on an as-needed basis.

With this arrangement, e.g. by setting both the speed increasing ratio of the transmission 53 for a low-rotational speed and high-load region and the final speed reducing ratio of a final reducer (i.e. the differential gear mechanism 7) to large values, it is possible to set the torque to be transmitted to a final reducer side via the first rotating machine 10 to a small value, whereby the first rotating machine 10 can be made more compact in size. On the other hand, by setting the speed increasing ratio of the transmission 53 for a high-vehicle speed and high-load region to a small value (or 1:1), it is possible to reduce the rotational speed of the first rotating machine 10. This enables, as described above, the first rotating machine 10 to reduce the magnetic field rotational speed thereof, whereby it is possible to reduce the energy loss and improve the transmission efficiency as well as prolong the service life thereof.

Further, for example, by setting the speed reducing ratio of the transmission 54 for a low-rotational speed and high-load region to a large value, it is possible to set the torque to be generated by the second rotating machine 20 to a small value, whereby the second rotating machine 20 can be made more compact in size. On the other hand, by setting the speed reducing ratio of the transmission 54 for a high-vehicle speed and high-load region to a small value, it is possible to reduce the rotational speed of the second rotating machine 20, whereby it is possible to improve the operating efficiency and prolong the service life of the second rotating machine 20.

It should be noted that although in the example shown in FIG. 21, the two transmissions 53 and 54 are provided in the power plant 1A, one of the transmissions 53 and 54 may be omitted.

Figure 22:
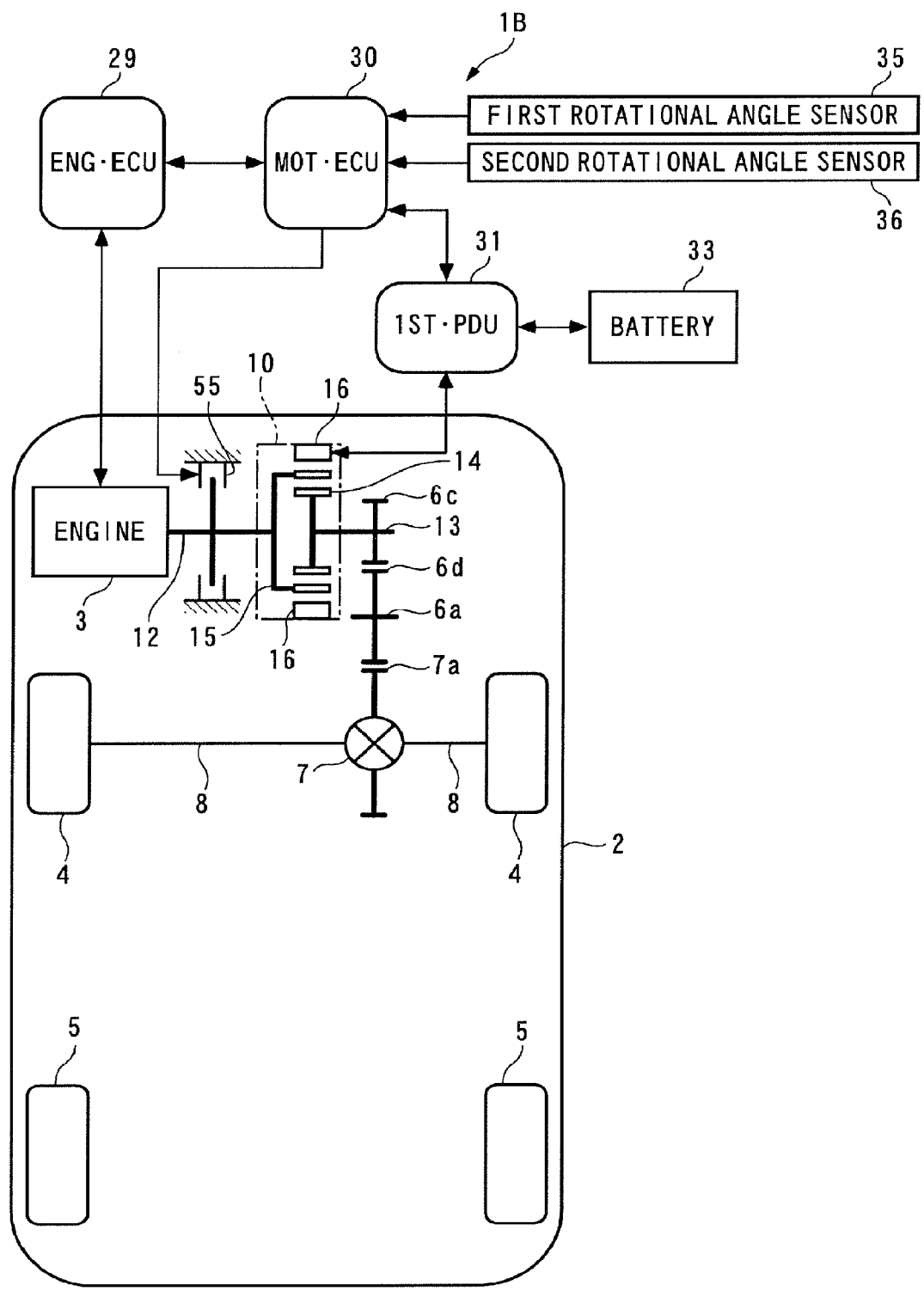
FIG. 22 A diagram showing the general arrangement of a power plant according to a third embodiment.

Next, a power plant 1B according to a third embodiment of the present invention will be described with reference to FIG. 22. As shown in the figure, the power plant 1B is distinguished from the power plant 1 according to the first embodiment in that the second rotating machine 20 and the 2ND•PDU 32 are omitted, and an electromagnetic brake 55 is added, and in the other respects, the power plant 1B is configured substantially similarly to the power plant 1 according to the first embodiment. Therefore, the following description will be given mainly of points different from the power plant 1 according to the first embodiment, and component elements of the power plant 1B identical to those of the power plant 1 according to the first embodiment are denoted by identical reference numerals, with detailed description omitted.

In the power plant 1B, similarly to the aforementioned power plant 1A according to the second embodiment, the gear 6d on the first gear shaft 6a is in constant mesh with the gear 7a of the differential gear mechanism 7, whereby the rotation of the output shaft 13 is transmitted to the front wheels 4 and 4 via the gears 6c and 6d and the differential gear mechanism 7.

Further, the electromagnetic brake 55 (brake device) is provided on the input shaft 12 between the first rotating machine 10 and the engine 3, and is electrically connected to the MOT•ECU 30. The ON/OFF state of the electromagnetic brake 55 is switched by the MOT•ECU 30. In the OFF state, the electromagnetic brake 55 permits rotation of the input shaft 12, whereas in the ON state, the electromagnetic brake 55 brakes the rotation of the input shaft 12.

Next, a description will be given of control of the first rotating machine 10 and the electromagnetic brake 55 by the MOT•ECU 30. It should be noted the electromagnetic brake 55 is controlled to the ON state only when rotating machine-driven start control, described hereinafter, is executed, and in the other various types of control than the rotating machine-driven start control, it is held in the OFF state.

First, a description will be given of engine start control. The engine start control is for starting the engine 3 by the motive power from the first rotating machine 10 when the aforementioned predetermined engine-starting conditions are satisfied in a state where the engine 3 is at rest and the vehicle 2 is at a stop. More specifically, when the predetermined engine-starting conditions are satisfied, the electric power is supplied from the battery 33 to the first rotating machine 10 via the 1ST•PDU 31, whereby, as described above, the second rotor 15 is driven with the first rotor 14 remaining at rest. As a result, the engine 3 is started.

Further, in a case where the engine 3 is in operation with the vehicle at a stop, when the aforementioned predetermined vehicle-starting conditions are satisfied, the vehicle start control is executed. In the vehicle start control, if the predetermined vehicle-starting conditions are satisfied, first, the first rotating machine 10 regenerates electric power from motive power from the engine 3 (i.e. performs electric power generation). Then, after the start of the electric power regeneration, the first rotating machine 10 is controlled such that the regenerated electric power is reduced. This makes it possible to start the vehicle 2 by the motive power from the engine 3 while preventing engine stalling.

Further, when the vehicle 2 is traveling with the engine 3 in operation, distribution control of engine power is executed. In the distribution control, depending on operating conditions of the engine 3 (e.g. the engine speed NE and the accelerator pedal opening AP) and/or traveling conditions of the vehicle 2 (e.g. the vehicle speed VP), the first rotating machine 10 is controlled such that a ratio between part of motive power output from the engine 3, which is transmitted via the first rotor 14 to the front wheels 4, and part of the same, from which electric power is regenerated by the first rotating machine 10, is changed. This makes it possible to cause the vehicle 2 to travel while appropriately controlling the regenerated electric power, depending on the operating conditions of the engine 3 and/or the traveling conditions of the vehicle 2.

Further, during the distribution control, when the aforementioned predetermined power-transmitting conditions are satisfied, the first rotating machine 10 is controlled such that the rotational speed of the rotating magnetic field of the stator 16 becomes equal to 0, whereby insofar as the motive power from the engine 3 is within a range capable of being transmitted by magnetism, it is possible to transmit all the motive power to the front wheels 4 by magnetism via the second rotor 15 and the first rotor 14.

On the other hand, in a case where the vehicle 2 is traveling with the engine 3 in operation (including when the engine 3 is in a decelerating fuel-cut operation), when the motive power from the engine is being regenerated as electric power, if the remaining charge SOC of the battery 33 is not higher than the aforementioned predetermined value SOC_REF, the regenerated electric power is supplied to the battery 33 whereby charge control for charging the battery 33 is executed. It should be note that also when the electric power regeneration is performed during the above-described vehicle start control, if the remaining charge SOC of the battery 33 is not higher than the predetermined value SOC_REF, the charge control for charging the battery 33 is executed. This makes it possible to secure sufficient remaining charge SOC of the battery 33.

Further, in a case where the vehicle 2 is traveling with engine 3 in operation, when predetermined assist conditions are satisfied, the assist control is executed. More specifically, electric power in the battery 33 is supplied to the first rotating machine 10, and the first rotating machine 10 is controlled such that the front wheels 4 are driven by motive power from the engine 3 and motive power from the first rotating machine 10. With this control, the vehicle 2 can perform assist traveling by using the first rotating machine 10 as a motive power source, in addition to the engine 3.

Further, in a case where the engine 3 is at rest and the vehicle 2 is at a stop, when the aforementioned predetermined rotating machine-driven vehicle-starting conditions are satisfied, the electromagnetic brake 55 is turned on to brake the second rotor 15, and at the same time, electric power is supplied from the battery 33 to the first rotating machine 10, whereby powering control of the first rotating machine 10 is executed. This makes it possible to drive the front wheels 4 by the first rotating machine 10 with the engine 3 left at rest, to thereby start the vehicle 2. As a result, it is possible to improve fuel economy.

Figure 23:
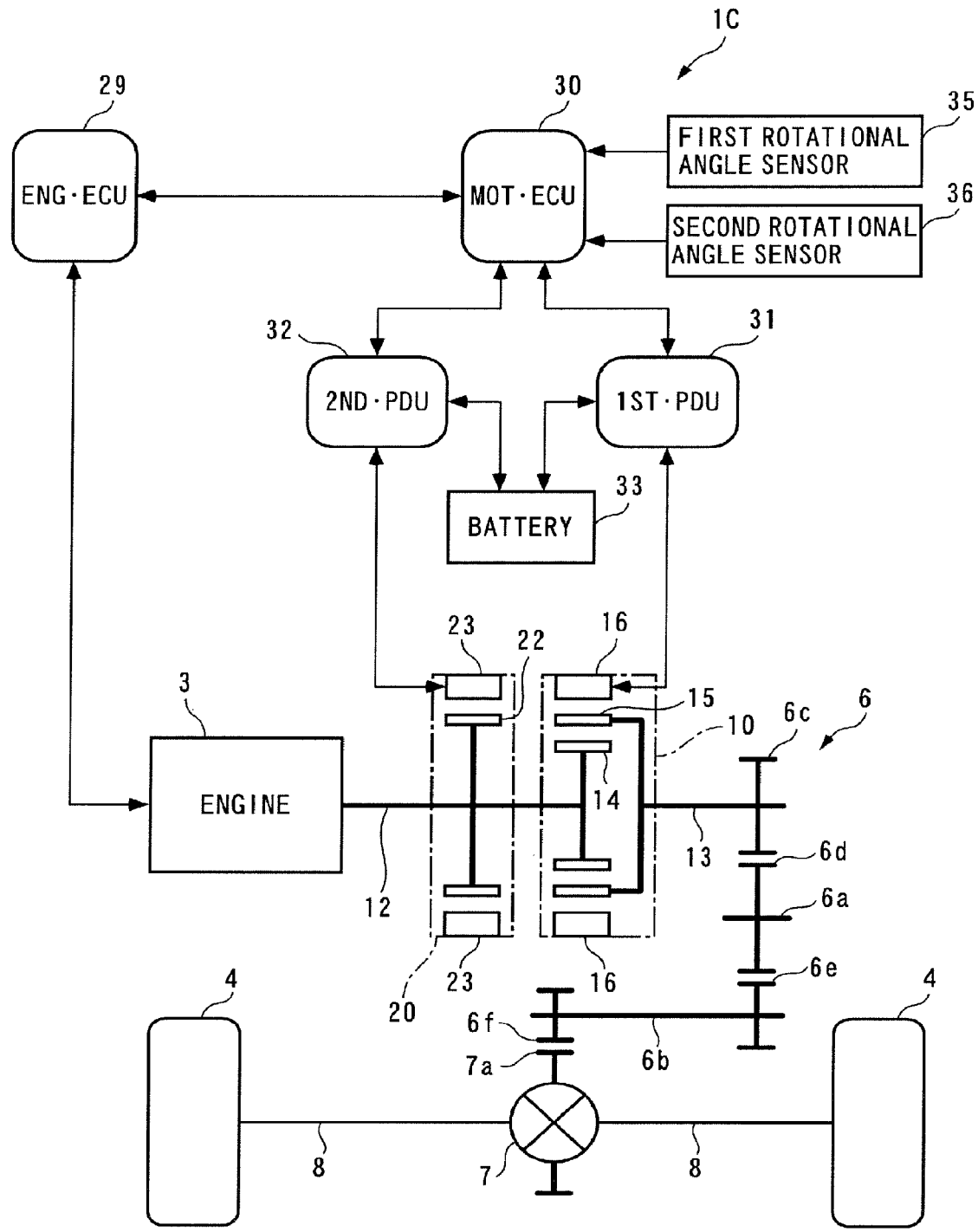
FIG. 23 A diagram showing the general arrangement of a power plant according to a fourth embodiment.

Next, a power plant 1C according to a fourth embodiment of the present invention will be described with reference to FIG. 23. As shown in the figure, the power plant 1C is distinguished from the power plant 1 according to the first embodiment in the arrangement of the first rotating machine 10 and the second rotating machine 20, but in the other respects, the power plant 1C is constructed substantially similarly to the power plant 1 according to the first embodiment. Therefore, the following description will be given mainly of points different from the power plant 1 according to the first embodiment, and component elements of the power plant 1C identical to those of the power plant 1 according to the first embodiment are denoted by identical reference numerals, with detailed description omitted.

In the power plant 1C, the second rotating machine 20 is disposed between the engine 3 and the first rotating machine 10, and the rotor 22 of the second rotating machine 20 is concentrically fixed to a predetermined portion of the input shaft 12 (rotating shaft). Further, in the first rotating machine 10, the first rotor 14 is concentrically fixed to the right end of the input shaft 12 on the downstream side of the rotor 22, and the second rotor 15 is concentrically fixed to the left end of the output shaft 13. With this arrangement, during operation of the first rotating machine 10, when the second rotor 15 is rotating, motive power thereof is transmitted to the front wheels 4 and 4.

Next, a description will be given of a method of controlling both the first rotating machine 10 and the second rotating machine 20 by the MOT•ECU 30 during operation of the vehicle. First, a description will be given of engine start control performed when the vehicle 2 is at a stop. In this control, in a case where the engine 3 is at rest and the vehicle 2 is at a stop, when the aforementioned predetermined starting conditions are satisfied, electric power is supplied from the battery 33 to the first rotating machine 10 and/or the second rotating machine 20, and powering control of the first rotating machine 10 and/or the second rotating machine 20 is executed such that motive power from the first rotating machine 10 and/or the second rotating machine 20 is transmitted to the engine 3 via the input shaft 12. With this control, the engine 3 can be started by the motive power from the first rotating machine 10 and/or the second rotating machine 20.

Further, in a case where the vehicle 2 is at a stop with the engine 3 in operation, when the aforementioned predetermined vehicle-starting conditions are satisfied, vehicle start control is executed. More specifically, when the vehicle 2 is at a stop, motive power from the engine 3 is transmitted to the input shaft 12, whereby the first rotor 14 of the first rotating machine 10 is driven. In this state, if the first rotating machine 10 is controlled such that electric power regeneration is executed by the first rotating machine 10 and the regenerated electric power is supplied to the second rotating machine 20, the rotor 22 of the second rotating machine 20 drives the first rotor 14, whereby energy recirculation occurs. In this state, if the electric power regenerated by the first rotating machine 10 is controlled to be reduced, the second rotor 15 of the first rotating machine 10 rotates to drive the output shaft 13, which drives the front wheels 4 and 4, whereby the vehicle 2 is started. By controlling, after the start of the vehicle 2, the electric power regenerated by the first rotating machine 10 such that it is further reduced, and by executing, after the direction of the rotation of the magnetic field of the stator 16 of the first rotating machine 10 is changed from reverse rotation to normal rotation, regeneration control of the second rotating machine 20 and powering control of the first rotating machine 10, the vehicle speed is increased.

Further, when the vehicle 2 is traveling with the engine 3 in operation, speed change control is executed. In the speed change control, depending on operating conditions of the engine 3 (e.g. the engine speed NE, the accelerator pedal opening AP, etc.) and/or traveling conditions of the vehicle 2 (e.g. the vehicle speed VP), the second rotating machine 20 is controlled such that a ratio between part of motive power output from the engine 3, which is transmitted via the input shaft 12 to the first rotor 14, and part of the same, from which electric power is regenerated by the second rotating machine 20, is changed, and the first rotating machine 10 is controlled by supplying the regenerated electric power to the first rotating machine 10. In this case, the first rotating machine 10 can be operated such that it exhibits operating characteristics similar to those of a planetary gear unit, as described hereinabove, and hence by controlling the second rotating machine 20, as described above, and controlling the first rotating machine 10 by supplying the regenerated electric power to the first rotating machine 10, it is possible to change the ratio between the rotational speed of the input shaft 12 and that of the output shaft 13, in other words, the ratio between the engine speed NE and the drive shaft speed ND as desired while transmitting all the motive power from the engine 3 to the front wheels 4 via the first rotating machine 10 and the second rotating machine 20, provided that electrical losses are ignored. In short, by controlling the two rotating machines 10 and 20, it is possible to realize the functions of an automatic transmission.

Further, during the speed change control, when the aforementioned predetermined power-transmitting conditions are satisfied, the regeneration of electric power by the first rotating machine 10 is stopped, and the rotational speed of the rotating magnetic field of the stator 16 is controlled to 0 by supplying lock current to the stator 16 or executing phase-to-phase short circuit control of the first rotating machine 10. When such control is performed, insofar as the motive power from the engine 3 is within a range capable of being transmitted by magnetism, it is possible to transmit all the motive power from the engine 3 to the front wheels 4 by magnetism, so that it is possible to enhance power transmission efficiency, compared with the case in which electric power regenerated by the first rotating machine 10 is caused to be supplied to the second rotating machine 20 via the 2ND•PDU 32.

On the other hand, in a case where the vehicle 2 is traveling with the engine 3 in operation (including when the engine 3 is in a decelerating fuel-cut operation), when the remaining charge SOC of the battery 33 is not higher than the aforementioned predetermined value SOC_REF, the electric power regenerated by the first rotating machine 10 and/or the second rotating machine 20 is controlled and the charge control for charging the battery 33 is executed. This makes it possible to secure sufficient remaining charge SOC of the battery 33. It should be noted that during execution of the vehicle start control and the speed change control, described above, if the remaining charge SOC of the battery 33 is not higher than the predetermined value SOC_REF, the charge control for charging the battery 33 may be executed.

Further, when the aforementioned predetermined assist conditions are satisfied with the engine 3 in operation, the assist control is executed. More specifically, by supplying electric power from the battery 33 to the first rotating machine 10 and/or the second rotating machine 20, the first rotating machine 10 and/or the second rotating machine 20 are/is controlled such that motive power from the first rotating machine 10 and/or the second rotating machine 20, and motive power from the engine 3 are transmitted to the front wheels 4. With this control, in addition to the engine 3, the first rotating machine 10 and/or the second rotating machine 20 are/is used as motive power source(s), whereby the vehicle 2 can perform assist traveling or assist starting.

Further, in a case where the engine 3 is at rest and the vehicle 2 is at a stop, when the aforementioned predetermined rotating machine-driven vehicle-starting conditions are satisfied, the rotating machine-driven start control is executed. More specifically, electric power is supplied from the battery 33 to the second rotating machine 20 via the 2ND•PDU 32, with the engine 3 left at rest, and the second rotating machine 20 (brake device) is controlled such that the rotor 22 is held in a rotation-inhibited state, whereby the rotation of the first rotor 14 is braked, and electric power is supplied from the battery 33 to the first rotating machine 10 via the 1ST•PDU 31 to control powering of the first rotating machine 10. As a result, the electric power of the first rotating machine 10 is transmitted to the output shaft 13 by magnetism as motive power, whereby the vehicle 2 can be started.

Next, a description will be given of a control method in which during operation of the vehicle 2, the control of the second rotating machine 20 by the MOT•ECU 30 is stopped, and only the first rotating machine 10 is controlled by the MOT•ECU 30. First, if the vehicle 2 is at a stop with the engine 3 is in operation, when the aforementioned predetermined vehicle-starting conditions are satisfied, vehicle start control is executed. In the vehicle start control, when the predetermined vehicle-starting conditions are satisfied, first, the first rotating machine 10 regenerates electric power from motive power from the engine 3. Then, after the start of the electric power regeneration, the first rotating machine 10 is controlled such that the regenerated electric power is reduced. This makes it possible to start the vehicle 2 by the motive power from the engine 3 while avoiding engine stalling.

Further, when the vehicle 2 is traveling with the engine 3 in operation, distribution control of engine power is executed. In the distribution control, depending on operating conditions of the engine 3 (e.g. the engine speed NE and the accelerator pedal opening AP) and/or traveling conditions of the vehicle 2 (e.g. the vehicle speed VP), the first rotating machine 10 is controlled such that a ratio between part of motive power output from the engine 3, which is transmitted via the second rotor 15 to the front wheels 4, and part of the same, from which electric power is regenerated by the first rotating machine 10, is changed. This makes it possible to cause the vehicle 2 to travel while appropriately controlling the regenerated electric power, depending on the operating conditions of the engine 3 and/or the traveling conditions of the vehicle 2.

Further, during the distribution control, when the aforementioned predetermined power-transmitting conditions are satisfied, the first rotating machine 10 is controlled such that the rotational speed of the rotating magnetic field of the stator 16 becomes equal to 0, whereby insofar as the motive power from the engine 3 is within a range capable of being transmitted by magnetism, it is possible to transmit all the motive power to the front wheels 4 by magnetism via the first rotor 14 and the second rotor 15.

On the other hand, in a case where the vehicle 2 is traveling with the engine 3 in operation (including when the engine 3 is in a decelerating fuel-cut operation), and electric power is regenerated from motive power from the engine 3, when the remaining charge SOC of the battery 33 is not higher than the aforementioned predetermined value SOC_REF, the regenerated electric power is supplied to the battery 33 to thereby execute charge control for charging the battery 33. It should be noted that also when electric power regeneration is executed during the aforementioned vehicle start control, if the remaining charge SOC of the battery 33 is not higher than the predetermined value SOC_REF, the charge control for charging the battery 33 is executed. This makes it possible to secure sufficient remaining charge SOC of the battery 33.

Further, in a case where the aforementioned predetermined assist conditions are satisfied during traveling of the vehicle 2 with the engine 3 in operation, assist control is executed. More specifically, electric power is supplied from the battery 33 to the first rotating machine 10, and the first rotating machine 10 is controlled such that motive power from the engine 3 and motive power from the first rotating machine 10 drive the front wheels 4. With this control, in addition to the engine 3, the first rotating machine 10 is used as a motive power source, whereby the vehicle 2 can perform assist traveling. By thus controlling the first rotating machine 10 alone, it is possible to operate the vehicle 2.

As described above, according to the power plant 1C of the present embodiment, the engine 3, the vehicle 2 can be driven by using the first rotating machine 10, and the second rotating machine 20, as motive power sources. Further, the first rotating machine 10 is only required to be constructed such that it includes only one soft magnetic material element row, and hence it is possible to make the first rotating machine 10 more compact in size and reduce the manufacturing costs thereof, by corresponding extents. As a result, it is possible to reduce the size and manufacturing costs of the power plant 1C itself, and improve the degree of freedom in design. Further, as described above, by configuration of the pole pair number ratio α, i.e. pole number ratio m of the first rotating machine 10, it is possible to freely set the relationship between the three electric angular velocities and the relationship between the three torques in the first rotating machine 10, whereby it is possible to further improve the degree of freedom in design.

Next, a description will be given of changes in torques when the pole pair number ratio α (=pole number ratio m) is changed in the power plant 1C according to the fourth embodiment. More specifically, a description will be given of a case where when the vehicle 2 is traveling with the engine 3 in operation, electric power is regenerated from part of motive power from the engine 3 by the second rotating machine 20, and the regenerated electric power is supplied to the first rotating machine 10, whereby powering control of the first rotating machine 10 is executed, by way of example.

First, in the power plant 1C, let it be assumed that the pole pair number ratio α of the first rotating machine 10 is set to a desired value other than a value of 1, and the drive wheels are directly connected to the output shaft 13. In this case, assuming that an electric angular velocity of the input shaft 12, i.e. the first rotor 14 is ωENG, an electric angular velocity of the rotating magnetic field of the stator 16 is ωMG1, and an electric angular velocity of the output shaft 13, i.e. the second rotor 15 is ωOUT, the relationship between these electric angular velocities is expressed e.g. as shown in FIG. 24, and the following equation (59) holds:

$$\omega MG1 = (1+\alpha)\omega OUT - \alpha \cdot \omega ENG \tag{59}$$

Figure 24:
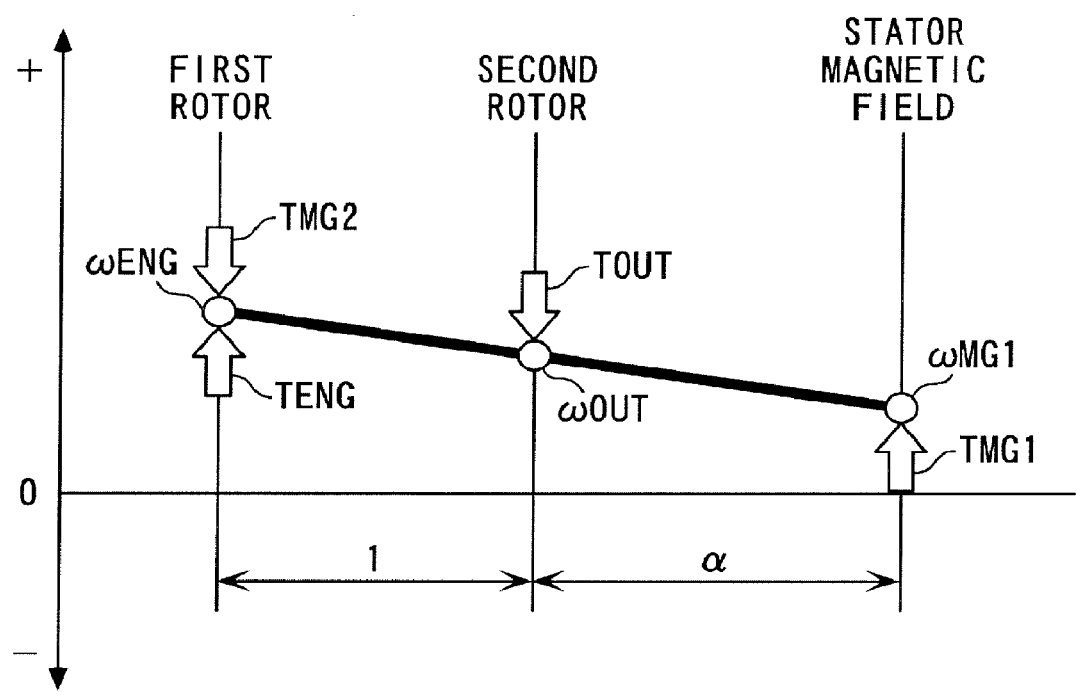
FIG. 24 A velocity nomograph illustrating an example of the relationship between three electrical angular velocities and three torques when the pole pair number ratio α in a first rotating machine of the power plant according to the forth embodiment is set to a desired value.

Further, assuming that a torque input from the engine 3 to the input shaft 12 is an engine torque TENG, a torque equivalent to the electric power supplied to the first rotating machine 10 and the electrical angular velocity ω MG1 is a first rotating machine torque TMG1, a torque equivalent to the electric power regenerated by the second rotating machine 20 and the electrical angular velocity ω MG2 is a second rotating machine torque TMG2, and a torque as a reaction force received by the drive wheels from a road surface, caused by the torque transmitted to the drive wheels is a driving torque TOUT, the following equations (60) and (61) hold, and the relationship between these torques is expressed e.g. as shown in FIG. 24. It should be noted that in the following equations (60) and (61), upward torques as viewed in FIG. 24 are represented by positive values.

$$TMG1 = -\frac{1}{1+\alpha}TOUT \tag{60}$$

$$TMG2 = -TENG - \frac{\alpha}{1+\alpha}TOUT \tag{61}$$

Here, the first and second rotating machine torques TMG1(α1) and TMG2(α1) assumed when the pole pair number ratio α is set to the above-mentioned first predetermined value α1 are expressed by the following equations (62) and (63), respectively:

$$TMG1(\alpha 1) = -\frac{1}{1+\alpha 1}TOUT \tag{62}$$

$$TMG2(\alpha 1) = -TENG - \frac{\alpha 1}{1+\alpha 1}TOUT \tag{63}$$

Further, the first and second rotating machine torques TMG1(α2) and TMG2(α2) assumed when the pole pair number ratio α is set to the above-mentioned second predetermined value α2 are expressed by the following equations (64) and (65), respectively:

$$TMG1(\alpha 2) = -\frac{1}{1+\alpha 2}TOUT \tag{64}$$

$$TMG2(\alpha 2) = -TENG - \frac{\alpha 2}{1+\alpha 2}TOUT \tag{65}$$

From the above equations (62) and (64), an amount of change ΔTMG1 of the first rotating machine torque TMG1 occurring when the pole pair number ratio α is changed from the first predetermined value α1 to the second predetermined value α2 is expressed by the following equation (66):

$$\Delta TMG1 = TMG1(\alpha 2) - TMG1(\alpha 1) \tag{66}$$

$$= -\frac{\alpha 1 - \alpha 2}{(1+\alpha 1)(1+\alpha 2)}TOUT$$

Further, from the above equations (63) and (65), an amount of change ΔTMG2 of the second rotating machine torque TMG2 occurring when the pole pair number ratio α is changed from the first predetermined value α1 to the second predetermined value α2 is expressed by the following equation (67):

$$\Delta TMG2 = TMG2(\alpha 2) - TMG2(\alpha 1) \tag{67}$$

$$= -\frac{\alpha 2 - \alpha 1}{(1+\alpha 1)(1+\alpha 2)}TOUT$$

Here, since TOUT<0, TMG1>0, TMG2<0, and α1<α2 hold, as is clear from the above equations (66) and (67), by changing the pole pair number ratio α from the first predetermined value α1 to the second predetermined value α2, the absolute values of the first and second rotating machine torques TMG1 and TMG2 are reduced. That is, it is understood that by setting the pole pair number ratio α to a larger value, it is possible to make the first and second rotating machines 10 and 20 more compact in size.

Further, assuming that electric power is not input and output between the two rotating machines 10 and 20, and the battery 33, the electric power regenerated by the second rotating machine 20 is supplied to the first rotating machine 10, as it is, so that there holds the following equation (68):

$$TMG1 = -\frac{\omega ENG}{\omega MG1} TMG2 \quad (68)$$

Further, if mechanical losses and electrical losses are ignored, there holds the following equation (69):

$$TENG \cdot \omega ENG = -TOUT \cdot \omega OUT \quad (69)$$

Here, assuming that the electric power supplied from the second rotating machine 20 to the first rotating machine 10 is a transmitted electric power WMG', and a ratio of the transmitted electric power WMG' to the engine output WENG is an output ratio RW', the output ratio RW' is calculated by the following equation (70):

$$RW' = \frac{WMG'}{WENG} \quad (70)$$
$$= \frac{-TMG2 \cdot \omega ENG}{TENG \cdot \omega ENG}$$
$$= -\frac{TMG1 \cdot \omega MG1}{TOUT \cdot \omega OUT}$$

When the relationship between the above-mentioned equations (59) and (60) is applied to the above equation (70), there is obtained the following equation (71):

$$RW' = 1 - \frac{\alpha}{1+\alpha} \cdot \frac{\omega ENG}{\omega OUT} \quad (71)$$

Here, when a speed reducing ratio R is defined as expressed by the following equation (72), and the thus defined speed reducing ratio R is applied to the above equation (71), there is obtained the following equation (73):

$$R = \frac{\omega ENG}{\omega OUT} \quad (72)$$

$$RW' = 1 - \frac{\alpha}{1+\alpha} \cdot R \quad (73)$$

From the above equation (73), the output ratios RW(α1)' and RW(α2)' obtained when the pole pair number ratio α is set to the first predetermined value α1 and the second predetermined value α2 are calculated by the following equations (74) and (75), respectively:

$$RW(\alpha 1)' = 1 - \frac{\alpha 1}{1+\alpha 1} \cdot R \quad (74)$$

$$RW(\alpha 2)' = 1 - \frac{\alpha 2}{1+\alpha 2} \cdot R \quad (75)$$

From the above equations (74) and (75), an amount of change ΔRW' of the output ratio occurring when the pole pair number ratio α is changed from the first predetermined value α1 to the second predetermined value α2 is expressed by the following equation (76):

$$\Delta RW' = RW(\alpha 2)' - RW(\alpha 1)' \quad (76)$$

-continued $$= -\frac{\alpha 2 - \alpha 1}{(1+\alpha 1)(1+\alpha 2)} \cdot R$$

Figure 25:
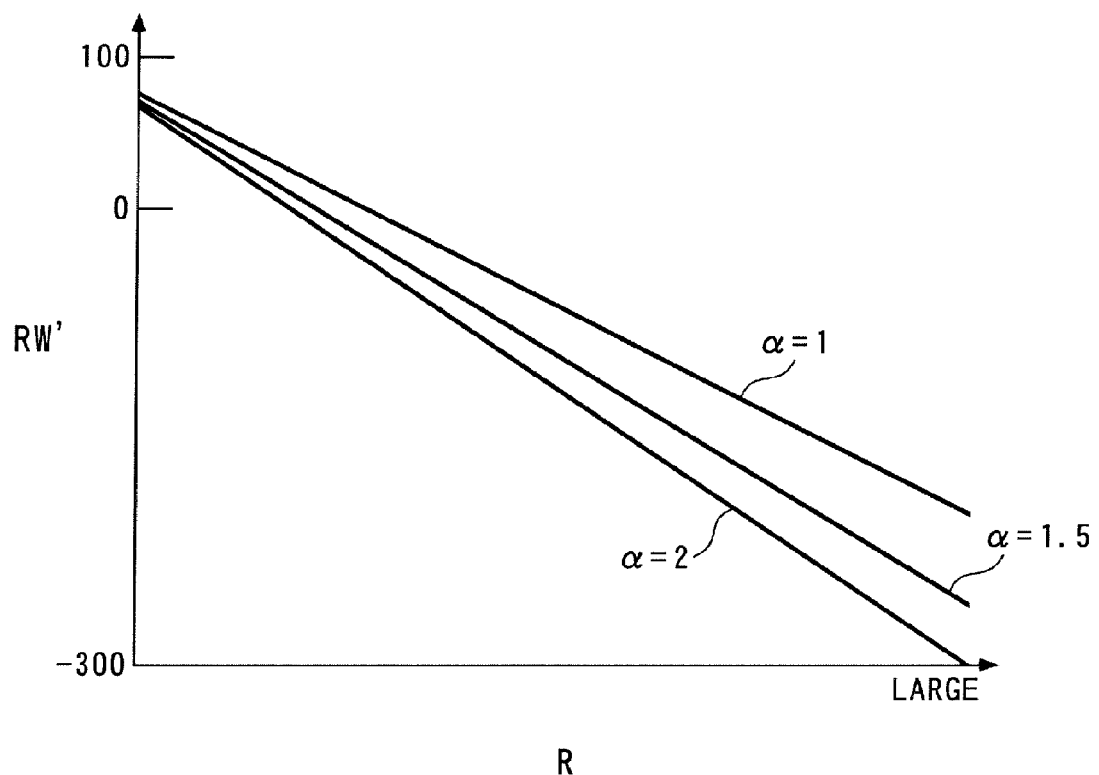
FIG. 25 A diagram showing the relationship between an output ratio RW' and the speed reducing ratio R when the pole pair number ratio α in the first rotating machine of the power plant according to the fourth embodiment is set to values of 1, 1.5, and 2.

In this equation, since α1<α2 holds, as is clear from the above equation (76), it is understood that by changing the pole pair number ratio α from the first predetermined value α1 to the second predetermined value α2, it is possible to reduce the output ratio RW', whereby it is possible to reduce the transmitted electric power WMG'. Further, in the above-mentioned equation (73), the relationships between the output ratio RW' and the speed reducing ratio R exhibited when the pole pair number ratio α is set to values of 1, 1.5, and 2 are expressed as shown in FIG. 25. As is clear from FIG. 25, it is understood that by setting the pole pair number ratio α to a larger value, it is possible to reduce the transmitted electric power WMG' throughout the whole range of the speed reducing ratio R. In general, from the viewpoint of efficiency, mechanical transmission or magnetic transmission of motive power is more advantageous than when electric power is converted to motive power by the rotating machine, and hence as described above, it is possible to improve transmission efficiency by reducing the transmitted electric power WMG'. That is, in the case of the power plant of the present invention, by setting the pole pair number ratio α (=pole number ratio m) to a larger value, it is possible to improve transmission efficiency.

Figure 26:
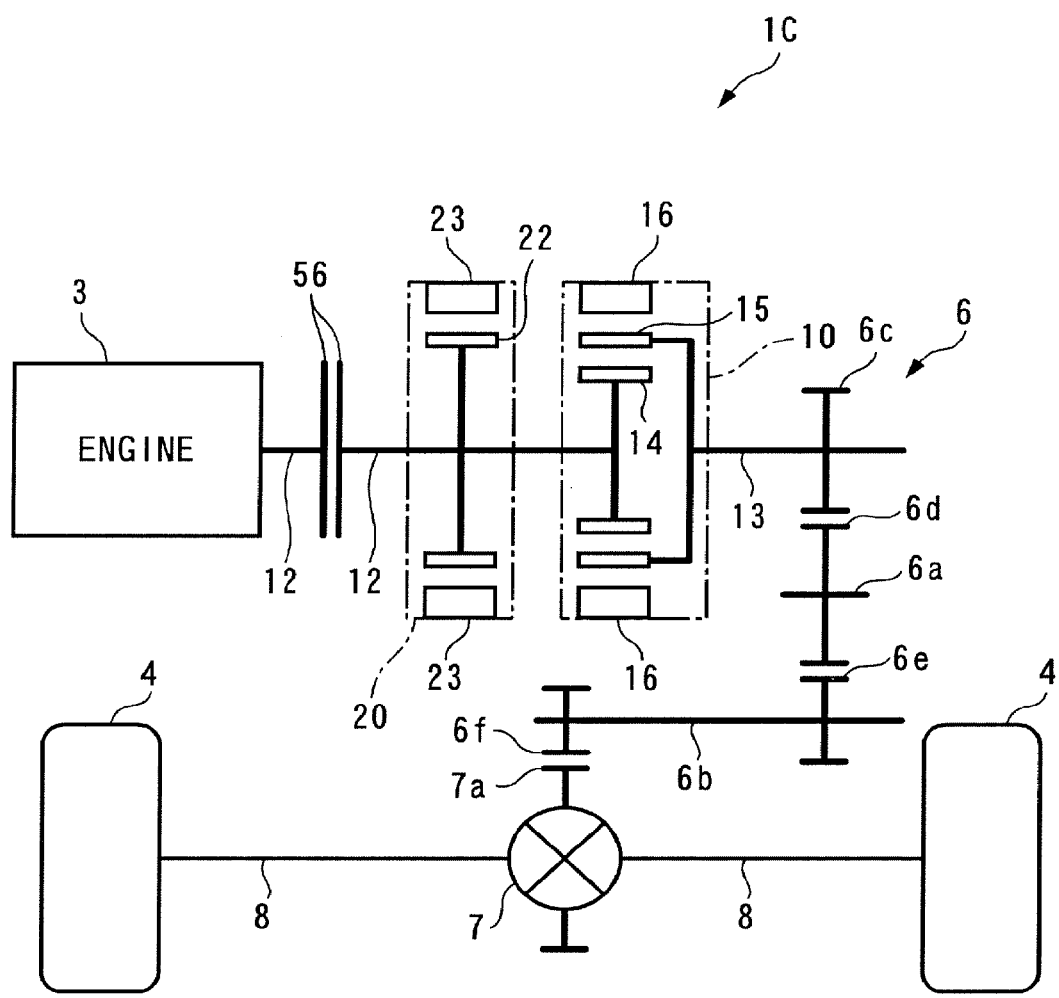
FIG. 26 A diagram showing an example in which a clutch is provided in the power plant according to the fourth embodiment.

Although the fourth embodiment is an example in which when starting the vehicle 2 with the engine 3 at rest, the second rotating machine 20 is controlled to a braked state, and the powering control of the first rotating machine 10 is executed, in place of this, as shown in FIG. 26, in the power plant 1C, a clutch 56 may be provided between the engine 3 and the second rotating machine 20. With this arrangement, when starting the vehicle 2 with the engine 3 left at rest, the MOT•ECU 30 holds the clutch 56 in a disconnected state, and in this state, at least one of the two rotating machines 10 and 20 is subjected to powering control. This makes it possible to start the vehicle 2 with the engine 3 left at rest, by motive power of at least one of the rotating machines 10 and 20. In this case, the clutch 56 may be any mechanism which executes or interrupts transmission of motive power, e.g. an electromagnetic clutch or a hydraulic clutch actuated by a hydraulic actuator, and which can be controlled by the MOT•ECU 30.

Figure 27:
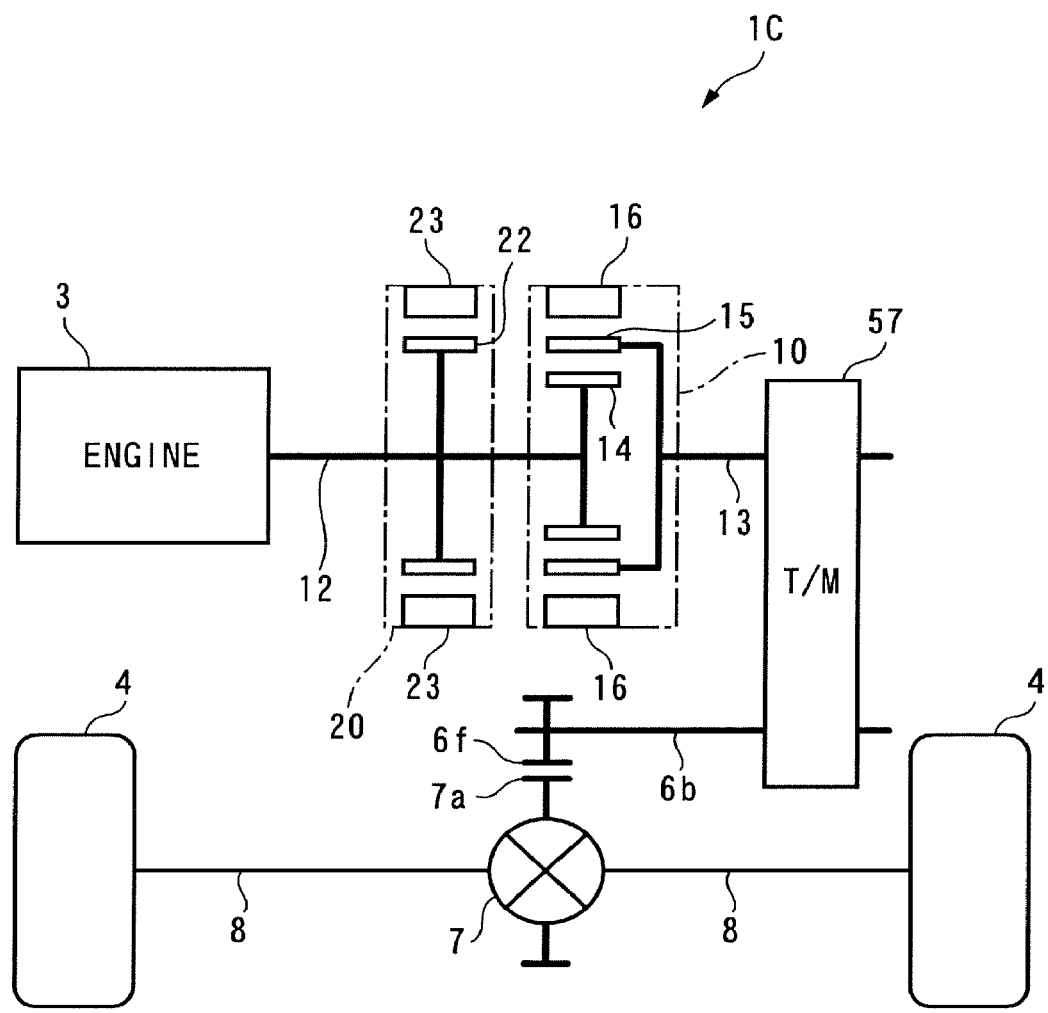
FIG. 27 A diagram showing an example in which a transmission is provided in the power plant according to the fourth embodiment.

On the other hand, in the power plant 1C according to the fourth embodiment, as shown in FIG. 27, the gear mechanism 6 may be replaced by a transmission 57. The transmission 57 changes the speed reducing ratio between the output shaft 13 and the front wheels 4 in a stepped or stepless manner and the MOT•ECU 30 controls the speed change operation. It should be noted that as the transmission 57, similarly to the transmission 50 described above, there may be employed any of a stepped automatic transmission equipped with a torque converter, a belt-type stepless transmission, a toroidal-type stepless transmission, an automatic MT, etc. on an as-needed basis.

With this arrangement, it is possible, for example, to set the torque to be transmitted to the transmission 57 via each of the first rotating machine 10 and the second rotating machine 20 to a small value, by setting the speed reducing ratio of the transmission 57 for a low-rotational speed and high-load region to a large value, whereby the first rotating machine 10 and the second rotating machine 20 can be made more compact in size. On the other hand, by setting the speed reducing ratio of the transmission 57 for a high-vehicle speed and high-load region to a small value, it is possible to reduce the rotational speed of the first rotating machine 10 and that of the second rotating machine 20. Therefore, in the case of the first rotating machine 10, it is possible to reduce the magnetic field rotational speed thereof, whereby it is possible to reduce the energy loss and improve the transmission efficiency as well as prolong the service life thereof. Further, as for the second rotating machine 20, it is possible to improve the operating efficiency and prolong the service life thereof.

Figure 28:
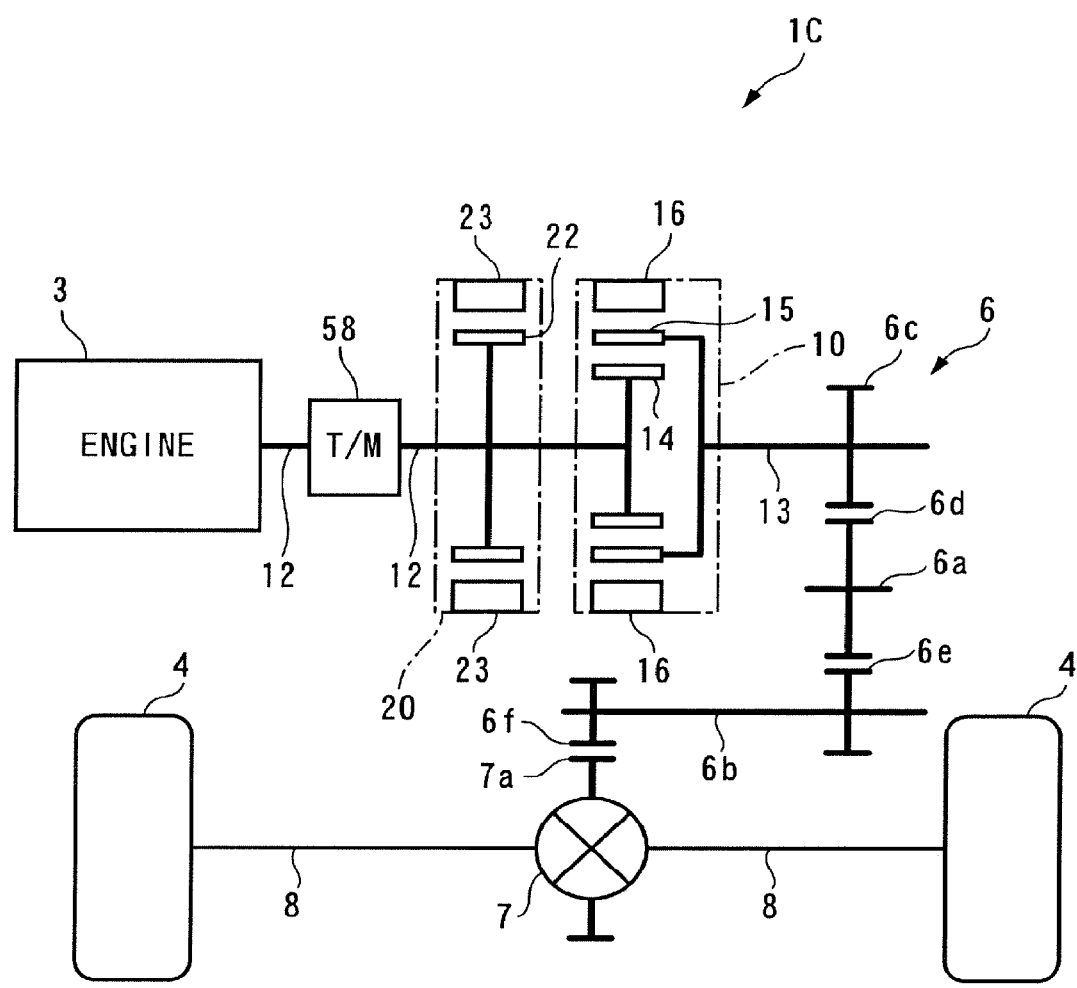
FIG. 28 A diagram showing another example in which a transmission is provided in the power plant according to the fourth embodiment.

Further, in the power plant 1C according to the fourth embodiment, as shown in FIG. 28, a transmission 58 may be provided in an intermediate portion of the input shaft 12 extending between the engine 3 and the rotor 22. The transmission 58 changes the speed increasing ratio between the engine 3 and the rotor 22 in a stepped or stepless manner and the MOT·ECU 30 controls the speed change operation. It should be noted that as the transmission 58, similarly to the transmission 50 described above, there may be employed any of a stepped automatic transmission equipped with a torque converter, a belt-type stepless transmission, a toroidal-type stepless transmission, an automatic MT, etc. on an as-needed basis.

With this arrangement, e.g. by setting the speed increasing ratio of the transmission 58 for a low-rotational speed and high-load region and the final speed reducing ratio of a final reducer (i.e. differential gear mechanism 7) to large values, it is possible to set the torque to be transmitted to a final reducer side via the first rotating machine 10 and the second rotating machine 20 to a small value, whereby the first rotating machine 10 and the second rotating machine 20 can be made more compact in size. On the other hand, by setting the speed increasing ratio of the transmission 58 for a high-vehicle speed and high-load region to a small value (or 1:1), it is possible to reduce the rotational speed of the first rotating machine 10 and that of the second rotating machine 20. Therefore, as described above, in the case of the first rotating machine 10, it is possible to reduce the magnetic field rotational speed thereof, whereby it is possible to reduce the energy loss and improve the transmission efficiency as well as prolong the service life thereof. Further, as for the second rotating machine 20, it is possible to improve the operating efficiency and prolong the service life thereof.

Figure 29:
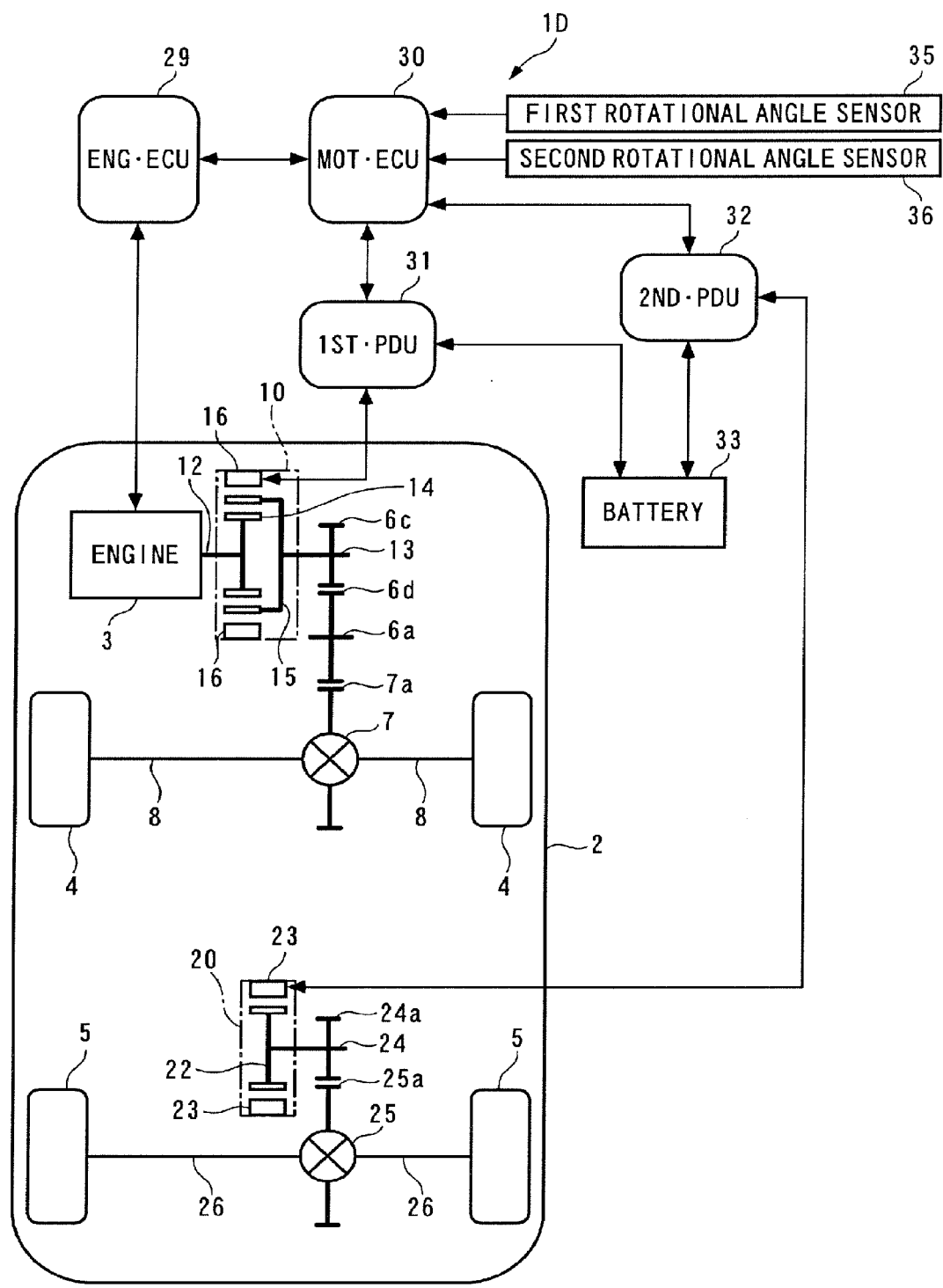
FIG. 29 A diagram showing the general arrangement of a power plant according to a fifth embodiment.
Figure 30:
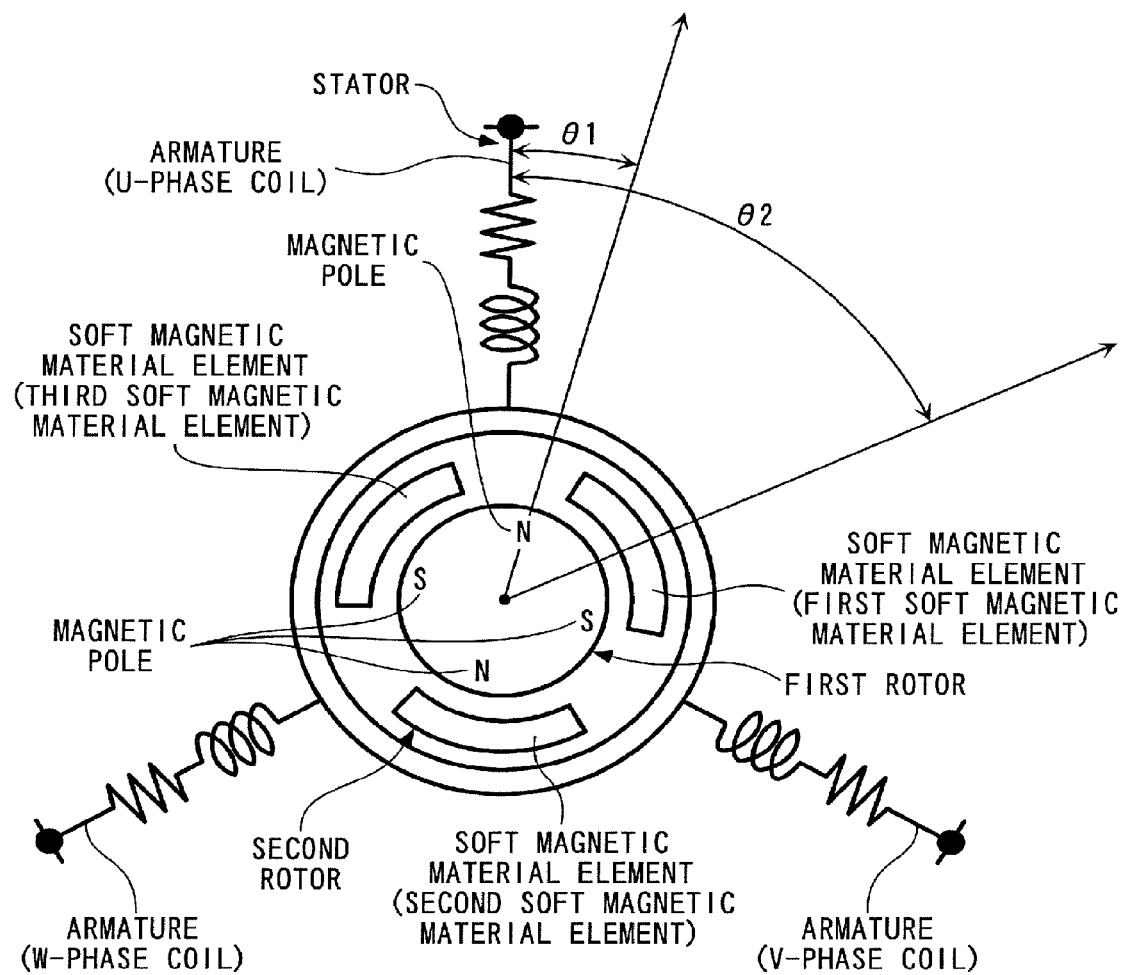
FIG. 30 A diagram showing an equivalent circuit corresponding to the first rotating machine of the present invention.
Figure 31:
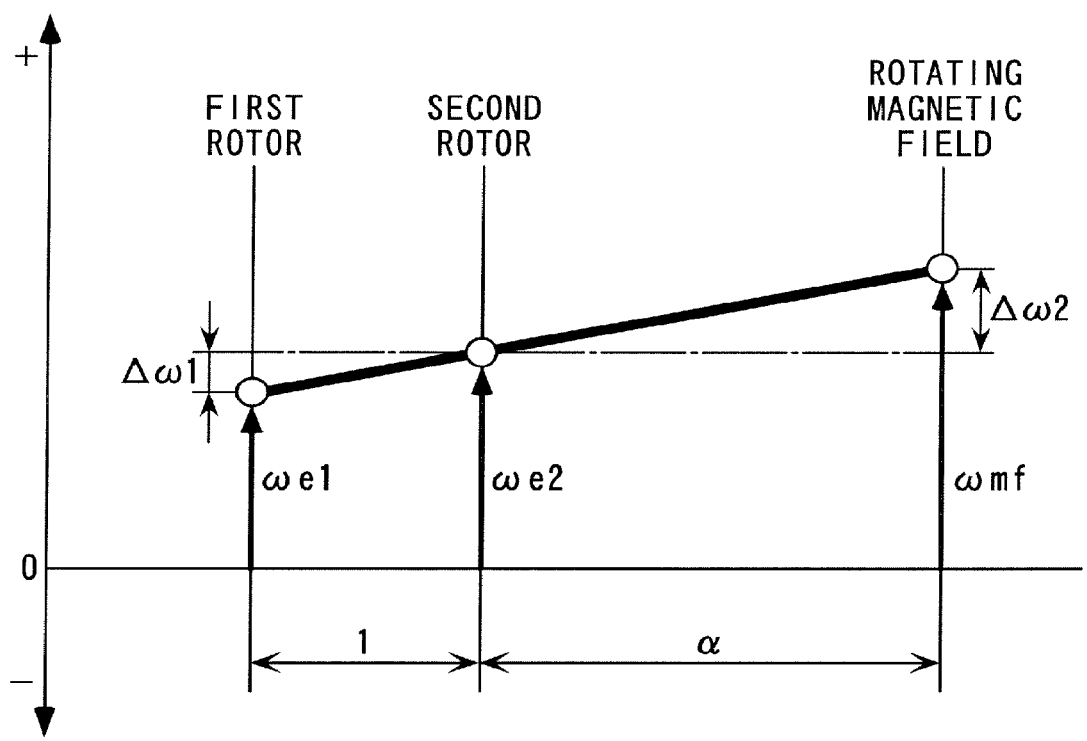
FIG. 31 A velocity nomograph illustrating an example of the relationship between a magnetic field electrical angular velocity ωmf, and first and second rotor electrical angular velocities ωe1 and ωe2 in the first rotating machine of the present invention.

Next, a power plant 1D according to a fifth embodiment of the present invention will be described with reference to FIG. 29. The power plant 1D is distinguished from the power plant 1C according to the fourth embodiment in that the location of the second rotating machine 20 in the power plant 1C according to the above-described fourth embodiment is changed from the location between the engine 3 and the first rotating machine 10 to the location toward the rear wheels 5, as in the above-described power plant 1A according to the second embodiment, and the second rotating machine 20 drives the rear wheels 5. According to the power plant 1D, similarly to the above-described power plant 1A according to the second embodiment, at the start of the vehicle 2, the vehicle 2 can be started in an all-wheel drive state, whereby it is possible to improve startability on low μ roads including a snowy road. Further, also during traveling, the vehicle 2 can run in an all-wheel drive state, which makes it possible to improve traveling stability of the vehicle 2 on low μ roads.

INDUSTRIAL APPLICABILITY

As described above, the power plant according to the present invention is a power plant including a heat engine and a rotating machine, which is very useful in making the power plant more compact in size, reducing the manufacturing costs thereof, and improving the degree of freedom in design.

REFERENCE SIGNS LIST

1 power plant
1A to 1D power plant
3 engine (heat engine)
4 front wheel (driven part)
5 rear wheel (second driven part)
10 first rotating machine
12 input shaft (rotating shaft)
13 output shaft (rotating shaft)
14 first rotor
14a permanent magnet (magnetic pole)
15 second rotor
15a soft magnetic material core (soft magnetic material element)
16 stator
16a iron core (armature, armature row)
16c U-phase coil (armature, armature row)
16d V-phase coil (armature, armature row)
16e W-phase coil (armature, armature row)
20 second rotating machine (braking device)
50 to 54 transmission
55 electromagnetic brake (brake device)
56 clutch
57, 58 transmission

The invention claimed is:

1. A power plant for driving a driven part by motive power, comprising:
a heat engine; and
a first rotating machine including a stator, and a first rotor and a second rotor which are relatively rotatable with respect to said stator, in which one of said first rotor and said second rotor is mechanically connected to said heat engine, and the other of said first rotor and said second rotor is mechanically connected to said driven part,
wherein said stator includes an armature row which is formed by a plurality of armatures arranged in a circumferential direction, and generates a rotating magnetic field which rotates in the circumferential direction, by armature magnetic poles generated in the plurality of armatures in accordance with supply of electric power,
wherein said first rotor includes a magnetic pole row disposed in a manner opposed to said armature row, said magnetic pole row being formed by a plurality of magnetic poles which are arranged in a manner spaced from each other in the circumferential direction and each two adjacent ones of which have polarities different from each other,
wherein said second rotor includes a soft magnetic material element row disposed between said armature row and said magnetic pole row, said soft magnetic material element row being formed by a plurality of soft magnetic material elements which are arranged in a manner spaced from each other in the circumferential direction, and
wherein a ratio between the number of the armature magnetic poles, the number of the magnetic poles, and the number of said soft magnetic material elements is set to $1:m:(1+m)/2$ (provided $m \neq 1$).

2. A power plant as claimed in claim 1, wherein said first rotor of said first rotating machine is mechanically connected to said driven part, and said second rotor is mechanically connected to said heat engine.

3. A power plant as claimed in claim 2, further comprising a brake device for braking rotation of said second rotor.

4. A power plant as claimed in claim 2, further comprising a second rotating machine including a rotating shaft mechanically connected to said driven part and said first rotor.

5. A power plant as claimed in claim 4, further comprising a transmission for performing a speed change operation between said first rotor of said first rotating machine and said rotating shaft of said second rotating machine, and said driven part.

6. A power plant as claimed in claim 4, further comprising a transmission for performing a speed change operation between said second rotor of said first rotating machine and said heat engine.

7. A power plant as claimed in claim 4, wherein said rotating shaft of said second rotating machine is mechanically connected to said first rotor of said first rotating machine and said driven part via a transmission, and wherein said transmission performs a speed change operation between said rotating shaft of said second rotating machine, and said first rotor of said first rotating machine and said driven part.

8. A power plant as claimed in claim 2, further comprising:

a second driven part which is different from said driven part; and a second rotating machine mechanically connected to said second driven part.

9. A power plant as claimed in claim 8, further comprising a transmission for performing a speed change operation between said second rotor of said first rotating machine and said heat engine.

10. A power plant as claimed in claim 8, further comprising a transmission for performing a speed change operation between said second rotating machine and said second driven part.

11. A power plant as claimed in claim 1, wherein said first rotor of said first rotating machine is mechanically connected to said heat engine, and said second rotor is mechanically connected to said driven part.

12. A power plant as claimed in claim 11, further comprising a brake device for braking rotation of said first rotor.

13. A power plant as claimed in claim 11, further comprising a second rotating machine including a rotating shaft mechanically connected to said heat engine and said first rotor.

14. A power plant as claimed in claim 13, further comprising a clutch for mechanically connecting or disconnecting between said first rotor of said first rotating machine and said rotating shaft of said second rotating machine, and said heat engine.

15. A power plant as claimed in claim 13, further comprising a transmission for performing a speed change operation between said second rotor of said first rotating machine and said driven part.

16. A power plant as claimed in claim 13, further comprising a transmission for performing a speed change operation between said rotating shaft of said second rotating machine and said heat engine.

17. A power plant as claimed in claim 11, further comprising:

a second driven part which is different from said driven part; and a second rotating machine mechanically connected to said second driven part.

* * * * *